(12) United States Patent
Hunn

(10) Patent No.: US 10,445,698 B2
(45) Date of Patent: Oct. 15, 2019

(54) SYSTEM AND METHOD FOR FORMING, STORING, MANAGING, AND EXECUTING CONTRACTS

(71) Applicant: Clause, Inc., New York, NY (US)

(72) Inventor: Peter Geoffrey Lerato Hunn, Dallas, TX (US)

(73) Assignee: Clause, Inc., New York, NY (US)

( * ) Notice: Subject to any disclaimer, the term of this patent is extended or adjusted under 35 U.S.C. 154(b) by 0 days.

(21) Appl. No.: 15/640,276

(22) Filed: Jun. 30, 2017

(65) Prior Publication Data

US 2018/0005186 A1   Jan. 4, 2018

Related U.S. Application Data

(60) Provisional application No. 62/356,938, filed on Jun. 30, 2016, provisional application No. 62/427,553, filed on Nov. 29, 2016, provisional application No. 62/465,035, filed on Feb. 28, 2017, provisional application No. 62/502,496, filed on May 5, 2017.

(51) Int. Cl.
| | |
|---|---|
| *G06F 16/93* | (2019.01) |
| *G06Q 10/10* | (2012.01) |
| *G06F 16/21* | (2019.01) |
| *G06F 17/21* | (2006.01) |
| *G06F 21/64* | (2013.01) |
| *G06Q 30/02* | (2012.01) |
| *G06T 11/20* | (2006.01) |
| *G06F 17/24* | (2006.01) |

(52) U.S. Cl.
CPC ........ *G06Q 10/10* (2013.01); *G06F 16/219* (2019.01); *G06F 16/93* (2019.01); *G06F 17/211* (2013.01); *G06F 17/24* (2013.01); *G06F 21/645* (2013.01); *G06Q 30/0283* (2013.01); *G06T 11/206* (2013.01); *G06Q 2220/00* (2013.01)

(58) Field of Classification Search
CPC ........ G06Q 10/10; G06Q 30/06; G06Q 50/18; G06Q 50/188
USPC .................................... 705/1.1, 80
See application file for complete search history.

(56) References Cited

U.S. PATENT DOCUMENTS

| | | | |
|---|---|---|---|
| 7,433,838 B2 | 10/2008 | Welsh et al. | |
| 7,756,772 B1* | 7/2010 | Konopnicki | G06Q 30/06 705/26.8 |
| 2002/0091539 A1* | 7/2002 | Yin | G06Q 10/0639 705/7.38 |
| 2007/0250337 A1 | 10/2007 | Karamchedu et al. | |

(Continued)

*Primary Examiner* — Diane M Wills
(74) *Attorney, Agent, or Firm* — Alpine Patents LLC; Brian Van Osdol

(57) ABSTRACT

A system and method for computable contracts that includes a contract management system accessible by involved parties, managing a formation stage of a contract document by obtaining object components, assembling a contract object graph from the object components, and committing the contract object graph to post formation execution; and in an execution environment during a post-formation stage, executing the contract object graph where instances of execution include receiving a contract state update, and appending at least one update object component to the contract object graph in accordance with the contract state update. Variations of the system and method may apply peer-to-peer negotiation and execution, use a cryptographic directed acyclic contract object graph, and/or interface with distributed ledgers.

26 Claims, 42 Drawing Sheets

(56) References Cited

U.S. PATENT DOCUMENTS

| | | |
|---|---|---|
| 2009/0234662 A1 | 9/2009 | Stieber et al. |
| 2011/0307278 A1 | 12/2011 | Clarke et al. |
| 2014/0164255 A1* | 6/2014 | Daly .................. G06Q 50/188 |
| | | 705/80 |
| 2015/0379510 A1* | 12/2015 | Smith ................ G06Q 20/3829 |
| | | 705/71 |
| 2016/0028552 A1 | 1/2016 | Spanos et al. |
| 2017/0103468 A1 | 4/2017 | Orsini et al. |
| 2017/0236120 A1* | 8/2017 | Herlihy ............. G06Q 20/3827 |
| | | 705/67 |
| 2017/0287090 A1 | 10/2017 | Hunn et al. |
| 2017/0331896 A1* | 11/2017 | Holloway .............. H04L 67/12 |

* cited by examiner

Outsourcing Services Agreement and Service Level Agreement

Contracts > SPN1481693432XMH

PARTIES: ▮▮▮▮▮ & ▮▮▮▮▮   DATE: ▮▮▮▮▮

This Outsourcing Services Agreement (including the Exhibits hereto, the "Agreement") is made effective as of ▮▮▮▮▮ (the "Effective Date"), between John Hunt, Inc, Inc., a Delaware corporation with its principal place of business at ("Customer"), and EDC Solution, Inc, a Delaware corporation with its principal place of business at ("Supplier").

SERVICES

Supplier shall provide computing services in accordance with the Service Levels (the "Services") under the terms and conditions of this Agreement. Supplier agrees to furnish all labor, supervision, tools, ▮▮▮▮▮ parts and materials required to perform the Services. Supplier shall perform the Services in a good and workman like manner, with due professional care, in accordance with the schedules and other performance metrics and criteria set forth herein and in any SOW hereunder.

PAYMENT AND INVOICING

The total annual amount to be ▮▮▮▮▮, excluding taxes, for the total provision of the services described in this Agreement, will be: $120,000. All amounts payable to Supplier shall be paid via credit or by wire transfer or electronic payment through the Automated Clearing House to Supplier's depository bank. Monthly invoices in the amount of $10,000 to Customer for service fees shall be sent by Supplier. Payment by Customer shall be made net thirty (30) days from the date of issuance of Supplier's invoice.

FIGURE 10

| | # | Clause | UUID |
|---|---|---|---|
| ☐ | 1 | Purchase and Supply | 1d32a3 |
| ☐ | 1.1 | Supply and Purchase of Products | 6d315a3 |
| ☐ | 1.1.1 | Purchase Order | c333a8 |
| ☐ | 1.1.2 | No Other Obligations | 48a4b |
| ☐ | 1.2 | Delivery | 3c322a8 |
| ☐ | 2 | Price and Payment | 1433a3 |
| ☐ | 3 | Quality Standards | 4aa3a4 |
| ☐ | 4 | Limited Warranty | |
| ☐ | 5 | Invoices | 183ac8 |
| ☐ | 5.1 | Invoice Requirements | 3f5a4f |

FIGURE 12

AO = Atomic object.

SYSTEM AND METHOD FOR FORMING, STORING, MANAGING, AND EXECUTING CONTRACTS

CROSS-REFERENCE TO RELATED APPLICATIONS

This application claims the benefit of U.S. Provisional Application No. 62/356,938, filed on 30 Jun. 2016, U.S. Provisional Application No. 62/427,553, filed on 29 Nov. 2016, U.S. Provisional Application No. 62/465,035, filed on 28 Feb. 2017, and U.S. Provisional Application No. 62/502,496, filed on 5 May 2017, all of which are incorporated in their entireties by this reference.

TECHNICAL FIELD

This invention relates generally to the field of digital contract and transaction management, and more specifically to a new and useful system and method for facilitating the formation, versioning, and management of contracts—particularly 'computable' and 'data-driven' contracts—and other documentation.

BACKGROUND

A contract is a legally enforceable agreement to exchange value such as goods, services, or property. Contracts are a fundamental tool for coordinating economic activity. Four of the basic stages of contracting are: formation, performance, renegotiation and amendment (if applicable), and termination/completion. Written contracts are typically paper-based or computer-based digital representations of paper-based contracts; often filed and stored in PDF format. Contracts are typically composed of numerous distinct clauses that establish basic information and contain the parties' agreed upon rights and obligations. Clauses may be made up of a single sentence or a paragraph, and are grouped together topically, and often hierarchically, by sections. Contracts are typically structured so that clauses make intra-document references to one another, either in the same section or across different sections. Clauses and sections that may appear in modern contracts often include: a preamble, identification of the parties, recitals, definitions, the exchange of value and the parties' other obligations (including actions the parties should and should not undertake), representations, warranties, conditions, and several boilerplate clauses such as choice of law, assignment, and entire agreement (merger) clauses. Contract documents often incorporate by reference other documents, appendices, laws, and standards into the agreement.

Contracts are currently static expressions. Although the external environment that relates to the contract and the parties' conduct pursuant to the contract may change over time, the terms and conditions of the clauses do not change after the contract is formed unless there is a legal amendment/modification. Contract amendment may require the assent of both parties; but it may be unilateral. Accordingly, under existing technology and practices, the contract serves as a static documentary record of the agreement as of the date of execution. This results in a need, often in commercial enterprises, to intensively manage legal contracts using Contract Lifecycle Management ('CLM') software. CLM software typically operates by creating a centralized repository of documents that captures and/or extracts data, often from paper-based documents or PDFs, relevant to the user's obligations under each contract. That data is stored and tracked to monitor the performance of obligations, manage business milestones, and provide the basis for basic business analytics. CLM software creates a system and layer of software and data separate from the actual contracts the CLM system assists in managing. CLM software cannot provide real-time state or visibility of contracts and contractual performance, and no aspect of CLM software, by itself, has the ability to constitute or amend legally enforceable contract rights, obligations, or parameters, distinct from the underlying contracts that are managed. Management of contracts and associated administrative actions/operations are largely performed manually by users of the CLM software.

Traditional paper-based or computer-based representations of paper-based contracts (e.g. PDFs) are static, text-based, agreements. Such legal contracts cannot, for example: store or respond to data inputs and outputs, enable terms and conditions to respond to real-time data, display or otherwise monitor their real-time state (only that at the point of execution or subsequent amendment), perform 'self-managing' functions, respond to the state of the physical world as it pertains to contracts, accommodate dynamic changes to their terms and conditions over time, store state and version histories, interact with cryptographic ledgers e.g. blockchain and/or distributed ledger(s) (which may include "smart contract" code thereon).

Thus, there is a need in the digital contract management field to create a new and useful system and method for facilitating the formation, versioning, and management of contracts. This invention provides such a new and useful system and method.

BRIEF DESCRIPTION OF THE FIGURES

FIG. 10 is an exemplary screenshot representation displaying exemplary parameters linked to graph object data within natural language prose;

FIG. 12 is an exemplary graphical user interface depicting the exemplary structure and presentation of a contract repository;

DESCRIPTION OF THE EMBODIMENTS

Figure 1:
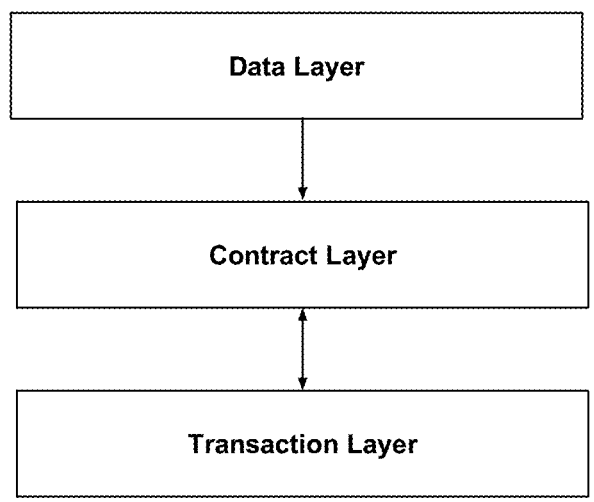
FIG. 1 is a schematic representation of interrelationships between different layers of the system and method.

The following description of the embodiments of the invention is not intended to limit the invention to these embodiments but rather to enable a person skilled in the art to make and use this invention.

1. Overview

A system and method for facilitating the formation, versioning, and management of contracts of a preferred embodiment functions to utilize a graph data structure in the execution of contract documents. A graph data structure can be used where a contract document is composed into a graph data structure. Alternatively or additionally where the code of the contract document can use the graph data structure to store state during execution. The system and method provide mechanisms enabling a computable contract to be versioned, cryptographically immutable, auditable, queryable, and replayable. Additionally, the system and method can facilitate various execution scenarios that can leverage integration with outside data sources, execution on centralized, distributed, or decentralized environments, integration with BDLs, and/or other suitable capabilities.

Contract documents, herein referred more concisely as contracts, govern relationships and agreements between parties. These relationships generally pertain to the physical world and often will have implications for a multitude of systems that are external to the contract (e.g. payroll, expenses, accounting, invoicing, payment, enterprise resource management systems, inventory management systems, customer relationship management systems, logistics systems, etc.) and documents (e.g. purchase orders, letters of credit, invoices, etc.). A supply contract, for example, may typically govern the arrangement, manner, and conditions, in which goods are shipped, the payment for those goods, and the qualities and warranties of goods, amongst others. Payment, for example, relates to accounting, invoicing, and payments systems. Shipment relates to logistics systems, trade finance systems etc. Despite governing, traditional contracts are currently isolated from those systems and processes.

Contracts are also agreements that, by their nature, may be subject to frequent state change. Those changes may be initiated by the contracting parties, third parties, and/or physical world or other events pertaining to the contract. Changes may occur throughout the entire lifecycle of a contract from negotiation through to performance, renegotiation, amendment, completion, or termination. Changes may occur to the substance of the contract terms and conditions (e.g. if can amendment is agreed between the parties in accordance with the terms of the previously executed contract, or a substitute/replacement contract is executed), and/or the state of the various aspects of the performance of the contract after it is executed (such as an event occurs to effect a term or condition, or otherwise effect/change an obligation, e.g. dynamic pricing). Given the importance of contractual relationships in the organization of economic activity it is vital that contracts are accurately and efficiently created, and remain verifiably accurate throughout the contract lifecycle.

The system and method can be used with natural language contracts but are more preferably applied to computable contracts. Computable contracts as used herein are a form of an agreement (e.g., a legal agreement) that is represented—wholly or partially—in a manner capable of being machine-readable. In some variations, a computable contract can be data-driven contract. Data-driven contracts are a form of computable contract that interfaces with data inputs (i.e., data sources) or data outputs (i.e., data destinations) such as edge computing devices, 'Internet of Things' devices and platforms, webhooks, Application programming interfaces (APIs), enterprise resource planning (ERP)/customer relationship management (CRM) systems, BDLs and other distributed or decentralized networks, databases, distributed databases, blockchain databases or similar, event processing and complex event processing system, rules engines, events/ operations performed by the contracting parties, and/or other suitable data resources. The contract can expose a data input to drive the logic of the contract, and/or the contract can interface with a data output to drive output-based operations on external resources. In one variation, data-driven contracts can be substantially similar those described in U.S. patent application Ser. No. 15/476,791, filed on 31 Mar. 2017, which is hereby incorporated in its entirety by this reference. One significant feature is that data-driven contracts may be dynamic in nature; meaning that a clause, part of a clause, or clauses, may change or update its state, or that of another clause, in response to data, changes in other clauses, and/or other data-driven contracts, and/or data on external resources (e.g. update an invoice). For example, a price clause may change its state in response to changes in temperature/humidity from edge computing devices if the price of a good (e.g. a crop) is made contingent upon weather conditions. Contract state updates may take place continuously and in 'real-time' or near 'real-time'.

Another significant feature of computable contracts is that contracts may perform transactions, store data on, or otherwise interface with blockchains/distributed ledger systems (BDLs) in different ways. For example, they may interact with BDLs in various ways including (but not limited to): embedding, triggering, deploying, initializing, or otherwise integrating 'smart contract' code into a data-driven contract or clause, by calling 'smart contract' code that exists on BDLs, by compiling logic to the virtual machine bytecode of one or more BDL(s), interacting with the ABI (Application Binary Interface) of BDLs, by passing data/objects/arguments/functions/messages (or another entity) to existing on-chain 'smart contract' code, through use of a BDL API, and/or performing other suitable interactions. Herein, BDL is used herein to refer to distributed ledger systems and/or more specific consensus-based blockchain solutions, wherein any suitable variation of such systems may be used. References to BDL systems, platforms, integrations, transactions and the like could be distributed ledger variations or blockchain variations. Centralized BDL implementations, cryptographic databases, and/or other suitable systems with BDL-like features may be additionally or alternatively be used in a similar manner as the BDL components.

In order to perform these functionalities, computable contracts, and 'data-driven' contracts in particular, require a system and method through which contracts may be stored, displayed, and managed in a 'dynamic', 'real-time' or near 'real-time' manner. To facilitate such functionality, the system and method preferably provides mechanisms to host contracts on the World Wide Web or another computer-based network such as a peer-to-peer (P2P) network so that a contract may interact with external data sources, may update and drive external operations and actions, and the contract may be viewed by the contracting parties and any other party that is given, or requires, access to the contract. Where contracts are dynamic, dependent upon, or linked to external data, and exclusively hosted in a computer-based format, there is an increased requirement for, and emphasis upon, security, authentication, and validation of both the formation and post-execution state of these contracts as well as any changes, modifications or updates made to their terms and conditions; as compared to PDF or paper-based contract documents. As such, the system and method can preferably provide approaches for securely versioning contracts so that: a) changes made to their state—both before and after execution may be tracked, verified, and immutably recorded; and b) operations with contract integration with any external or third party system, application or platform, may be tracked and verified (e.g. transactions on distributed ledgers, operations performed on external systems via. APIs, on network-connected devices, etc.). FIG. 1 provides a high-level conceptual framework of a contract within the system and method showing interactions between a data layer (e.g., data from external sources such as APIs, IoT/edge computing devices, BDLs, ERP/IMS/CRM and other systems as mentioned herein), a contract layer (e.g., involved in forming and execution of data-driven/computable contracts), and a transaction layer upon which transactions and/or operations may be performed (e.g., BDL systems, 'on-chain'/'on-ledger' code; APIs etc.).

Figure 2:
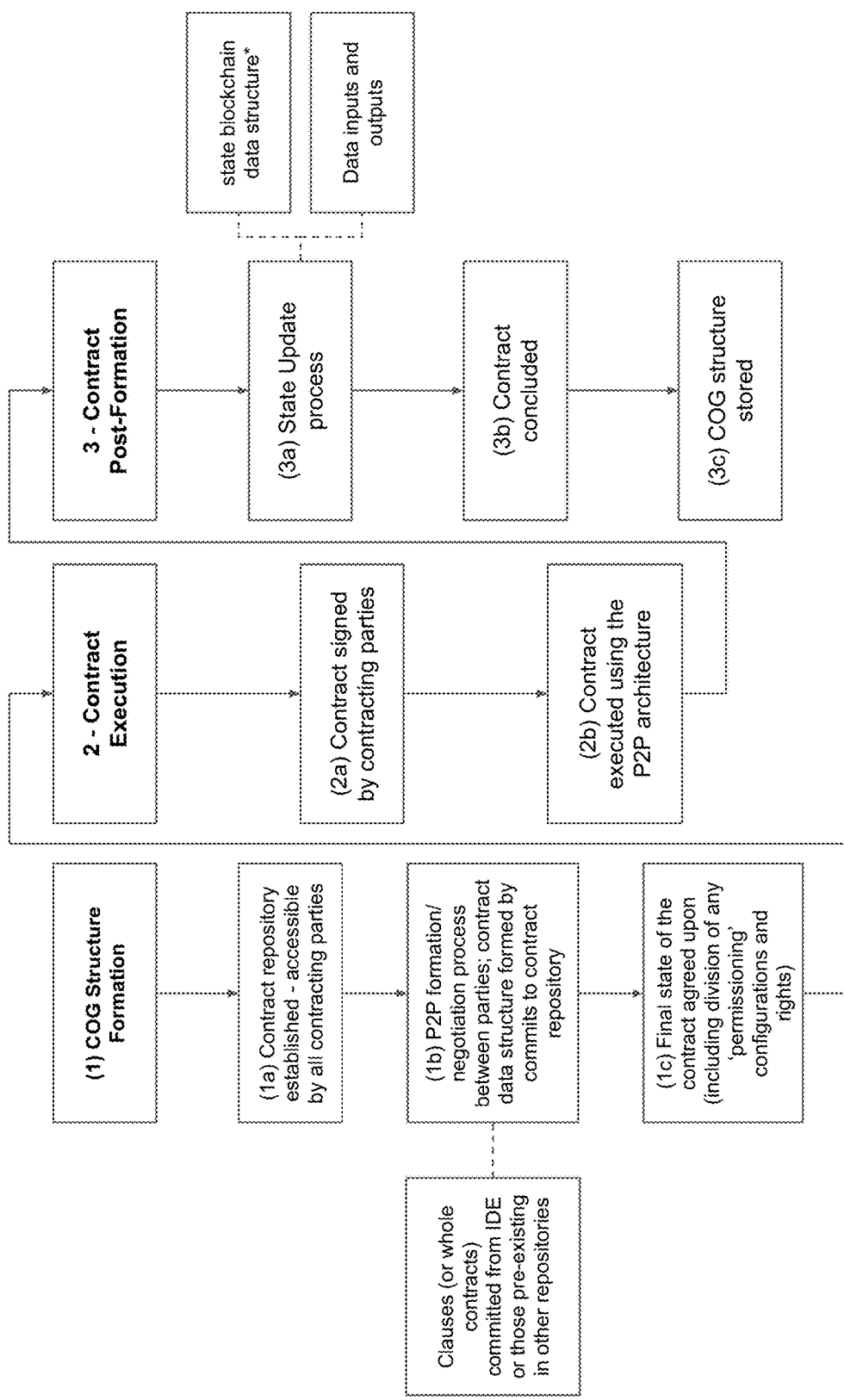
FIG. 2 depicts an exemplary flow of an exemplary contract from formation through execution and post-execution.

A system and method for the formation and post-formation versioning and management of computable contracts, including data-driven contracts is disclosed. The disclosed system and method provides stateful management, versioning, and storage of computable contracts and recording of input/output events from data-driven contracts and state changes, performance of transactions, and any other operations and events (e.g. recording of notice, termination etc.). FIG. 2 depicts a high-level, non-limiting, and exemplary flow of an exemplary contract using the system and method.

Figure 42:
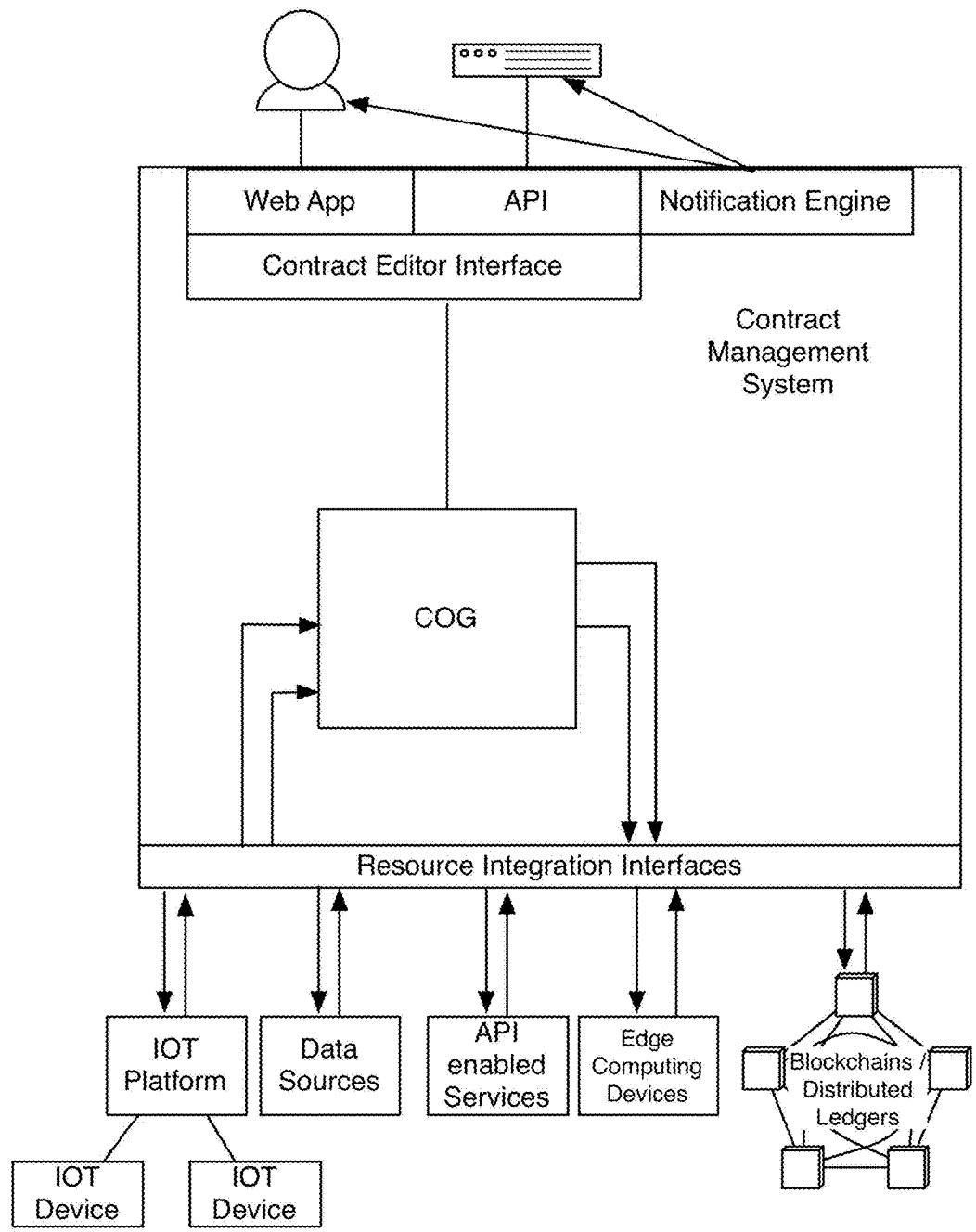
FIG. 42 is a schematic representation of an exemplary integration of a contract management system.

The system and method may be used independently of other components, but in a preferred embodiment is used as a component part of a wider system or application. In one preferred embodiment, the system may be used in combination with a multi-tenant contract management system platform (one embodiment of which is depicted in FIG. 42).

Computable and data-driven contracts are preferably updated by a series of 'state updates' which version and transition the state of contracts in at least three broad respects including versioning at the formation stage, party-initiated transitioning/versioning at the post-formation stage, and data-initiated transitioning/versioning at the post-formation stage. Versioning at the formation stage of the contract lifecycle includes when contracting parties are negotiating or establishing the content of a contract prior to execution. Party-initiated transitioning/versioning at the post-formation stage includes tracking and storing updates to computable contracts in response to party action (e.g., amendment updates, providing data to transition the state of a contract). Data-initiated transitioning/versioning at the post-formation stage can include automated state updates or require all or some contracting parties (and/or third parties) to additionally sign or otherwise acknowledge contract state updates.

The system and method uses a cryptographic graph data structure that represents and may stores the state of a contract. Objects are preferably immutably added to the graph in an append-only fashion when events, transactions, updates, and other operations occur under the contract and/or otherwise relate to the contract. The data structure provides a versioned history of contractual state that can be used, amongst other applications: (a) to query the data structure to display events and contract updates to users (e.g. event streams/feeds, audit trails, notifications); to provide analytics of the state of one or more contracts (e.g. metrics, graphs, dashboards); (b) by contract logic and/or 'on-chain'/ 'ion-ledger' scripts (e.g. by using graph object states in execution of logic); (c) to audit or replay the state of the contract; and (d) to push or otherwise store the state of the contract, or part thereof, to BDLs. Other applications may be used.

The system and method may be used with any suitable system for computable contracts. The system and method, in part or whole, may also be applicable to other documentation more broadly such as non-computable contracts. Herein, the system and method are described as being used with computable contracts, but one skilled in the art would appreciate applications to non-computable contracts. A preferred embodiment is to use the system and method in combination with a system and method for 'data-driven' contracts (see FIG. 3). Any form of data-driven contract may be used. Data-driven contracts are preferably composed—in whole or in part—in machine-readable code (preferably, but do not have to be, through 'programmable clauses') and preferably (but do not have to) have a number of attributes: (a) with clauses, terms and conditions that update or change in response to external data (notably from edge computing devices, 'Internet of Things' (IoT) devices, IoT platforms, 'oracles' for BDLs, adapters, Application Programming Interfaces (APIs), Customer Relationship Management (CRM) systems, Enterprise Resource Planning (ERP) systems, Inventory Management Software (IMS) systems, analytics systems, databases, BDLs etc.), business rules, algorithms and legal logic/rules—contracts that are 'dynamic' or 'real-time' as opposed to static; (b) that output data processed through contracts to external systems, applications, platforms, databases and similar; and/or (c) combine "smart contract" execution functionality within the logic of data-driven contracts either through embedding, compilation to the bytecode of a BDL with a virtual machine or similar, passing data/objects/functions/arguments to existing 'on-chain'/'on-ledger' code, deploying or initializing scripts 'on-chain'/'on-ledger', via an RPC channel, API, or any other appropriate method. Herein, "smart contract" refers to "smart contract" code that is generally considered d code executed between two or more nodes that instantiates transactions or other data on a ledger or blockchain using a blockchain or distributed ledger system, or another similar system (e.g. a 'blockchain' database or other database with blockchain or distributed ledger features).

The system and method may be used with all computable contracts that are capable of accepting state updates or similar interaction, hybrid (part natural language, part-machine readable code) contracts, or any other appropriate form of contract. Even where this is not wholly compatible, parts of the system and method may still be used where appropriate (e.g. natural language contracts, using to store "smart contract" states). Example fields of computable and data-driven contracts may include (but are not limited to): sale of goods/services, supply chain and logistics agreements, supply chain finance, warranties, contract farming and agriculture, procurement, asset financing/collateral management, employment and freelancer/consultant agreements, software licensing, insurance contracts and policies, performance/outcome contracts, service-level agreements, loan agreements, mortgages, marketing and advertising agreements, trade finance (e.g., letters of credit and related documentation), and/or numerous other fields.

The system and method is preferably composed of a set of base components including (but not limited to): a contract data structure, a state update mechanism, an execution environment, an object ledger structure (e.g., for sharing state) and/or a BDL system (e.g., outside BDL on which transactions are executed), which are each described in detail in the sections below. The contract data structure is preferably a universal content-addressed and immutable data layer for computable contracts. The state update mechanism is preferably a mechanism for administering, managing, and recording the version and state of contracts—the substance of which depends upon the nature and logic of the contract (e.g. real-time or near real-time state of dynamic price changes, events, notices, credits, purchase orders etc.). The execution environment is preferably an architecture for the formation, execution, and updating of computable contracts. The object ledger structures are ledger structures that are preferably distributed (e.g. a blockchain or other distributed ledger protocol) that may be used to (but is not limited to): (a) store and share objects/data from the contract and/or graph (e.g. for other parties, as a record, etc.) in whole or in part; (b) perform transactions using contract logic and graph data using 'on-chain'/'on-ledger' code; (c) interact with objects, arguments, and data from the contract logic and/or the graph data structure through 'on-chain'/'on-ledger' code); and (d) store data and perform transactions that do not emanate from, but may be related to, the contract such as IoT data, transactions on BDLs (e.g. trade finance transactions, asset transfers, tracking of goods, etc.).

Figure 3:
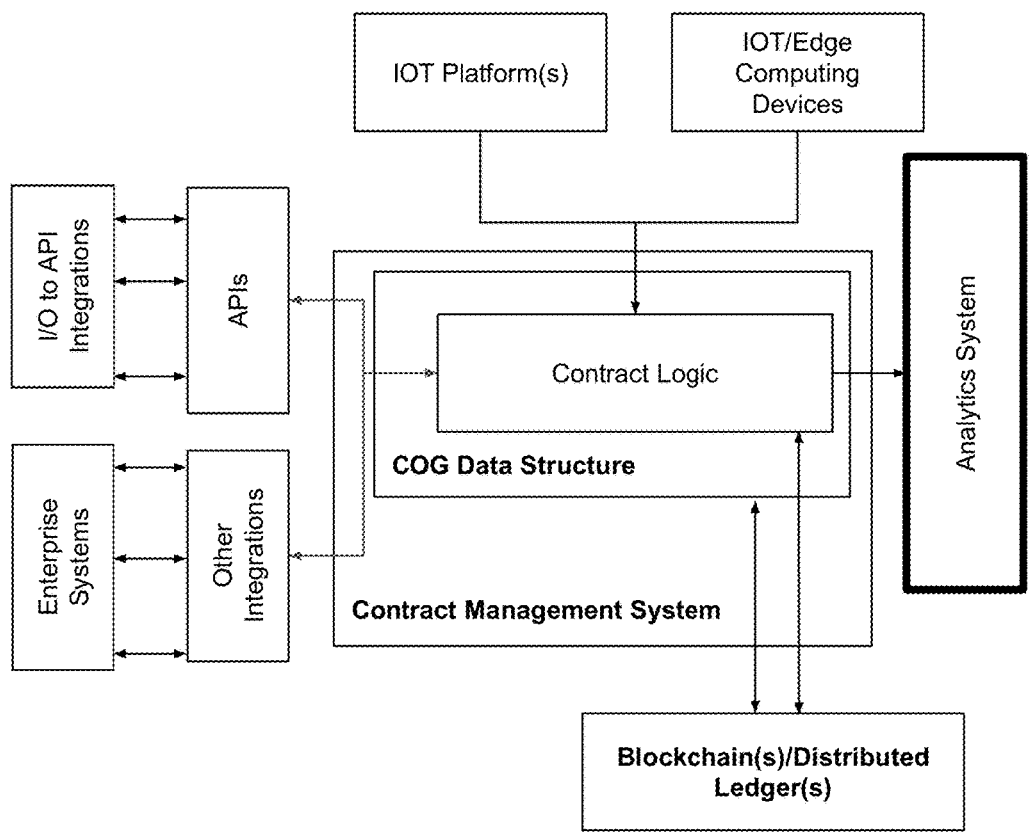
FIG. 3 is an exemplary schematic representation of the system and method within an exemplary wider data-driven contracting platform architecture.

Any appropriate combination of these components may be used in a given implementation. Not all components may be used, and additional and/or alternative components may be used. For example, some implementations may not make use of object ledger structures. The system and method is preferably implemented as a component within a contracting system/application as shown in FIG. 3.

Method Overview

Figure 4:
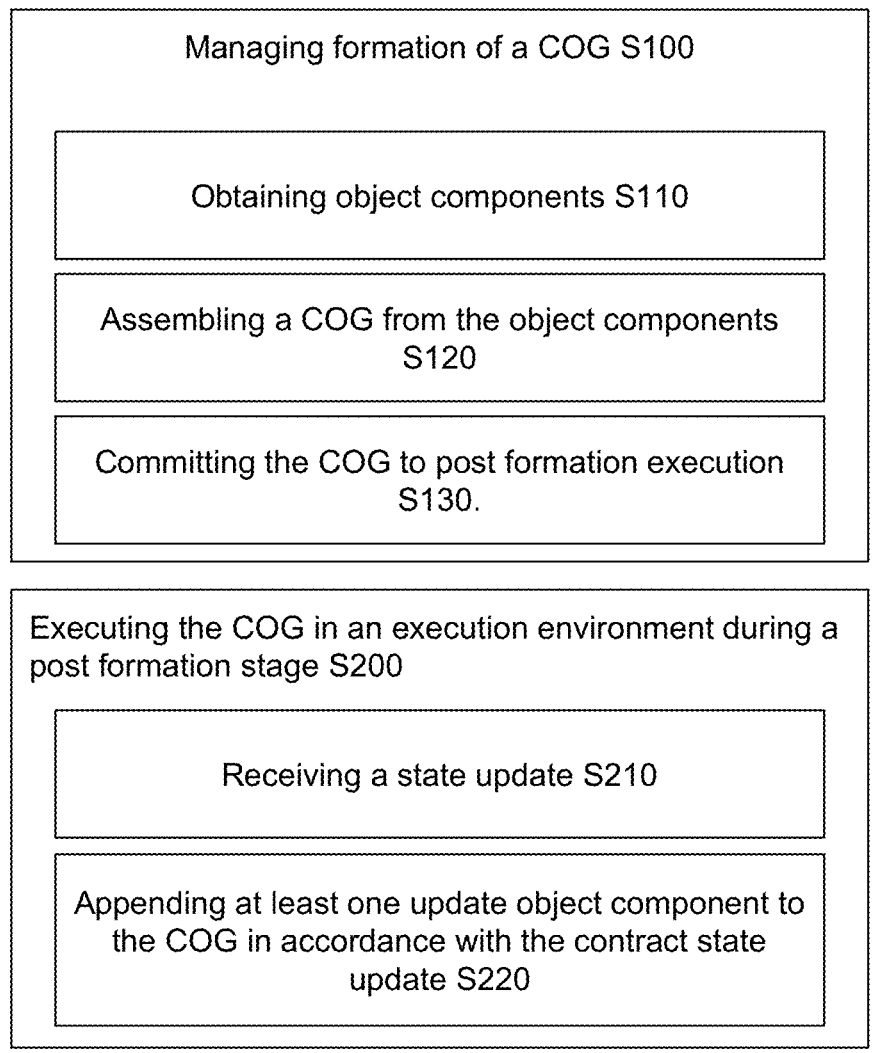
FIG. 4 is a flowchart representation of a method of a preferred embodiment.

As shown in FIG. 4, a method for forming, storing, managing, and executing contracts using a graph structure of a preferred embodiment can include managing formation of a contract object graph (COG) from a contract document S100 and executing the COG in an execution environment during a post formation stage S200.

Managing formation of the COG from the contract document S100 functions to form a graph representation of a contract to facilitate execution. The formation stage is preferably executed in part by a contract management system that is accessible by the involved parties. The involved parties will generally include the contracting parties which will generally be at least two parties involved in forming and agreeing to the contract. The parties participating in the formation stage can additionally include representatives of a contracting party, collaborators, observers, and/or other entities. Managing the formation stage will preferably include obtaining object components of the contract document Silo, assembling a COG from the object components S120, and committing the COG to post-formation execution S130.

Block S110, which includes obtaining object components of the contract document, functions to translate the various sections, clauses, and/or other elements of a contract into data representation suitable for inclusion in the COG. Object components may be formed directly from input received by contracting parties. In one preferred embodiment, the object components are obtained through p2p formation/negotiation of the contract document which may include receiving object components from a contract repository, wherein managing the formation stage additionally includes synchronizing the contract repository with repositories of the involved parties. The contract repositories of the involved parties are preferably synchronized by exchanging cryptographically signed commits between the involved parties. Alternatively, object components may be determined from configuration and specification defined in another construct or format in which case S110 may include converting a contract document or a portion of a contract document to object components. Specification of the contract document is preferably received through a user interface of the contract management system. In one variation, a graphical user interface is used in constructing a contract document that can be converted to object components. In another variation, a contract document may be specified and defined through one or more text documents. A contract document can preferably be decomposed to object components that segment logical sections of the document. This will preferably include creating object components for each clause of a contract and grouping clauses within sections. Alternative structures may alternatively be used. As the method is preferably used with computable contracts, the object components may include object components for programmable clauses that define logic, variables, data interfaces, BDL code and/or other functionality of a computable contract. Within a computable contract there may be a variety of clause types that can be converted or translated to corresponding object components such as natural language clause objects, executable clause objects, and/or hybrid clause objects. A natural language clause object can characterize static contract content such as natural language content. An executable clause object can include computable elements such as logic and/or variables. A hybrid clause object may include natural language content and computable elements. The method preferably supports maintaining a human accessible version of the contract document either in synchronization with a machine readable and executable contract, and/or the contract state at the point of execution. In some variation, the method may include generating a natural language representation of the COG, wherein the representation reflects either the current state and/or the state at the point of execution.

Block S120, which includes assembling the COG from the object components, functions to generate or compile a graph representation of the contract from elements of the contract. The COG is preferably a historically immutable record of the contract that can be versioned during formation and post-formation. The COG may preferably be used to not only represent the contract logic (natural language, computational logic, etc.) but also the contract state (as indicated through execution of any computable logic). Alternatively, separate graph data structures may be used to represent the contractual logic (as set during formation) and/or the contract state (as set during post-formation). Different instances of the COG may additionally be used during formation and the post-formation. For example, a formation COG may be used in creating a post-formation COG that is then used in representing contract state. The COG is preferably an append-only data structure such that any change to terms, conditions, logic, and/or state is preserved, and data can only be added, not removed. Preferably, the object components are committed and/or compiled into a Directed Acyclic Graph (DAG) or a Merkle tree structure where hash links connect or establish associations of linked object components. In a preferred variation, the object components are formed into content-addressed object components with Merkle links as a form of Merkle Directed Acyclic Graph (MDAG). Use of an MDAG data structure may be particularly applicable in some variations. With respect to BDL applications, the MDAG structure can enable an end-to-end cryptographically secure environment between the contract and a blockchain/distributed ledger. In one implementation, assembling the COG comprises structuring the contract in a tree-like/hierarchical graph organized by object components corresponding to sections, clauses, and/or sub-clauses. Additional, description of details, variations, and implementations of the COG are discussed below.

Blocks S110 and S120 preferably support versioning of the contract document and the compiled COG. Amendments and/or other changes may be made and similarly committed to the COG. Changes to the contract can be tracked, inspected, and/or otherwise reviewed. Amendments or new elements making up part of a contract can be introduced and represented as object components that are appended or otherwise assembled into the COG. Such amendment objects may be cryptographically signed by the parties (e.g. using asymmetric 'public key' cryptographic methods) and optionally validated to be appended to the COG. In some cases, all or some amendments proposed through the contract management system will prompt approval by one or more contracting parties prior to committing the amendment object component to the COG.

Block S130, which includes committing the graph to post-formation execution, functions to finalize and terminate the formation stage so that the contract can be ready for execution. Committing the graph to post-formation preferably involves executing electronic signature of the COG by the contracting parties. As a contract document, the contracting parties may be requested to sign the contract document to legally put the contract in force. Where applicable, both may be performed by a single signature or multiple signatures. A signature may be an e-signature, cryptographic signature, or a combination (e.g., an e-signature combined or backed with public key cryptography). In some variations, committing the graph to post-formation execution can transition the COG to a separate execution versioning system, but a single versioning system may alternatively be used. In some implementations, the COG during formation can be a different COG version used in post-formation. In some variations, the post-formation can initialize as a copy of the formation COG, but the post-formation COG may alternatively use an alternative format or variation of the COG data structure and usage. For example, the COG during formation may provide versioning of content of the contract, and the post-formation COG may be used for representation of contract state. The COG from formation may be used in producing a post-formation/execution COG where two or more graph data structures are used.

Block S200, which includes executing the COG, functions to use the COG during operation and enforcement of the COG. Here executing the COG may include actual execution of logic of the contract represented in the COG and/or maintaining of the COG as an auditable record of contract state and history. As a digital mechanism used alongside execution of a computable contract, the COG is preferably used for directing the dynamic functionality of a computable contract such as interacting with outside data sources, updating based on external data (e.g., from an API, IoT/client device, private data of a third party, data from a BDL etc.), driving or performing actions on external resources (e.g., transmitting commands via an API, executing transactions or compiling code to/on a BDL, etc.), performing internal logic, performing cross-contract logic, and the like. Such logic and state of a computable contract is preferably represented and maintained by the COG. Accordingly, executing formation of the COG can include one or more instances of receiving a state update S210 and appending at least one update object component to the COG in accordance with the contract state update S220.

New data, changes in logical state, interactions with external resources, amendments, and/or other changes are preferably appended or committed to the COG to preserve a secure and trusted historical record of the computable contract. Instances of different state updates can involve state update varieties such as data-initiated state updates, party-initiated state updates, and hybrid state updates. Data-initiated state updates can include data input and data output variations. Such data-initiated variations can include integrations with APIs, IoT devices, client devices, BDL systems, and the like. Party-initiated state updates can include state updates initiated by contracting parties, third parties, and the like. Hybrid state updates can include state updates involving multiple variations of data-initiated changes and/or party-initiated changes. These variations are described in more detail below.

The execution environment is preferably used for formation and post-formation. Alternatively different execution environments may be used for different stages. In yet another variation, execution environment may be configured for the contract document wherein the method may include setting of the execution environment. Such settings may additionally be set per stage. The execution environment is preferably either a distributed or decentralized execution environment. In one variation, the execution environment is a P2P network, wherein the formation and execution of a COG can be distributed across different nodes of the P2P network. Nodes may be distributed servers and/or user devices (e.g. contracting parties that use the system and method) that run a network daemon, or any other appropriate node type or mechanism. Various approaches may be employed which are described more below. The execution environment may alternatively be a centralized execution environment (e.g., a centralized server/platform), a distributed execution environment (e.g. a cluster of servers), or a federated execution environment. In one alternative example, the execution environment could be or include a cloud-hosted computing platform.

Additionally or alternatively, the method can additionally include executing a transaction on a BDL, wherein the transaction represents or uses at least a portion of at least one object component of the COG. Contract and object hashes and metadata, state changes, contract variables, commits, and the like may be appended to or stored on the distributed ledger. Particularly, this may involve the execution of code on a BDL, such as by passing object(s) to "smart contract" code on a BDL, or other approaches. In some variations, this may be used in combination with the decentralized execution environment.

The method as described preferably facilitates the COG being used in directing execution of a computable contract and recording the versioned history of the contract. The method can additionally be used in providing analytics or otherwise applying the COG. The method can include querying the COG and providing a versioned history of contract state. In some cases, this may be the history on the whole contract or different elements of the contract. For example, the COG may be used in generating a time series record of pricing values as driven and represented in a pricing clause. Querying the COG can additionally be used in replaying the COG to revisit how the state changed. Other suitable applications of the COG could alternatively be used.

System Overview

Figure 5:
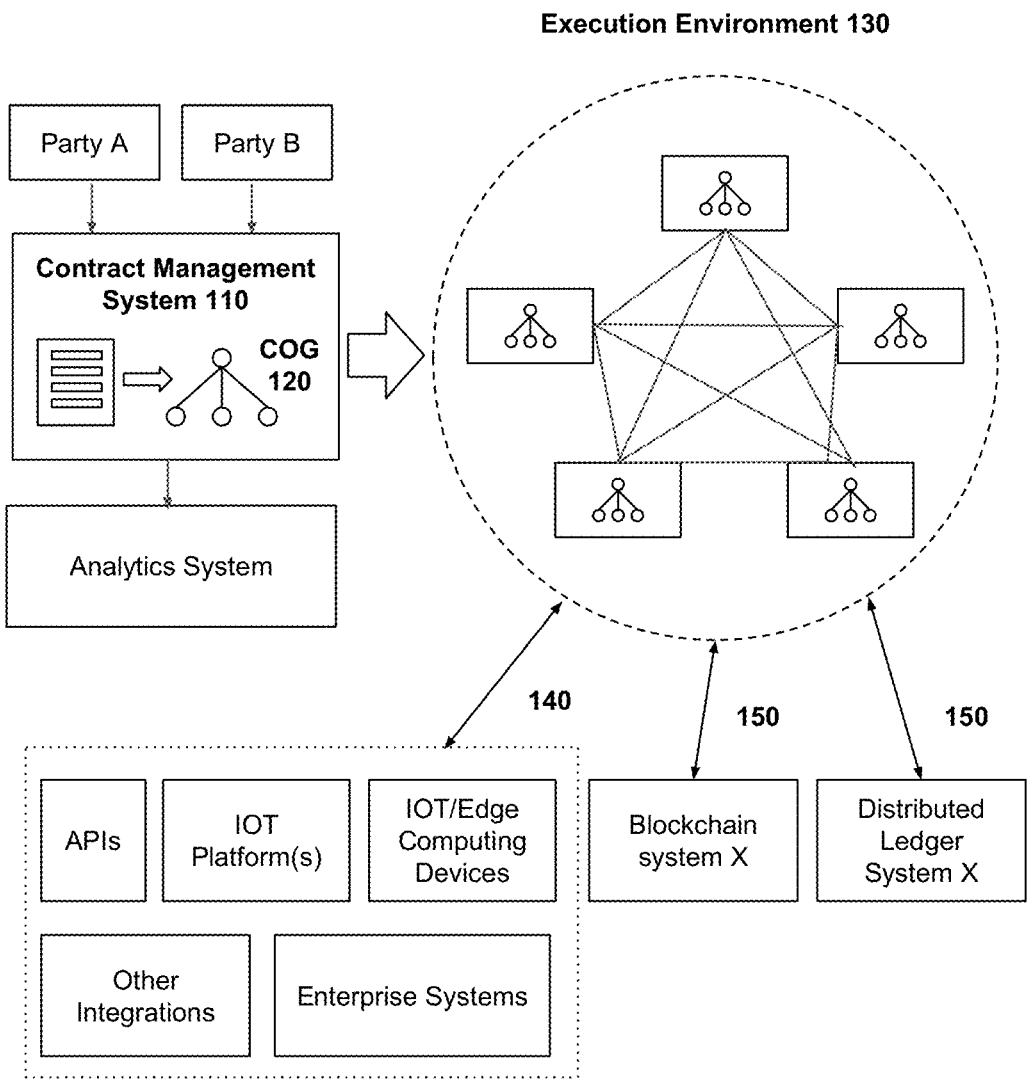
FIG. 5 is a schematic representation of a system of a preferred embodiment.

As shown in FIG. 5, a system for forming, storing, managing, and executing contracts using a graph structure of a preferred embodiment can include a contract management system 110, a COG 120 of a contract document, and an execution environment 130. The system can preferably include data integrations 140 and more preferably BDL integrations 150. The system is preferably used in implementing the method described above, component variations described, herein, and/or other suitable variations.

The contract management system 110 functions as a system accessible by involved parties (e.g., contracting parties) and can enable parties to negotiate, form, and manage computable, data-driven contracts, including (but not limited to) the visual formation/programming of computable contracts, selecting and configuring external data integrations (e.g. APIs, ERP/CRM and other systems, analytics services, BDLs etc.), mapping integrations to programmable clauses, adding clauses to contracts (e.g. from clause libraries, using templates, and other appropriate means), and monitoring the post-formation state of a contract via a graphical user interface (GUI) dashboard(s), analytics, notifications, feeds, graphs, charts, and other data visualization techniques. The contract management system 110 preferably facilitates the management of the formation stage of a contract document. For example, the involved parties can use a graphical user interface of the contract management system 110 for creating, editing, and/or finalizing the contract document. The contract management system 110 may additionally facilitate the post-formation execution stage. In one variation, the contract management system 110 can provide a client interface with the execution environment of the COG to provide administrative review of the COG. In another variation, the contract management system 110 may directly facilitate in the execution in part or whole.

The contract management system 110 is preferably a centralized system that can be operated as a cloud computing web application or web service. The contract management system 110 could alternatively be a cloud-hosted platform operated and exposed within an internal network. For example, a large corporation may run an instantiation of the contract management system no. The contract management system no may additionally alternatively use a distributed, decentralized, and/or federated system architecture in part or whole. The contract management system may be centralized (e.g. a multi-tenant cloud platform) or operate in a decentralized environment such as a platform run in a client by nodes on a peer-to-peer network, or alternatively in a 'serverless' fashion. Combinations of execution methods may be used in a given embodiment. For example, a peer-to-peer network may be used with a centralized or cloud-based contract management system. The contract management system can additionally have a contract repository system used in managing, synchronizing, hosting, and/or otherwise interfacing with repositories of contracts used by the system and method.

The contract management system no may also integrate with external platforms, systems, and resources to give users access to template clauses and contracts on other systems/resources, as well as to push data and notifications to other systems. More generally a contract management system can incorporate a cloud management platform, computing infrastructure in supporting the operation of the system and methods, management of BDL systems, and other aspects described herein.

The COG 120 functions as a data structure or model used in representing the contract logic and/or state. The COG 120 can be a singular data structure but may alternatively be a set of data structures used to cooperatively represent the COG 120. The COG 120 preferably represents the terms and/or conditions of a computable, data-driven contract. In a full contract variation, the COG can represent the terms and the conditions—both logic and state. In a logical representation variation, a logic-based COG (i.e., a contract logic graph) can represent the logic. In a state representation variation, a state-based COG (i.e., a contract state graph) can represent the state of the computable, data-driven contract. In yet another variation, multiple COGs/graph data structures/databases may be used and managed in combination. For example, a logic-based COG could be used alongside a state-based COG in the execution and lifecycle management of a contract. The terms and logic of a COG 120 can be amended and updated during formation and post-formation. During the execution stage, the COG 120 can update and change in real time or near real time in response to logic, data, state updates, and external events. A computable contract can preferably act as a legal contract that is capable of being at least semi-autonomous or 'self-managing' in nature.

The COG 120 preferably characterizes the logic and state of clauses. Within the context of a computable contract, clauses that are computable can be referred to as programmable clauses, which can be substantially similar to the programmable clauses of U.S. patent application Ser. No. 15/476,791, filed on 31 Mar. 2017.

Programmable clauses are components of a computable contract that at least partially define dynamic operations of a computable contract and additionally may service as legal contractual clauses. Programmable clauses can be independent of each other. Programmable clauses can preferably be represented by one or more nodes of a COG 120. Programmable clauses may be represented in various forms. In one variation, a programmable clause can be written in a domain specific language (DSL) that may have two or more conceptual layers such as a contract clause layer that specifies contract clause logic to be evaluated in response to events and transactions and a second even layer that specifies the parties of the contract, the contract clause to be evaluated and the events to be taken in response to conclusion or violation of the contract clause.

Programmable clauses may possess several core attributes, including but not limited to the following.

Firstly, programmable clauses may potentially be formed, expressed, programmed, written, or otherwise configured for using various programming paradigms or languages. Potential programming paradigm or language embodiments can include (but are not limited to) object-oriented languages, metaprogramming, functional languages, procedural languages, or declarative languages; either using domain specific languages or high-level (general) languages (including extension of a high-level language). Programmable clauses written in a declarative language may use the defeasible reasoning process of a rules engine to determine the steps taken to perform, execute, or implement contract actions and operations. A programmable clause is predominantly formed of programmable logic, preferably in an object-oriented paradigm (e.g., or other options such as metaprogramming and the like). Programmable clauses may also interact/integrate with IoT platforms, internet-connected (or other network connected) devices (e.g., IoT and network-connected devices) APIs, external systems, applications, protocols, edge computing devices, complex event processing (CEP) data/engines, data and other resources to drive actions under the contract and/or on external systems.

Secondly, programmable clauses may additionally interface with BDLs in various ways. They may interact with BDLs by embedding or otherwise integrating code of a BDL script (e.g., "smart contract" code) and operation of the BDL script with operations of a programmable clause, by deploying, instantiating, and/or calling BDL scripts that exists on a BDL or an 'on-chain'/'ion-ledger' library, by compiling programmable logic to a BDL (e.g. to virtual machine bytecode), or by other suitable applications of BDLs (as well as other similar databases and architectures). In addition, programmable clauses may have a related rules engine run on a BDL, or have the conclusions of a rules engine relating to the actions or operations of the clauses stored on a BDL. Alternatively, the state of programmable clauses may be updated on a peer-to-peer basis solely between the parties with only specific transactions recorded on a distributed ledger and more specifically a blockchain.

Thirdly, programmable clauses can be dynamic in nature; meaning that a programmable clause may change or update its state, or the state of another programmable clause and/or computable contract, in response to data, changes in other clauses, and/or other data-driven contracts. For example, a price clause may change its state in response to changes in temperature/humidity from edge computing devices if the price of a good is contingent upon weather conditions (e.g. a crop). These changes are preferably reflected through state updates appended to the COG. Another such example may involve credits/discounts being issued if performance requirements are not met (e.g. service credits in a Service Level Agreement). Contract state updates may take place continuously and in real time or near real time. The state of the logic may be changed/updated or data may be stored that is used by the logic of clause(s) to affect or otherwise reflect a change in state. Other appropriate methods may also be used.

Fourthly, programmable clauses give contracts a substantially 'self-managing' or at least partially 'self-managing' quality. This can be achieved at least in part by: (a) the 'dynamic' functionality; and (b) having both input and output to external and/or internal resources. For example, data input to a programmable clause from an edge computing device or API may update the contractual logic (or otherwise store data relating to a change) such as the grant of a discount/credit and this may output to another external system (e.g. an invoice on an accounting system). The result of this is that a contract may be essentially 'self-managing' in nature; both in respect of its state and updating/reconciling with external systems/resources.

Fifthly, programmable clauses may be connected to external services, systems, and/or applications used by either party, 'party-side'. This means that as an alternative or in addition to a computable contract responding to data that affects the state of the contract as between the parties, a party may connect an external system to a programmable clause (or group of programmable clauses or computable contracts) to perform operations that affect only that individual party. In this way the party can use the computable contract to drive systems relevant only to that party and independent of managing the contract. For example, a contracting party may connect to a currency hedging system to hedge currency exposure in real-time, or a business rules system to automatically perform actions in respect of the contract based upon pre-defined rules (e.g. if a price decreases to a given level then to order more of certain goods under a given contract, or to terminate—if termination is available—if minimum stock level metrics/conditions are exceeded based upon ERP or other appropriate data), or an accounting system to update ledger, revenue, invoice or other appropriate records.

As discussed, programmable clauses can be configured to interface with outside systems, applications, protocols, and platforms to drive other operations through various external integrations. External integrations may be used to establish data inputs or data outputs. Accordingly, the system and method may include data integrations 140 and/or BDL integrations 150 as shown in the exemplary contract management platform integration of FIG. 42.

Data integrations 140 may include integrations with data sources and/or destinations that may include, but are not limited to APIs, 'Internet of Things' ('IoT') platforms, 'edge computing devices' (e.g., sensors, actuators, RFID devices etc.), event sourcing and event processing systems/applications (including ESP/CEP systems), Enterprise Resource Planning (ERP) and Customer Relationship Management (CRM) software, business rules systems, other database architectures, other clauses within the contract, other computable contracts, and/or other accessible resources. In one exemplary implementation, a programmable clause can automatically update terms of the clause according to data from an IoT/edge computing device or service. In another exemplary implementation, a programmable clause may direct or be used to deliver data to an outside device, system, or service.

BDL integrations 150 can include integrations with one or more distributed ledger systems, blockchain systems, and/or other suitable mechanisms for consensus of replicated, shared, and synchronized data. BDL integrations 140 may be used for data output and/or input. A programmable clause could generate an output that is transacted on, or performs a transaction on, a BDL. Programmable clause could alternatively read data from a BDL as a data input. In addition to supporting BDL input and output, the BDL integrations 150 can support multiple types of BDL simultaneously from one contract. As an example of having multiple integrations, information retrievable through a BDL system can be monitored, and based on information of the BDL system, execution of the logic of a programmable clause can direct updating an external API endpoint based on the BDL system. In this way, BDL functionality used in combination with a computable contract can also be used to drive other external platform integrations, which may not be readily feasible in other consensus based BDL systems.

The execution environment 130 functions to manage processing and operation of the COG during formation and/or post-formation. The execution environment is preferably a decentralized execution environment so as to distribute trust from a single entity. A decentralized variation of the execution environment 130 can be a peer-to-peer network. The contract logic, state and/or updates to the contract draft can be maintained through the decentralized network. The execution environment 130 may alternatively use a centralized variation of the decentralized execution environment.

Figure 40:
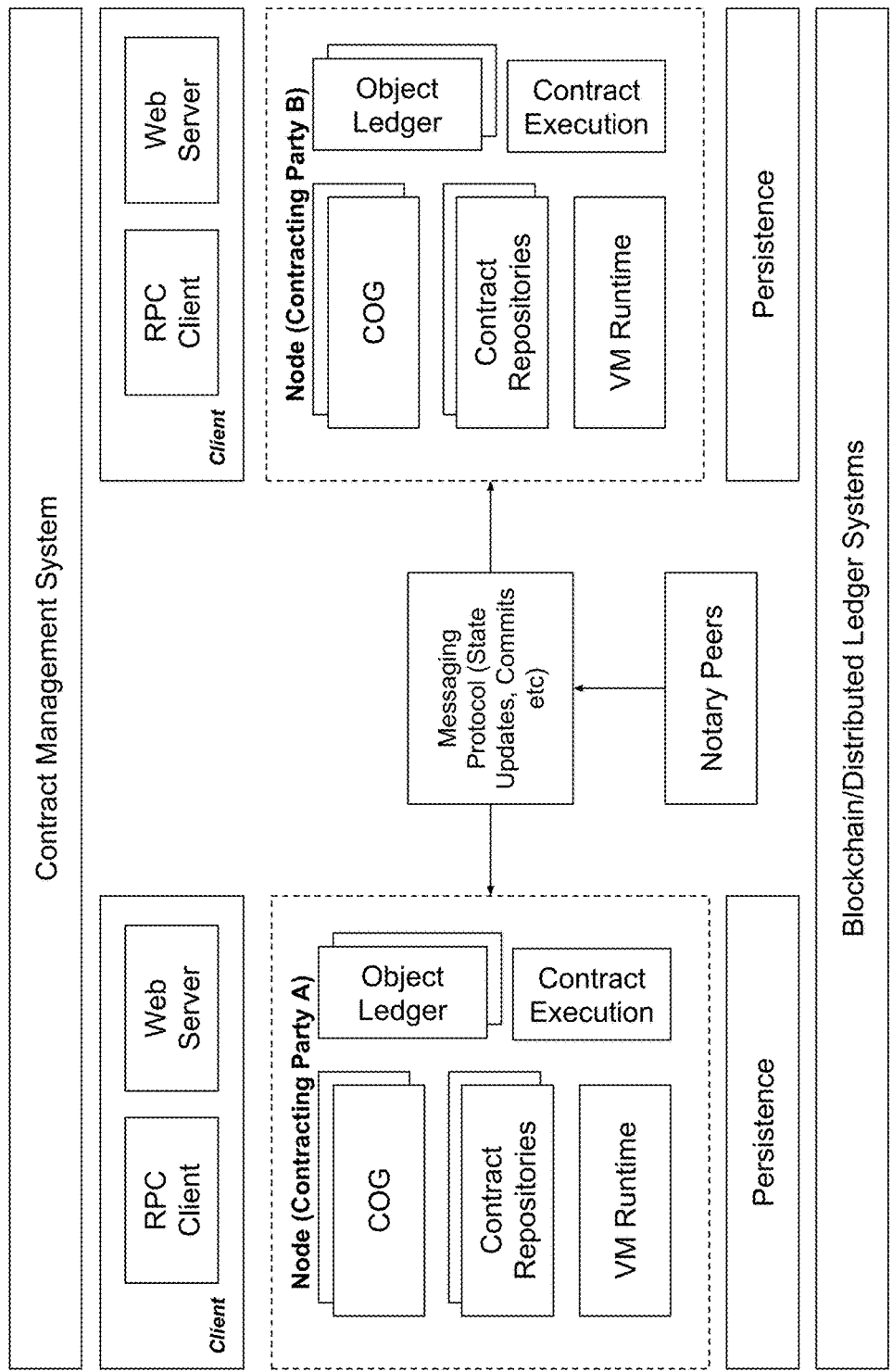
FIG. 40 is a schematic representation of an execution implementation variation.

Preferably, all involved parties should execute the contract logic in a standardized execution environment which may include but is not limited to: a virtual machine, communicatively connected servers/virtual machines, BDL system(s), a centralized server, cloud environment, container or series of containers, computing cluster, or any other appropriate execution environment or combination thereof. In a preferred implementation, the execution environment consists of a peer-to-peer network (and preferably an overlay network on top of the World Wide Web) where each user (e.g. a contracting party) that uses the system and method is a node on the network as depicted in FIG. 40. Multiple users may concurrently use the system and method across a plurality of contracts concurrently. Other node types such as notary nodes and server nodes (as stated herein) may also be used in embodiments.

In connection with the execution environment, the execution environment 130 can include a state transitioning engine that functions to establish consensus of updates to the COG and resolve conflicts. The State Transitioning Engine preferably provides a basis for a secure Conflict-Free Replicated Data Type (CRDT) structure, which can enable the COG to be replicated data across multiple computers in a network (e.g. locally or on a public network such as the internet); thereby facilitating distributed/peer-to-peer state sharing of contracts and data pertaining to contract performance and execution. The State Transitioning Engine may be updated either by: (a) the user signing the state update or (b) such updates being automated or substantially automated either by the State Transitioning Engine and/or the logic of the contract.

Areas of Applications

The system and method may be applied in various ways and for different application, which may provide a number of potential benefits. One potential benefit is that the execution, operation, history, and performance of a contract can be tracked and immutably stored throughout the contract lifecycle. A state update mechanism enables updates to the state of the contract (and, depending on the implementation, associated systems, documentation, and others) to be automated by data external to the contract (e.g. from edge computing devices, IoT platforms, APIs, databases, BDLs etc.), initiated by the contracting parties (either through manual interaction, rules systems, or otherwise) or a third party, and/or initiated by another resource/entity (e.g. 'on-chain'/'ion-ledger' "smart contract" scripts on a BDL). This may facilitate a 'real-time' or near 'real-time' state of a legal contract.

Figure 6:
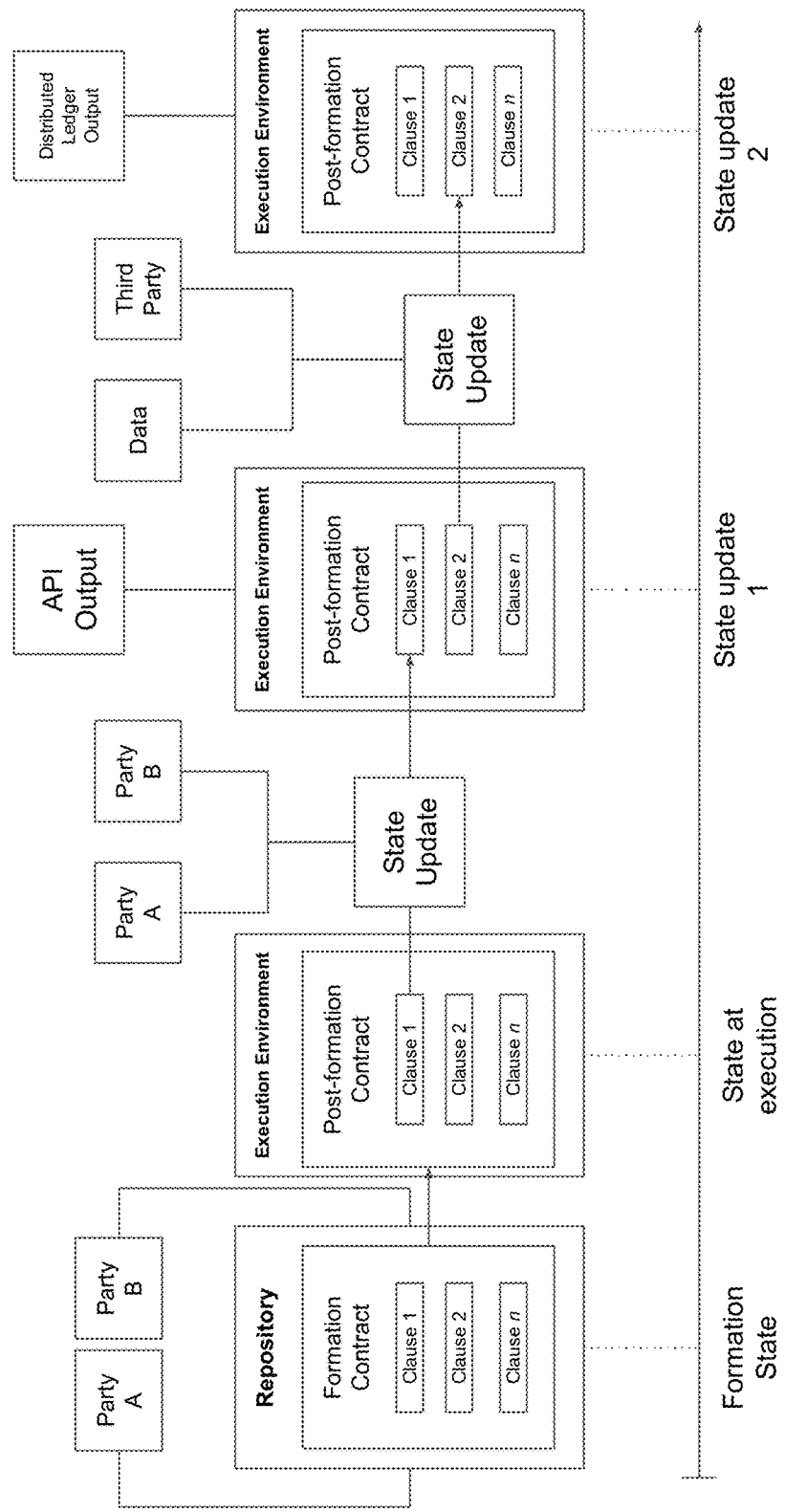
FIG. 6 is a high-level overview of the state of an exemplary contract from completed formation state through the post-formation stage.

Another potential benefit is that the system and method provides a common underlying data structure (see FIGS. 6 and 7) for computable contracts that is versioned, auditable, searchable, and replayable. In some variations using Merkle links as described below, the data structure can also be cryptographically immutable. This enables the contractual lifecycle to be entirely cryptographically secure—throughout negotiation to execution, performance, and completion/termination. One potential benefit is that the underlying data structure enables legal contracts and other documents to be securely and verifiably linked together. For example, contracts can be integrated with other contracts using the system and method through common object references or otherwise. This may facilitate inter-contract references at the formation stage as well as consistency and real-time updates between contracts (and/or other documentation that may use the system and method) at the post-formation stage. Similarly, the data structure may integrate with BDLs to the same qualities (see FIG. 8). The data structure may also be used to extend beyond the contract to manage workflows or other events that may pertain to the contract such as interfacing with an IoT device or platform, an API, or other external data resources and systems.

Furthermore, the system and method may be used to improve the workflow of contract management. For example, an update to the state of one contract may be used to notify parties of actions that should or may need to be taken on the same or other contracts, or on other systems or documentation (e.g. purchase orders, invoices, etc.). In one embodiment, the graph data structure may also be used to integrate with 'if-this-then-that' workflow or other management tools to automate actions (e.g. pushing data to external systems, providing notifications, etc.). Contract state may include dynamic contract variables that change according to contract logic can be used to drive other business logic and systems. For example, a pricing clause may dynamically define a price that can be used with an external billing/invoicing service or documents (e.g. through use of an Object Linking and Embedding (OLE) or similar framework).

Another potential benefit is that the state of the contract can be determined at any given point in history due to the combination of the contract data structure and state update mechanism, as all events, updates, transactions, operations, changes may be immutably stored—both internal to the contract and on external systems, applications, protocols etc. Therefore, parties may review the entire state of a contract and its administrative and/or other actions, and courts, arbitrators, and/or regulators may access to the history of the contract, where required.

Another potential benefit is that this data structure and execution environment enables legal contracts to be formed and executed in a peer-to-peer manner using the graph data structure as a versioning, record, and/or storage mechanism. The system and method may utilize a contract document representation that decomposes elements of a contract to object components that can be efficiently updated and/or processed through a peer-to-peer execution environment. Using a decentralized or distributed execution environment (such as a peer-to-peer network execution environment) enables parties to execute and store a contract without reliance upon a single controlling entity that may act as a point of failure. A single point of failure is potentially a crucial issue to overcome where contracts are computable and data-driven. Furthermore, the MDAG structure ensures that changes to the contract code, events and operations in the execution of the contract, and the record of its current and historical state cannot be altered, modified or tampered within an unverifiable/authorized manner without this being noticeable. Even where a peer-to-peer network or other distributed or decentralized execution environment is not used (e.g. a centralized server or wholly cloud-based implementation), the MDAG variation may have the benefit of reducing trust issues in the same.

The system and method may also provide a number of the benefits to the use of BDL technologies in legal contracts. Firstly, contracts may have native 'off-chain' cryptographic and state transitioning functionalities (i.e. of the contract itself and/or its formation and post-formation state) and may only need to interact with BDLs if, where, and when required, such as to perform 'on-chain'/'on-ledger' transactions, share state, share data/objects, use as a consensus mechanism, and the like. Such BDL integrations can be used when desired or beneficial to the contract and/or as part of a wider exercise/execution of a contractual agreement. In other words, contracts may be seen as hybrid 'on-chain'/'off-chain' contracts. Consequently, for legal contracts that may use "smart contract" scripts, BDLs integrations of the system and method may be more computationally efficient, scalable, and any privacy concerns of the use of "smart contract scripts" may be reduced or alleviated. Using a BDL independent data structure and protocol provides flexibility for the contracts. Contracts may also be more flexible and dynamic as execution computation can be performed 'off-chain'/'off-ledger' that may not be possible 'on-chain'/'on-ledger' and interact with multiple chains of the same or different protocols. Additionally, the code or logic of contract may be easier to amend where necessary. A computable contract managed and executed through the system and method can offer contracting parties the ability and option to not use a BDL(s) where, for example, it is not necessary for execution of the contract or if they elect not to. Where the parties do elect to use a BDL, the parties may elect the most suitable underlying protocol or protocols (e.g. if a contract is executed on, or otherwise uses, multiple different BDLs) for a given contract or contractual relationship. Additionally, multiple different types of BDLs may be used during execution of the same COG. In a variation utilizing an MDAG variation of the COG, the system and method can additionally enable them to interface with a BDL whilst maintaining a cryptographically secure relationship between input and output data, state changes, as well as integrations with BDLs on: i) an 'input' basis (i.e. drawing data into the data structure from BDLs) and ii) on an 'output' basis for specific external BDL-based architectures (e.g. where the BDL is used for computation of the contract logic such as through use of "smart contract" scripts, as stated herein). Secondly, depending on the protocol, 'on-chain'/'on-ledger' other "smart contract" scripts on BDLs may suffer from a lack of concurrency as each transaction may require a global lock on the database associated with a "smart contract" and transactions may have to be strictly totally ordered. In the system and method, use of the data structure can have transitions partially ordered. Thirdly, every participant/node on the BDL does not need to run or access all code and/or reach consensus as to the state of an entire BDL or entire state machine. By contrast, only the parties to the contract (or any other party so required) need to sign state updates (unless use of a consensus mechanism is required). A similar situation pertains to any inputs and outputs. Regarding inputs, external data does not necessarily have to be included in the chain/ledger to achieve consensus—this may, amongst others, improve privacy, increase speed, reduce chain/ledger bloating, and assist in creating more granular and dynamic contracts. Regarding outputs, multiple nodes would have to interact with an external resource (resulting in multiple calls and possibly multiple sets of returned data which may or may not be consistent) or one node would have to do so—therefore requiring parties to trust that particular node. Fourthly, states are cryptographically signed off, validated, transmitted, or shared between contracting parties and any authorized third parties without public computation or sharing with any third parties (unless otherwise required). Fifthly, it gives flexibility in the use of any underlying BDL protocol based upon the needs of a given contract, rather than potentially tying execution to one protocol or even one instantiation of a ledger. One or more BDLs of the same or differing protocols may be used in a given contract. This is in contrast to existing systems where the machine-readable contract data structure exists on the BDL. A related potential benefit is that the contract may, in this respect, add a form of interoperability between BDLs from a contract. Sixthly, contract computation may be separated from business/transaction logic so that the BDL may execute non-contractual logic, rather than the logic of the contract per se (e.g. via standardized 'on-chain'/'on-ledger' scripts that perform set functions/operations on the BDL). This may have the benefit of reducing ledger and contract code complexity, as well as improving privacy and performance as contractual logic and data may be kept between the parties and only exposed to the ledger/chain when necessary or beneficial to do so. Only exposing parts of the graph data structure (e.g. certain objects) to 'on-chain'/'on-ledger' code also assists in this regard. Seventhly, the underlying graph data structure may enable an end-to-end cryptographic environment in an MDAG variation of the system and method. A cryptographically immutable and verifiable flow in the contract and transaction management lifecycle through contract formation, execution, transactions (particularly where a BDL system is used) and analytics. For example, where a computable contract interacts with a distributed ledger, objects in the graph may be used to execute and/or be referenced in 'on-chain' transactions or records (e.g. by their hash, identifiers, metadata, etc.), calling code on a 'on-chain/on-ledger' library (or similar) similar to that defined in U.S. patent application Ser. No. 15/476,791, or passed to 'on-chain'/'on-ledger' code. This may have the additional benefit of enabling dynamism in the contract state itself and only passing data to 'on-chain'/'on-ledger' code or otherwise executing 'on-chain' (e.g. by compilation, calling 'on-chain'/'on-ledger' code etc.) as and when required. In one such view, the graph data structure may be seen as a cryptographically secure 'contract oracle' that provides contractual state to 'on-chain'/'on-ledger' code. In one variation, an 'on-chain'/'on-ledger' rules engine or library such as the one described in U.S. patent Ser. No. 15/476,791 may be used to store on-chain code, which may be called, deployed, or initiated using COG objects/data as mentioned herein. Eighthly, as contracts do not have to be executed 'on-chain', there is a potential benefit that parties themselves may not have to be 'on-chain' nodes/participants to be users of the system and method and/or the contract code to be used, deployed or otherwise exposed on a given BDL. This is particularly beneficial where a party to the contract may not be needed to be a participant/node of a given BDL or other system. For example, a BDL for logistics may integrate with the contract (e.g. in the manners presented herein) without the contracting parties being participants/nodes. Ninthly, the system and method may enable contract state/transitions to be 'undone' or 'rolled back' to a previous state by traversing the COG data structure. Transactions that occur on a BDL typically cannot themselves be reversed except where a new transaction is initiated to perform this function (depending upon the specification of the protocol). This obviously creates further issues in that the mere exposure of that data to participants of the BDL cannot be reversed, and relies upon other parties agreeing to and instantiating the reversal. The system and method may avoid or otherwise mitigate these issues. Finally, an implementation of the graph data structure may store more granular data and metadata about the state of a contract than a BDL could, could do in an economically viable manner, or that the parties would want to store 'on-chain'. All state transitions may be stored and this may be used in the contract logic and/or 'on-chain'/'ion-ledger' "smart contract" code For example, states that are not transactions or state changes that require a ledger, but are necessary to store to give a verifiable history or to compute the logic of the contract effectively (e.g. dynamic state calculations, computation of state such as compounding calculations, logic that requires recalling of prior states, etc.).

A related potential benefit is that a MDAG variation of the system and method may support objects that are Conflict-free Replicated Data Types (CRDTs). CRDTs may be beneficial to replicate data across peers in a network to achieve eventual consistency, such as in the peer-to-peer network execution environment stated herein. Where commutative replicated data types (CmRDTs) are used, this may operate in a manner similar to state machine replication used in BDL systems. A potential benefit of doing so is that the state of a contract may be replicated across peers in a manner that may, for example, be limited by state machine replication in a BDL system (e.g. by performance constraints).

Yet another potential benefit is that as legal contracts can be entities that are natively formed on a peer-to-peer basis between parties and are used to govern a relationship between those parties, the system and method may enable legal contracts to be formed and executed between the involved parties on a natively peer-to-peer basis, rather than using a centralized system or intermediary. The system and method—when used with a peer-to-peer networking protocol/execution environment or similar—removes a single point of failure; and reduces the trust that necessarily needs to be placed in a central entity to ensure that the contract, its state, history and the integrity of other data pertaining to the contract. By decentralizing and/or distributing the storage and execution of the contract between the parties, a MDAG variation may make it possible to provably ensure the integrity of the contract data whilst accessing obtains the benefits of accessing and managing it (e.g. milestones, obligations etc.) in a centralized manner—such as through a contract management system.

A further potential benefit is that the graph data structure may be queried or data may be otherwise extracted (e.g. when used in conjunction with a contract management system) to provide data and the base for descriptive, predictive, prescriptive, and any other appropriate form of analytics across pre- and post-execution of one or more contracts (see 'Analytics System' in FIG. 3). For example, the graph for each contract may be traversed and queried (e.g. via API or through use of a graph processing engine, or similar) to provide analytics such as causation (e.g. 'versioning' links) and other relationships between objects (which may be beneficial for contractual analytics, counterparty assessment, internal workflows, contractual enforcement and other reasons). Other examples may include (but are not limited to): negotiation analytics and modeling, execution analytics, assessing contractual performance, predictive analytics, modeling risk profiles, modeling event-based permutations, modeling exposure, and/or other forms of analytics. These forms of analytics can be performed for individual contracts but could additionally be performed across multiple contract instances (e.g., similar contract with different parties or contract options) and/or different contracts. Again, the attributes and benefits of the MDAG variation may assist in ensuring and/or improving the accuracy and integrity of those analytics.

Negotiation analytics and modeling can include analysis such as which clauses were most negotiated, how were clauses negotiated, which counterparties negotiated on certain clauses and how often, what are the negotiation trends, how the current state of a contract in negotiation would affect overall risk across contracts if certain events occurred, which terms and conditions would be most amenable or suitable for a particular counterparty, and the like.

Execution analytics can include analysis such as which clauses underwent state updates and why, which clauses were most updated with certain counterparties, and the like.

Assessing contractual performance can include analysis on economic performance (e.g. retained contract value, penalties, credits etc.), operational performance (e.g. delivery times), and/or other performance metrics.

Contract diagnostics can include using state data and updates to determine issues and improve performance, such as detecting and identifying operational issues that result in contractual events.

Predictive analytics can include analysis that generates a prediction of the likelihood of an event occurring—including their relative risk, and effect on other contracts—based on historical trends across a corpus of contracts or a given counterparty, in the contract's current state.

Modeling risk profiles, event-based permutations, and exposure can be performed across a group of contracts (including a chain of 'linked'/associated contracts e.g. master and sub-contracts, contracts that reference one another etc.). Such cross-contract analysis can be applied for modeling risk if a given event occurs, assist in determining sub-contractors to use to meet obligations under a master agreement to reduce risk, and applied in many other such applications. The state of a contract may be used to calculate possible permutations of the ways that a contract may execute based upon given events occurring. This may be extrapolated across contracts to provide risk modeling and assessment functions.

The graph data structure may, for this purpose, be used independently or in conjunction with other data sources, applications, resources such as IoT platforms, cognitive computing systems, ERP, CRM, IMS, proprietary data sets, and/or external e.g. weather data etc. This may assist in improving operations, efficiency of contracting relationships, which counterparties to select, which counterparties to select in certain conditions, what clauses/provisions to put into contracts in the future based on certain conditions etc.

Figure 9:
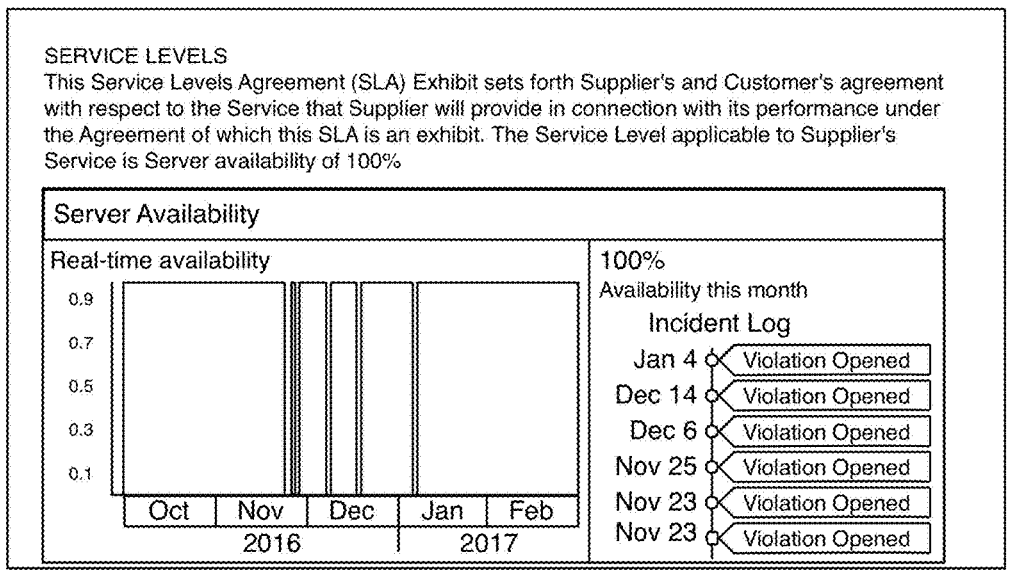
FIG. 9 is an exemplary screenshot representation of a contract management system interface displaying a state of part of a contract.
Figure 28:
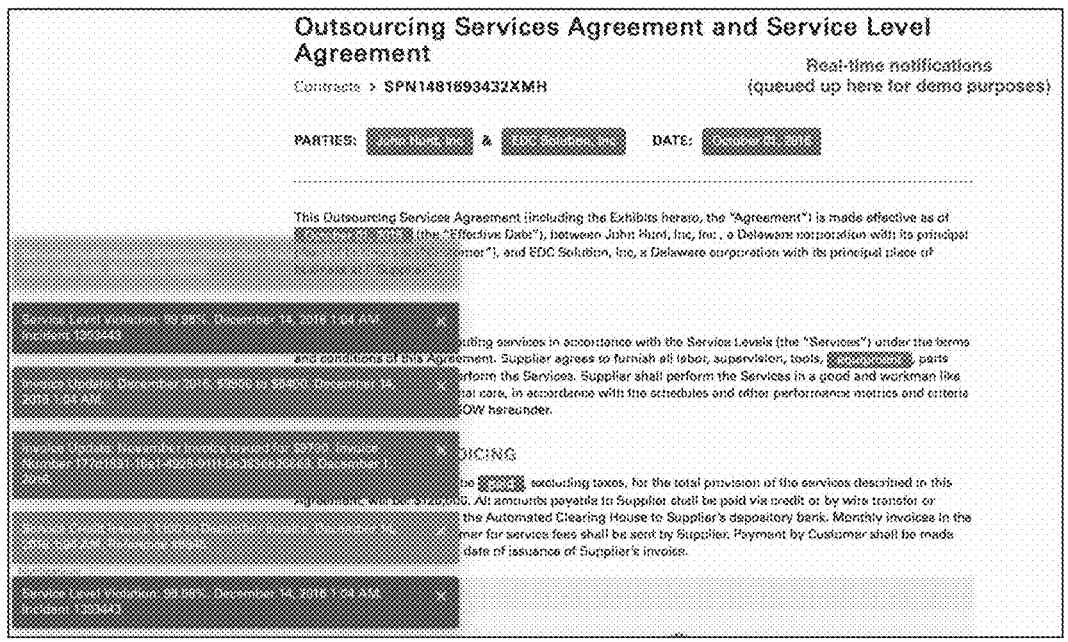
FIG. 28 is an exemplary graphic demonstrating notifications displayed when objects are added to the graph to display contractual events/operations.

A further such benefit is that the graph data structure may be queried or otherwise utilized to: (a) generate or display data visualizations, graphics, dashboards and other data metrics; (b) provide data feeds, chronological and filterable event feeds, notifications (as shown in exemplary FIGS. 9 and 28), transaction and event logs and other representations of state, potentially in real time or near real time; (c) display parameters and/or other data in a 'prose view' of a contract (as shown in exemplary FIG. 10)—in whole or in part—where appropriate (e.g. a 'price' object may be displayed in a contract that updates based upon the state of the graph).

Another potential benefit is that intra-contract links, such as dependencies between clauses or parts of clauses and other logic, can be set and specified in the logic in conjunction with the graph data structure. For example, common objects/logic in clauses may be referenced in a manner similar to the structure of traditional legal contracts, e.g. a reference to 'price' in one clause may draw this from the state of the 'price' object from another clause in the graph. This may be particularly beneficial for references and establishing links between clauses such as where the output or state of one clause is a determinant of the operation of another clause. In some variations, a contract can be part of a contract network formed wherein individual COGs are part of an interconnected COG. Being structured in such a way may also reduce the complexity of the logic of the contract, aid in the deduplication of objects, and more easily enable references between objects in the formation of the contract. The same may be extended to dependencies across contracts and/or other documents.

Yet another benefit is that the graph may be used in conjunction with API services or multiple API services to programmatically export salient data (e.g. objects, data from one or more objects) to external systems. For example, data may be output to an external system, which may be defined by API or other appropriate mechanism, upon certain conditions being satisfied, such as the state of certain objects, certain changes, transactions, timing etc. This may enable other applications to be updated or operations to be performed in real-time (e.g. accounting and invoicing systems, triggering of events on other systems/applications/APIs/platforms (e.g. messages, notifications, instantiation of workflows, operations based upon the state of the contract or part thereof).

A further potential benefit is that the system and method may enable potentially sensitive commercial information—to be concealed from other parties, whilst enabling the state of the contract to be verifiably updated. The MDAG variation of the system and method can support securely encrypting sensitive data and contents of a contract while the object nodes of the COG can still be executed and verified through a decentralized execution environment.

The system and method also may enable contracting parties to verifiably initiate and/or confirm updates to a contract that either: (a) are initiated or otherwise supported by external data and/or (b) state updates initiated by the contracting parties. The latter is beneficial to respond to subjective, indeterminate or unquantifiable state updates that cannot be appropriately achieved through the use of external data (e.g. whether an obligation is performed 'satisfactorily'). Similarly, third parties that may be involved in the performance of a contract, such as parties that may verify that obligations have been fulfilled—whether legally mandated, or assigned to do so under the contract.

Yet another potential benefit of the system and method is that events related to—but not pertaining to the discrete computation or execution of the substance of a contract—may be stored, associated with, linked to, data/state representing the execution of a contract (see 'Object Ledger Structures'). For example, the execution of an international supply contract between two parties may require data from other parties that is related to, but is not involved in the actual execution of the contractual state between the parties (e.g. letters of credit, check-in at customs, commercial and freight invoices, insurance documentation, packing lists, purchase orders etc.).

Other documents, including but not limited to, title documents, mortgage documents, trade finance documentation, invoices, quotations, insurance documentation, logistics documentation etc.), and the like may also benefit from the use of the system and method such cryptographic version control in an MDAG variation, whether related to contracts or otherwise. The system and method may be modified to accommodate any differences with these other forms of documentation.

2. COG Data Structure

The system and method includes a contract object graph data structure (i.e., a COG) to represent contracts and/or contract state. The graph data structure is preferably used in representing logic and/or state of a computable contract that may have data-driven functionality. The graph data structure may additionally or alternatively be usable with natural language clauses and contracts. The underlying graph data structure in some preferred embodiments is an MDAG. An MDAG is a DAG comprising of content-address objects with cryptographic links/edges connecting the components. The cryptographic link (i.e., a Merkle link) is a graph edge or reference made through a cryptographic hash of a contents of a target object that can be embedded in that of a source object. In some implementations the object identifier (e.g., a universally unique identifier (UUID)) can have Merkle links between relevant data objects. Other Merkle tree structures, hash tree, or other graph structures may alternatively be used with the graph data structure. In a Merkle tree every non-leaf node of the graph preferably includes a hash (i.e., Merkle link) of at least part of the contents of connected child nodes.

Figure 7:
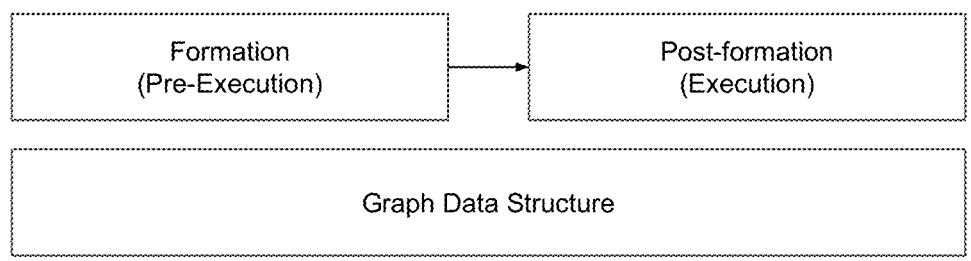
FIG. 7 is a schematic depicting the 'formation' and 'post-formation' state of the contract sitting on a common graph data structure.
Figure 8:
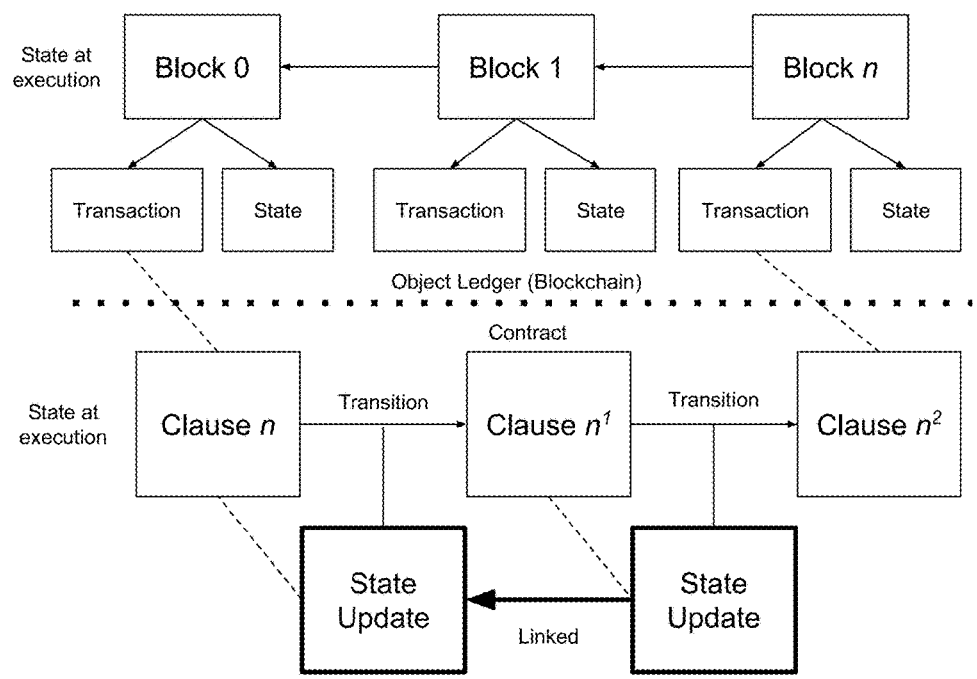
FIG. 8 is an exemplary schematic of the execution of a clause in a contract on a blockchain data structure.

The graph data structure may include or be used in combination with a versioning system. In one implementation, the versioning system can include two contract versioning systems that each respectively manages versioning the formation stage and post-formation/execution stage as shown in FIG. 7. Either or both of these two versioning systems may be used in any given implementation of the system and method. The formation versioning system sets, or otherwise stores, the state of the contract for execution. The post-formation versioning system represents/stores the state of the contract in the execution phase (i.e. after the contract has been formed and executed). The former enables parties to version and agree upon the state of a computable contract for execution. The latter provides the data structure that represents the state of the contract at any given point in its execution (e.g. events, updates, changes, transactions, operations (and any other appropriate entity) that occurs by operation of the contract or may otherwise be related to the contract. A unified versioning system or any suitable versioning system architecture may alternatively be used.

The graph data structure preferably consists of nodes of various object types and links/edges connecting those nodes. These objects components relate to the state of the contract—including (but not limited to): natural language content, executable code, metadata relating to contractual, and other events, transactions, and operations, and the current state of the contract. The nature of the system and method is to allow any type of object to be stored in the graph.

Figure 11:
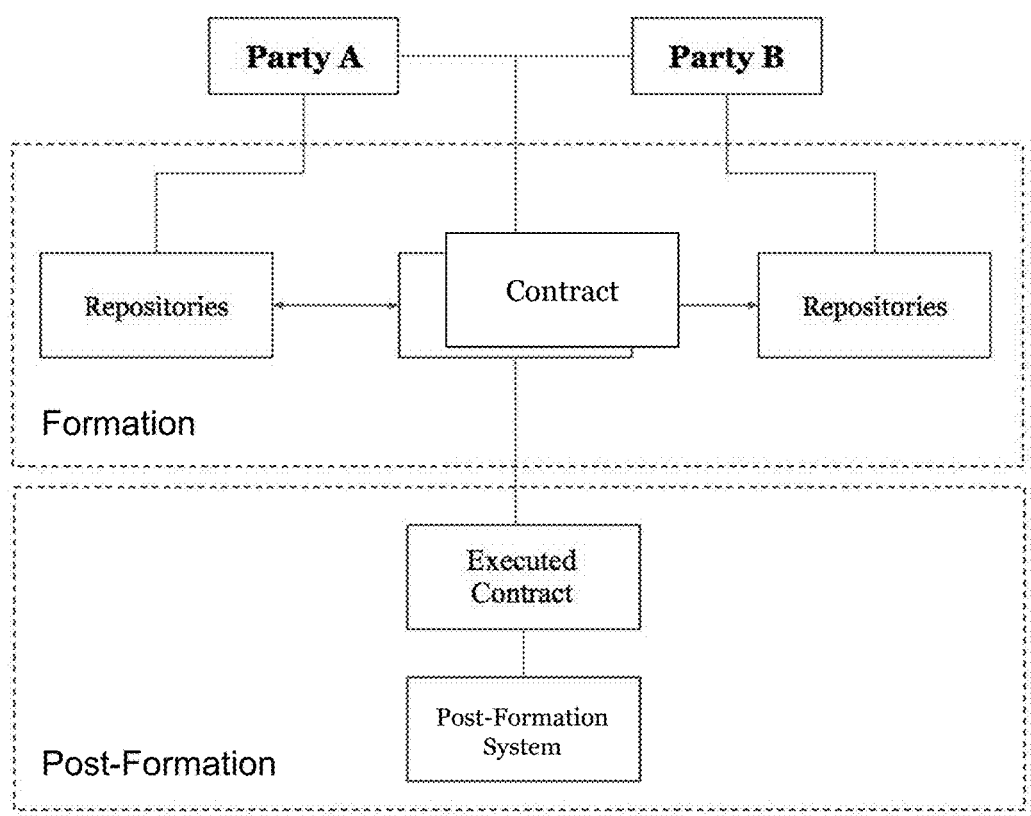
FIG. 11 is a schematic representation of an exemplary interaction between a series of repositories and the formation system.

Objects may be stored in any suitable datastore which may depend on the versioning system and/or execution environment in which it is used. Storage may be centralized, distributed, federated, or fully decentralized and replicated, or take any other appropriate form. In one preferred embodiment, data for each contract is stored in a repository for that contract as shown in FIGS. 11 and 12. Alternatively, objects may be stored in a graph database or other form of datastore. The datastore may be local, cloud-based, distributed, or a hybrid. In another preferred embodiment using peer-to-peer networking functionality each party (or peer) can hold a copy of the graph and the contract can be replicated between them as shown in FIG. 40. In one variation where a peer-to-peer networking protocol is used, the object content may be stored separately to the graph data structure (i.e., a property graph paradigm is not used), which can function to allow the latter to act as a form of versioning system for the externally stored objects. This may assist where not all objects are to be shared or accessible by all contracting parties. In one variation of the system and method, only certain objects may be accessible by certain parties (e.g. certain events may be only accessible to a given party or shared with given parties). Storing the objects separately may assist with this. This may be used in conjunction with other methods of obfuscating or limiting access such as encryption. The purpose of doing so is to avoid potentially sensitive data or metadata being accessed or known by parties that do not require this data. In another variation, this data may not be added to the graph data structure but stored separately in a manner accessible only by the party in question (e.g. updates by the contract to that party's systems). In this variation, operation of the system and method can include storing object content external to the graph, where an object of the graph references the object content. A cryptographic hash of the object content may additionally be stored in the graph. The object content can be stored in a storage mechanism accessible only by the permitted parties and not shared with other parties.

In a preferred embodiment, the system and method may support types of object components including the formation object types of clause objects, section objects, and commit objects and the post-formation object types of amendment objects, state update objects, event objects, and transaction objects. Other object types may be used alternatively or additionally.

A clause object is an object that can be introduced in the formation of the contract that defines a portion of content and logic of a contract. A clause object may or may not correspond to a discrete or similar clause structure to those used in natural language contracts. For example, multiple clause objects may be used for the equivalent logic in a natural language contract. Clause objects may include machine-readable/executable code, natural language, and/or a hybrid of content. In a preferable embodiment, clause logic can be composed of a series of atomic objects. Herein, clause objects are more concisely referred to as clauses except where more specifically noted.

A section object used in the formation of the contract that is an organization object that can include connections to a group of clause objects that may be arranged under the section object. The section object similarly may or may not correspond to a section of a traditional section of a natural language contract. There may be multiple layers of section objects in the graph.

A commit object is an object used in the formation of the contract that defines changes to the formation state of the contract logic. A commit object type within the graph may represent the process of making changes made to the state of the contract logic (i.e. executable code and/or natural language) of a contract.

An amendment object is an object type used in post-formation of the contract that defines changes to the post-formation state of the contract logic. An amendment object type may be used to modify, update, or otherwise change the state of the contract logic and/or the state of the objects added in the post-formation phase to the graph. In some variations, the commit object and amendment objects can be the same type, differentiated by the formation stage. In one implementation, an amendment object may be used to change the state of a contract by 'overriding' or otherwise updating the state of a contract, whilst maintaining the integrity/audibility qualities of the contract and the graph structure by not removing or amending the object that is needing to be updated, changed, or modified. Amendment objects and commit objects could alternatively be the same object type.

A state update object is an object type used in after formation of the contract that stores the current post-formation state of the contract without amending the logic of the contract itself. The state update clause preferably reflects changes in variables or data integrated with the contract. For example, if the logic of the contract reduces the price in a payment clause because of a given event (whether within the clause comprising the 'price' object or not) such as a state update (e.g. from a party or data resource), the current/updated state of the 'price' object may be stored as a node in the graph, which may be linked to prior states of that object and/or the original formation object state (where applicable).

An event object is an object type that can record post-formation events that occur in respect of the contract that may or may not update the state of the contract/COG. For example, event objects may be used to record outputs from the contract to external systems (e.g. update of a price to an invoice on an external system, via an API etc.); transactions that occur on BDLs; and/or inputs to the contract from external resources, the contracting parties, and/or third parties. Event objects may, in a preferred embodiment, be broadly categorized as either 'modifying' or 'non-modifying'. A modifying event object may update the state of the contract/COG. A non-modifying event object may record an event (e.g., a party fulfilling some obligation) but without changing the state of the contract/COG. In a given implementation, events may be broken down into sub-categories.

A transaction object is an object type used in after formation of the contract that can record operations/actions performed on external systems, BDLs, APIs and any other appropriate system/application that perform transactions. In some variations, transaction objects may be a sub-type of event objects or may be the same type of object.

Any or all may be used in a given implementation. Additional and/or alternative types may be used. Some variations may use more generic/universal object types that do not adhere to the type assignments described above. Alternatively, other implementations may use more highly specific object types. In one example, groups of blobs (Binary Large Objects) or natural language objects may be used and linked together to model natural language prose in a contract. This enables contracts to be a combination of natural language and code. A static or natural language object type may be used for non-computable content used in reproducing a natural language/human accessible contract in or from the graph data structure. The data structure can be arbitrarily many levels deep, hence creating any complexity of contract needed. Blobs may also be useful for framing a contract or clause with natural language, including natural language within a clause, and/or enabling the code elements to be parameters within natural language.

The storage of the objects, the COG, and/or other elements of the system and method may be physically located anywhere. Storage may be centralized, distributed, federated, or fully decentralized and replicated, or take any other appropriate form. Preferably, all involved parties should execute the contract logic in a standardized execution environment which may include but is not limited to: a virtual machine, communicatively connected servers/virtual machines, BDL system(s), a centralized server, cloud environment, container or series of containers, computing cluster, or any other appropriate execution environment or combination thereof. Preferably, the execution environment consists of a peer-to-peer network (and preferably an overlay network on top of the World Wide Web) where each user (e.g. a contracting party) that uses the system and method is a node on the network and runs a client in a preferred form as depicted in FIG. 40. Multiple users may concurrently use the system and method across a plurality of contracts concurrently.

Contract Data Structure

Figure 13:
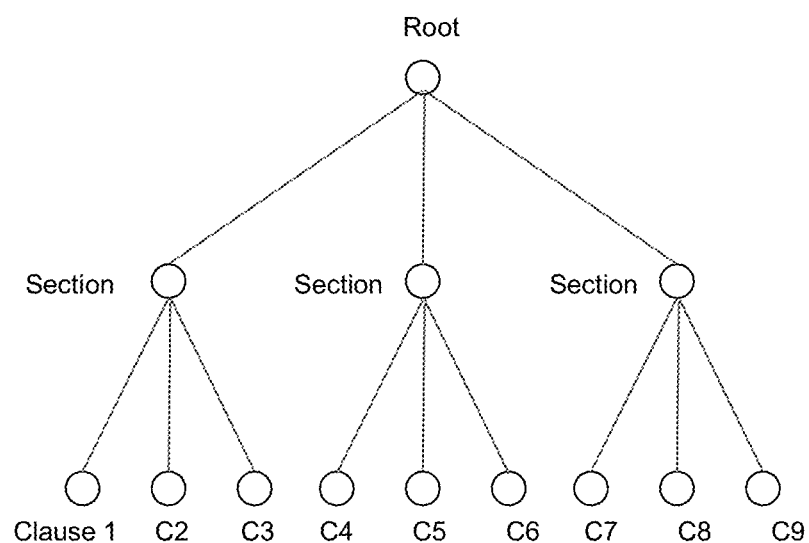
FIG. 13 is a basic exemplary contract structure.

In a preferred embodiment, contracts are comprised of clauses structured in a tree format as shown in the exemplary FIG. 13. Other topologies/structures may be used. Clauses may be further broken down into atomic objects. Functionally, one may think of atomic objects as Content Centric Networked (CCN) packets containing unchangeable parameters. The set of these parameters may represent a clause. Alternative clause structures may additionally or alternatively be used. A clause may represent any portion of the logic (e.g. a code snippet or class) of a computable contract including (but not limited to): party information, definitions, party terms, conditions, obligations, business processes, data input and output, data evaluation, computational processes, workflow logic etc. Hence, it may not, and need not, correspond directly to the typical content and/or structure of a natural language clause or legal contract. However, at least a portion of the code should relate to the obligations, terms, or conditions between one or more parties. Clauses are preferably modular components capable of re-use between contracts. A clause may be machine-readable code, natural language, or a hybrid as described in U.S. patent application Ser. No. 15/476,791. Machine-readable/executable code may reference, use, be linked to, call or have any other relationship with machine-readable/executable code instantiated on a platform, system, protocol, or resource that is external to the contract (e.g. "smart contract" code on a BDL). A contract may be composed of clauses of a multiplicity of types and forms.

Clauses embody the natural language and/or computational logic of the contract, which may be of any arbitrary algorithmic complexity. Any structure of the contract may be used. Typically, clauses may consist of at least two generalized data types: logic and variables.

Logic of a clause can be human readable text, just as traditional legal contracts, as well as machine-readable/executable executable code (including, but not limited to, high-level languages, domain specific languages, "smart contract" scripts/code on BDLs or similar, low level languages, bytecode, machine code, or any other form) that embody the programmable contract logic and may include input/output interfaces with external resources (e.g., BDLs, Customer Relationship Management systems, Enterprise Resource Planning systems, databases, web service APIs, Complex Event Processing and event sourcing systems, and any other appropriate resource).

Variables can be data types that represent something other than itself (e.g. a reference to a common object referenced in another clause). Variables can be dynamic elements that either are used in the logic of a contract or can be altered by logic of a clause. A standard example may be: "Effective Date", "Recipient", and "Company" that all are defined in the contract. In later parts of the contract the logic continues to refer to the specific dates, and legal entities by their representative names such as "Effective Date", "Recipient", and "Company".

Different clauses may use the same atomic objects as input. This is done both for data efficiency/deduplication purposes, as well as for inter-clause communication and defining relationships and dependencies. Through this design preferably no data communication layer between the clauses needs to be established as all communication happens through the storage medium and the atomic objects themselves. This, combined with the inherent versioning of all objects in the system, makes is also possible to 'replay' the entire history of all changes, not just of the contract and contract output, but also all input.

Objects are, preferably, immutable, persistent, and/or atomic. Path naming may be implemented by using the MDAG structure. Contracts may also be structured in nontraditional topologies. Links may also be established between objects across multiple contracts, other documents, and/or resources.

The contract data structure preferably functions as a key-value atomic object store that sits on top of an underlying MDAG. Objects may represent the logic of a contract in any suitable way. Alternative representations of the contract may also be used.

Exemplary Object Forms

The following outlines exemplary and non-limiting object forms and structures that may be used in the system and method. Any appropriate object types, structures, or forms may be used in a given implementation.

In one implementation, contracts are preferably a large set composed of smaller sets of clauses, which then are composed of smaller sets of atomic objects. Accordingly, one implementation may compile object components of a contract document using the object types of atomic objects, clause objects, section objects, and link objects. Other structures and formations may be used.

Atomic Object: An atomic object may be represented/identified in any suitable manner and with any suitable fields and tuple, but is preferably represented by the tuple (UUID, type, value, date_created, created_by, times_referenced). A contract document can be converted to a set and organization of atomic object components to represent the contents of the contract.

An exemplary collection of objects may be defined as in the listing of an exemplary part of an example programmable clause:

The value property is the value of the type stored. For example, if we are evaluating whether a clause is valid or action is to be taken if a sensor temperature is above 10 degrees Celsius, then the external pointer may be an IoT/API endpoint or a transaction/record on a BDL, for example, that provides data pertaining to a temperature feed, the operator may be the larger than sign, with an accompanying value.

The date_created property is the date and time when the specific atomic object was created.

The created_by property is the address/identifier of the user, account, or entity that created this atomic object. This may be any suitable identifier such as a cryptographic signature (PGP, public key etc.), user account or identifier on a platform (e.g., an accompanying contract management system or third party platform or protocol e.g. a BDL-based identity application/system, OAuth etc.).

The times_referenced property is a record of the number of times this atomic object is referenced. Note that this object may be referenced by multiple atomic sets and/or clauses.

Additional, upgraded, or alternative data types may be used. Other field data and metadata may be added. For example, an IP address record may be added to the 'created_by' field as an additional mechanism of identifying a user in addition to other mechanisms of identification). Examples are non-exhaustive and non-limiting.

Atomic Object Ordered Set: An atomic object ordered set may be an alternative object type used to represent a grouping of atomic objects. This may be used in any suitable form, structure, and with any suitable tuple. Where used it is

```
{"UUID": "0abc7137cdb5f645221a42ff6e73d203e253230b",
    "type": "External Pointer"
    "value": "http://api.openweathermap.org/data/2.5/weather?q=new%20york",
    "date_created": "1482064463",
    "times_referenced": 25}
{"UUID": "0z4fgdg44fdb5f645221a42ff6e73d203e253230b",
    "type": "External Pointer"
    "value":
"https://etherscan.io/tx/0x7d936fda62e9ce34041aa7e6d77da0ce1447763d5d85c0eba5
24b974e446937f",
    "date_created": "1483456463",
    "times_referenced": 21}
{"UUID": "d926d317dcd052024439b61a553c3ed6fe631b41",
    "type": "Operator"
    "value": ">",
    "date_created": "1482064635",
    "times_referenced": 2034}
{"UUID": "06e7519e401bc8658db52ebfc427953c88ad2e78",
    "type": "Value"
    "value": "24",
    "date_created": "1481891663",
    "times_referenced": 74}
```

The UUID property can be used to identify an object. This may take any suitable form or structure. In a preferred embodiment, that form is a cryptographic hash. For example, the hash of the combination of type, value, date_created and created_by of the atomic object. Therefore, UUID=h(concatenation(type, value, date_created, created_by)), where h(x) is the hashing function. The bit length depends on the hashing function used (SHA-2, SHA256, etc.). The times referenced is left out of the hashing function, as the same atomic object may be referenced by another clause and this would lead to the modification of the hashes in the other clauses that also reference this object.

The type property can denote the type of data that may be stored as an atomic object such as, but not limited to, operators, external pointers, values etc. Types may be upgradeable and extendable.

preferably represented by the tuple (UUID, atomic_object_UUID, order, clause_object_UUID). An atomic_object_UUID property is preferably a reference to the atomic_object. An order property can be an integer number representing the order of the specific Atomic Object in the ordered set. The UUID property in this variation is preferably the hash of the combination of the UUID of the Atomic Object and the order of the specific object. UUID=h(concatenation(Atomic_Object_UUID,order)). The clause_object_UUID property is preferably the ID of the clause that contains the ordered set.

An indicative example of an atomic ordered set may be as such:

```
{
  "UUID": "b80f8a0010f2c29d9635bddc749273f725bc5851",
  "Atomic_Object_UUID": "0abc7137cdb5f645221a42ff6e73d203e253230b",
  "order": "1",
  "clause_object_UUID": "2538550c72e3eba6e8ec3581a08d44b3bdaa8df4"
}
{
  "UUID": "f6350827d8d3872102124245fac1106febedc2ab",
  "Atomic_Object_UUID": "d926d317dcd052024439b61a553c3ed6fe631b41",
  "order": "2",
  "clause_object_UUID": "2538550c72e3eba6e8ec3581a08d44b3bdaa8df4"
}
{
  "UUID": "136add5d022d6410277aaa728a437ab5c42599be",
  "Atomic_Object_UUID": "06e7519e401bc8658db52ebfc427953c88ad2e78",
  "order": "3",
  "clause_object_UUID": "2538550c72e3eba6e8ec3581a08d44b3bdaa8df4"
}
```

Additional, upgraded, or alternative data types may be used. Other field data and metadata may be added. Other implementations, structures, approaches, fields, tuples, may be used.

Clause Object: A clause object is an object that represents part of the contract logic (e.g. a programmable clause or part thereof). A clause object may represent any such proportion of the contract or any portion of logic that relates to the contract but does not relate to the agreement between the contracting parties, as discussed herein. Clause logic may exist as 'on-chain'/'on-ledger' distributed ledger "smart contract" code, compile to the virtual machine bytecode of a BDL system (were applicable) or interact with an Application Binary Interface (ABI) of a BDL system to perform 'on-chain'/'on-ledger' operations, or otherwise interact with BDLs or similar. The 'on-chain'/'on-ledger' interaction may be related to the execution of a contractual clause, part of the contract, or may be otherwise related to the contract but not related to the performance of a contractual term, condition, or obligation (e.g. passing data to a BDL, permissioning the transfer of assets but not the transfer directly, etc.).

A clause object is preferably composed of atomic objects. It is preferably arranged in a Merkle tree of objects within the graph data structure. A clause may be viewed as a form of sub-program in the context of a computable contract; particularly as clauses may interface with one another as described herein. A clause object may, be represented by the tuple (UUID, object_type, content, date_created, created_by, times_referenced). Other, alternative, and additional fields and alternative representation approaches and structures may be used.

Universally unique identifier is preferably the cryptographic hash of the combination of the object_type, content, date_created, created_by, times_referenced). UUID=h(concatenation(object_type,content,date_created,created_by, times_reference d)). The object_type and other properties are preferably substantially similar to the corresponding properties described above.

An example clause object may be:

```
{
  "UUID": "2538550c72e3eba6e8ec3581a08d44b3bdaa8df4",
  "object_type": "Clause",
  "name": "Shipping Conditions - Temperature",
  "date_created": "1481430132",
  "created_by": "1Fv4mBbCmQ7cEhGdRns6r4pPh12UyEcEWG",
  "times_referenced":5
}
```

Additional, upgraded, or alternative data types may be used. Other field data, types, and metadata may be added. Other implementations, structures, approaches, fields, tuples, may be used.

Figure 14:
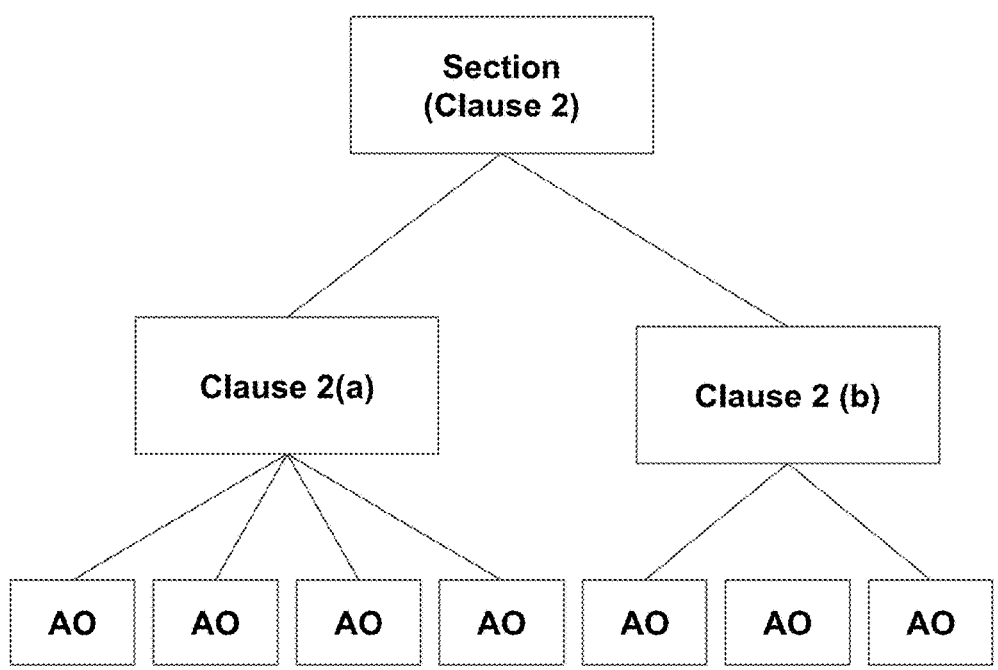
FIG. 14 depicts an exemplary representation of a relationship between atomic objects, clause objects, and a section object.
Figure 15:
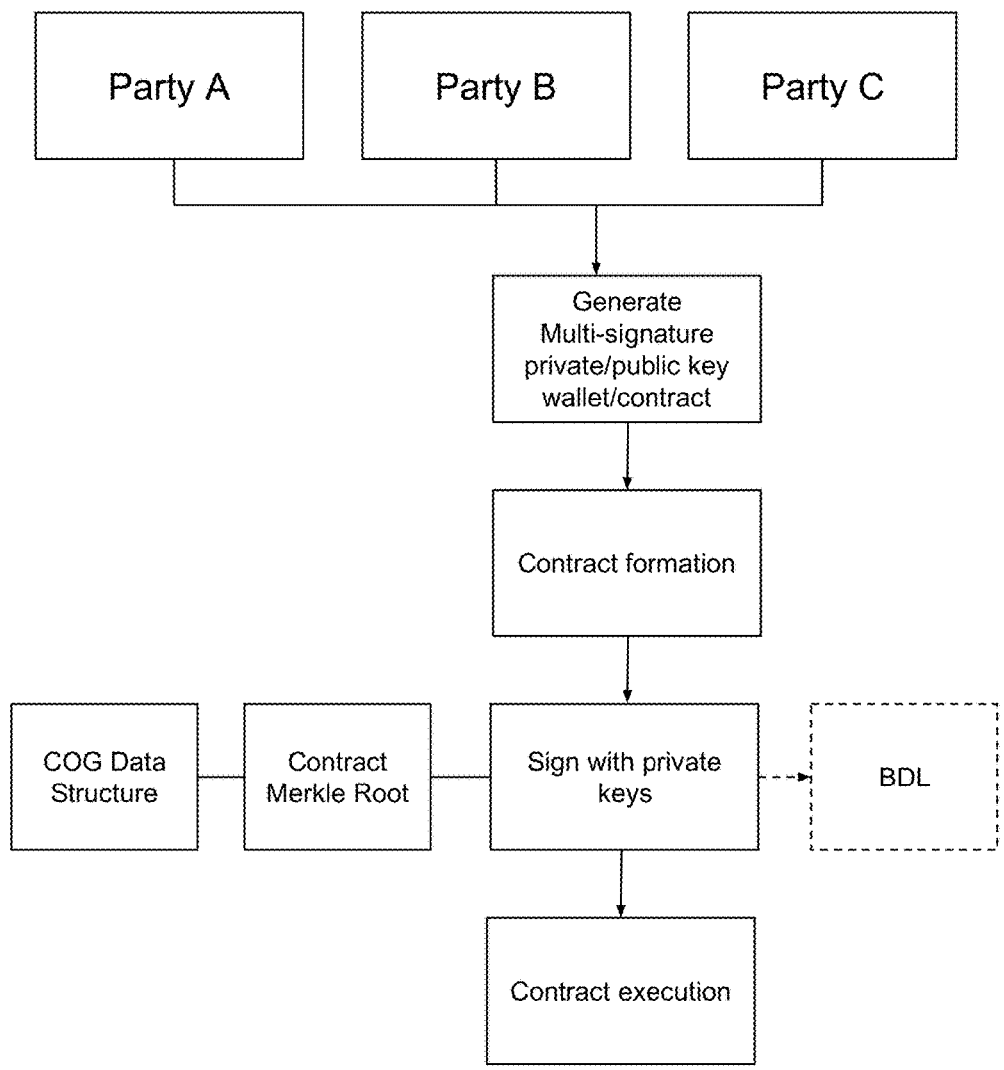
FIG. 15 is a schematic depicting one exemplary form of contract execution using a multi-signature process.

Section Object: Section objects are a collection of clauses and/or other sections and/or links to clauses and other sections (as shown in the exemplary FIG. 14). Section objects may be used for a multiplicity of purposes, including to provide structure to contracts, clauses, and atomic objects, e.g. by linking clauses in a given topology that represents a clause and/or contractual topology. Multiple section objects may be used in a given implementation e.g. a section to link clauses together—such as to represent a larger clause (this may, for example, also include a Clause Ordered Set)—and a section to link these sets of clauses to other clause objects. Any appropriate depth or levels of section objects may be used in a given implementation.

A simple exemplary section object format may be:

```
{"data": ["clause", "clause", "clause", "clause"],
"links": [
  { "hash":
    "ea72c79594296e45b8c2a296644d988581f58cfac6601d122ed0a8bd7c02e8bf",
    "name": "clause2", "size": 189458 },
  { "hash":
    "246d38b2742f8400dfd14355c0f1cebe52a8ce4185cf0643844a4bbf7e623aec",
    "name": "clause2(1)", "size": 19441 },
  { "hash":
    "7f00bc9ee3f38c9ff5363dbe44e83bf00436d1b9c071ec4fee5fd5dbb1a743af",
    "name": "clause2(2)", "size": 4567 }
  { "hash":
    "002688cc350a5333a87fa622eacec626c3d1c0ebf9f3793de3885fa254d7e393",
    "name": "clause2(3)", "size": 5286 }
]}
```

```
var data = [
["clause", "clause", "clause", "clause"],
[ "links", [
["hash",
"ea72c79594296e45b8c2a296644d988581f58cfac6601d122ed0a8bd7c02e8bf",
"name", "clause2",
"size", 189458],
["hash",
"246d38b2742f8400dfd14355c0f1cebe52a8ce4185cf0643844a4bbf7e623aec",
"name", "clause2(1)",
"size", 19441],
["hash",
"7f00bc9ee3f38c9ff5363dbe44e83bf00436d1b9c071ec4fee5fd5dbb1a743af",
"name", "clause2(2)",
"size", 4567 ],
["hash",
"002688cc350a5333a87fa622eacec626c3d1c0ebf9f3793de3885fa254d7e393",
"name", "clause2(3)",
"size", 5286]
]]];
```

Additional, upgraded, or alternative data types may be used. Other field data, types, and metadata may be added. Other implementations, structures, approaches, fields, tuples, may be used.

Link Object: The graph may also consist of links (graph edge) structures to other objects, which may include the following fields: the UUID of the link; the UUID of the linked object; and the type of link. In a preferred embodiment, at least three types of link may exist: a dependency link; a versioning link; a relationship link; and/or a metadata link relating to the link.

Links may be addressed by their UUID. In an MDAG variation, these may be Merkle links.

Types specify the type of link between two or more objects. Types are preferably JSON objects within the link object. Types are upgradeable and more types can be added. Alternative structures and methods of type labeling or specification may be used.

A dependency link type may be used, which preferably represents a dependency link, meaning that the linked objects serves as a logical input to the Merkle root object of the target/linked object or other relationship between objects in the graph (e.g. one object is an input to another, such as a 'temperature' object in one clause being an input to a 'pricing' or 'warranty' clause).

A version link type may be used, which preferably represents a link to a prior version of an object within the graph. An example would be a prior version of an object within a contract, linking to a new version of the object. Other versioning relationships or approaches may be used alternatively or in combination. A versioning link therefore implies that the Merkle link between the two or more objects represents a change in version of that object. A versioning link may be used to create the edge on the graph representing an 'update' between the existing/previous state and the updated/new state of an object. The versioning may occur in the formation (e.g. where the contract is negotiated) or post-formation state of the contract (e.g. if the logic of the contract is amended after execution or the state of the contract changes by reason of its execution, such as a price is decreased as a result of an event or update occurring, such as temperature increasing beyond a permitted threshold as defined by the logic). A versioning link may exist between any objects in the graph (e.g. between atomic objects, between clause objects, between section objects) and may include a commit and/or state update object defining the link and the update. Versioning may occur at multiple levels or just one level, depending upon a given implementation (e.g. a change in an atomic object may create a link between the atomic objects, between the clauses of which they may be a constituent component).

A relationship link type preferably represents a relationship between two or more objects. Relationship links may be used where an object is added to the graph that does not represent a link indicating a change in state of an object (and therefore is not suited to a versioning link) by an action, operation or event that occurs by operation of the contractual logic or otherwise, e.g. between an event object and a clause object representing a transaction or action that occurred on a BDL or API (such as a payment being initiated, an update on an external system (e.g. an invoice or purchase order, credit note etc.), a notification being sent to a particular system/application, relationship between 'on-chain'/'on-ledger' code and the graph, between 'on-chain'/'on-ledger' object(s) and the graph, etc.).

The metadata link can be used for associating metadata such as the time of creation of the link, data relating to the nature of, and/or reason for the link. Association to metadata may be particularly beneficial if it is not provided by other objects in the graph, such as where a state update or event object is not used/appropriate in a given implementation, then this metadata on the link between two objects may provide that in lieu of the update/event object.

Commit Object: Commit objects preferably include metadata, which may include (but is not limited to) the Merkle root that represents the state of the contract at the time of the commit; the UUID of the previous state of the object; and details of the contracting party that performed the commit, including a timestamp and cryptographic signature of the submitting party. Additional metadata may be added in a given implementation Other forms of metadata can include comments to describe the change/commit submitted by a contracting party, such as "amending unit price in clause 3.2 to $1000 from $900", differences between commits such as clauses added/removed/edited, party IP addresses, public identifiers/cryptographic keys of the party submitting the changeset, and/or other suitable forms of metadata.

A simple exemplary commit object format may be as follows:

```
{
"data": {
  "type": "commit",
  "date": "2014-09-20 12:44:06Z",
  "message": "Clause 2(1) price amendment submitted."
},
"links": [{"UUID": "",
"name": "parent", "size": 25309 },
{ "hash": "", "name": "object", "size": 5198 },
{ "hash": "", "name": "author", "size": 109 }
]}
Var data = [[
"type", "commit",
"date", "2014-09-20 12,44,06Z",
"message", "Clause 2(1) price amendment submitted."
],
"links", [
[ "UUID", "", "name", "object", "size", 5198 ],
[ "UUID", "", "name", "author", "size", 109 ]
]];
```

Additional and/or alternative objects types relating to amendments may also be stored in the graph data structure.

Additional, upgraded, or alternative data types may be used. Other field data, link types, and metadata may be used or added. Other implementations, structures, approaches, fields, tuples, may be used.

Updating COGs

Contracts may be amended, changed, versioned, or updated in either the formation or post-formation stage.

During a formation stage, a contract may be changed by adding, deleting, or otherwise amending the state of the objects that comprise the COG in its formation state prior to execution. This may be seen as analogous to the negotiation of a traditional natural language legal contract. Commit objects may be stored in the graph to record additions or amendments to the contract in the formation stage.

Figure 41:
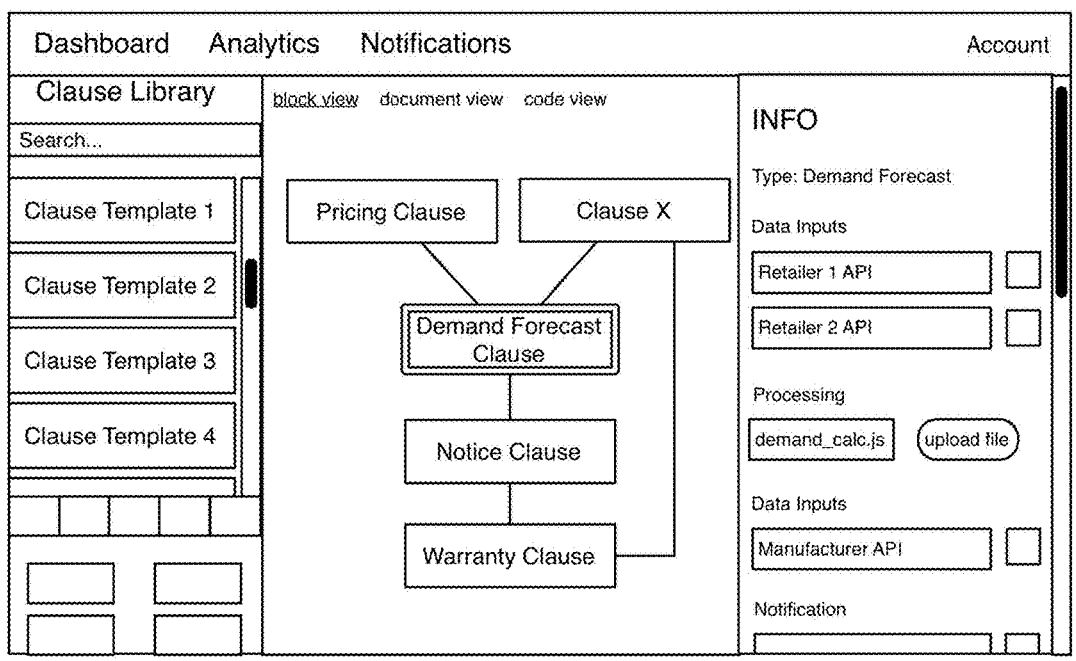
FIG. 41 is a schematic representation of an exemplary interface of a contract management system.

Clauses (and other objects) may be committed to the contract logic from a variety of sources such as clause libraries, contract libraries, repositories, databases, or any other appropriate source. Preferably, the contract management system includes a series of repositories and libraries that store template clauses, contracts, and similar (see FIG. 41). Alternatively or in addition, other forms of creating contracts and objects such as clauses may be used such as the contract creation tools of U.S. patent application Ser. No. 15/476,791 (e.g. an IDE, Command Line Interface, visual programming interfaces, etc.). A combination of the foregoing may be used.

Other objects may include multiple clauses, sections of contracts that constitute more than one clause, whole contracts, or any other portion of a contract. These may be coordinated through a contract management system, IDE, a command line interface, graphic user interface, or other appropriate mechanism.

In one particular embodiment, contracts may be formed and managed using a multi-signature mechanism. As shown in exemplary FIG. 14, the system and method can use a multi-signature mechanism as a placeholder while the contract is formed and executed. When the contract is complete for execution, the parties may sign using their private keys to execute the contract. The multi-signature mechanism may be 'on-ledge'/'on-chain' (i.e. using a BDL instantiation or where this approach is used, preferably, an 'object ledger') or 'off-ledge'/'off-chain' (e.g. using the graph data structure and preferably the MDAG variation). Upon completion of required signatures, the COG can be committed, transferred, or otherwise activated for post-formation execution.

During a post-formation stage, the nature of computable and data-driven contracts is such that as the contract executes, the state of the contract may change in various ways based upon execution of the logic and/or conditions of data sources. Execution of the COG can comprise receiving a contract update, optionally validating the contract update or otherwise processing the contract update, and appending or otherwise storing an updated graph object in the graph data structure. The system and method stores data pertaining to these contract updates in the graph data structure, where the contract updates can relate to events, actions, updates, operations, transactions and the like. Various forms of contract updates may occur in enabling different capabilities such as receiving updated state of the COG, outputting to an external system, logging of non-transformative contract events, logging of transformative contract events, amending of the contract, and/or other forms of contract changes.

Execution of logic can result in dynamic changes in the state of a clause, which can be one example of a contract update including updated state of the COG. The graph is preferably correspondingly updated with one or more new objects that reflect the new state resulting from the received data or information. This variation of a contract update may be used in combination with a data integration and/or BDL integration. For example, an input to a pricing clause in a supply agreement may update/change the value of a 'price' object in the clause. This may then be reflected in the graph in any appropriate manner e.g. by adding either a new atomic object(s) and/or an update object in the graph. Other approaches for reflecting the state of the contract may be used, and other object types may be used for this purpose.

The state of an executed computable contract may be updated by data inputs in at least two ways. Firstly, the input may be external—emanating from one of the parties or an external resource (including, but not limited to, APIs, edge computing devices, IoT platforms, data and/or transactions from BDLs, databases, outputs from "smart contract" scripts on BDLs, ERP/IMS/CLM/CRM systems, communication/messaging systems, analytics platforms, event stream/complex event processing systems etc.). Secondly, the input may be internal—meaning functionally generated by any existing object in the graph (e.g. another clause based on an input to that clause) or a new object created by an existing object in the graph.

In a preferred embodiment, as the state of a contract changes, an updated record of the atomic object is stored as a node in the graph. Alternatively or additionally, the update or event objects may reflect the executed state of the contract without a separate and additional object being added for this purpose.

In an example of a contract update including outputting to an external system, the graph can be updated to reflect changes to the executed state of a contract by way of an output from the contract to an external system. This may include data or BDL integrations acting as outputs to external systems. For example, an invoice on an external accounting/invoicing system may be updated based upon a change to the price (itself reflected in the graph), and correspondingly reflected in the representation of the graph. In another example, outputting to an external system can involve execution of payment on an external system and then correspondingly reflected in the representation of the graph. In yet another example, a transaction performed on a BDL (e.g. by the contract logic) can be executed and reflected in the representation of the graph. Outputs may take any suitable form, but preferably are stored in the graph as events in one implementation.

In an example of logging non-transformative contract events, an event that occurs but does not modify the executed state of the contract can be detected and recorded in the graph. While, the contract state and/or logic may not change, recording of such events in the graph can provide a more extensive reflection of activity relating to the contract. Examples of such non-transformative contract events may include when: code is compiled to or otherwise deployed on a BDL; custody of a shipment of goods changes hands (without affecting the contract e.g. liability, insurance, etc.); notice effecting a change of address is sent to the contract by a contracting party; and/or an object or other data from the contract/graph is persisted on, added to, or otherwise reflected on a BDL.

In an example of logging transformative contract events, an event that occurs and does modify the executed state of a contract can be detected and recorded in the graph along with the resulting change. In one example, a clause is executed (wholly or partially e.g. where a transaction is performed as a result of a state update to a clause) on a BDL to perform a transaction; and a transaction, event, or other operation is reflected in the graph.

The aforementioned categorizations are exemplary and indicative; therefore they are not intended to operate as rigid categorizations. Additional or alternative categories and objects may be used. A state of affairs may fall under more than one of the categories. For example, an input to a clause may result in code being compiled to a BDL that executes to perform a transaction that subsequently updates another 'off-chain' clause in the contract. Similarly, a state of affairs may fall within multiple categories depending upon the logic of any given contract. For example, a payment may be an 'output' from a clause/contract in one instance, and a modifying event in another (e.g. where a payment is made early in accordance with a clause that reduces a number of subsequent payments).

Figure 16:
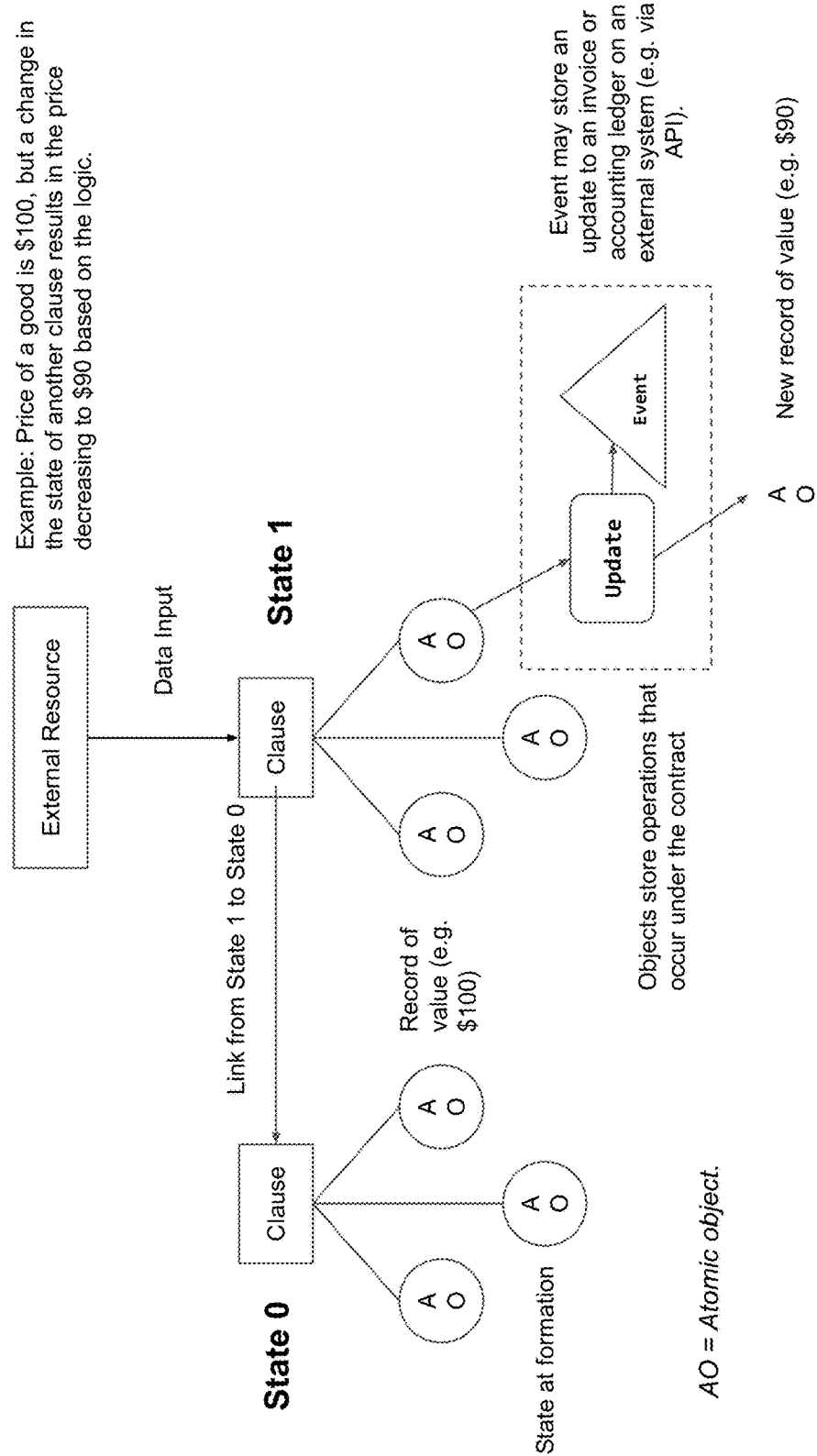
FIG. 16 is a schematic representing one potential implementation of an exemplary state change whereby the price reducing and updating an external resource (e.g. invoicing example) being stored in a graph data structure.
Figure 17:
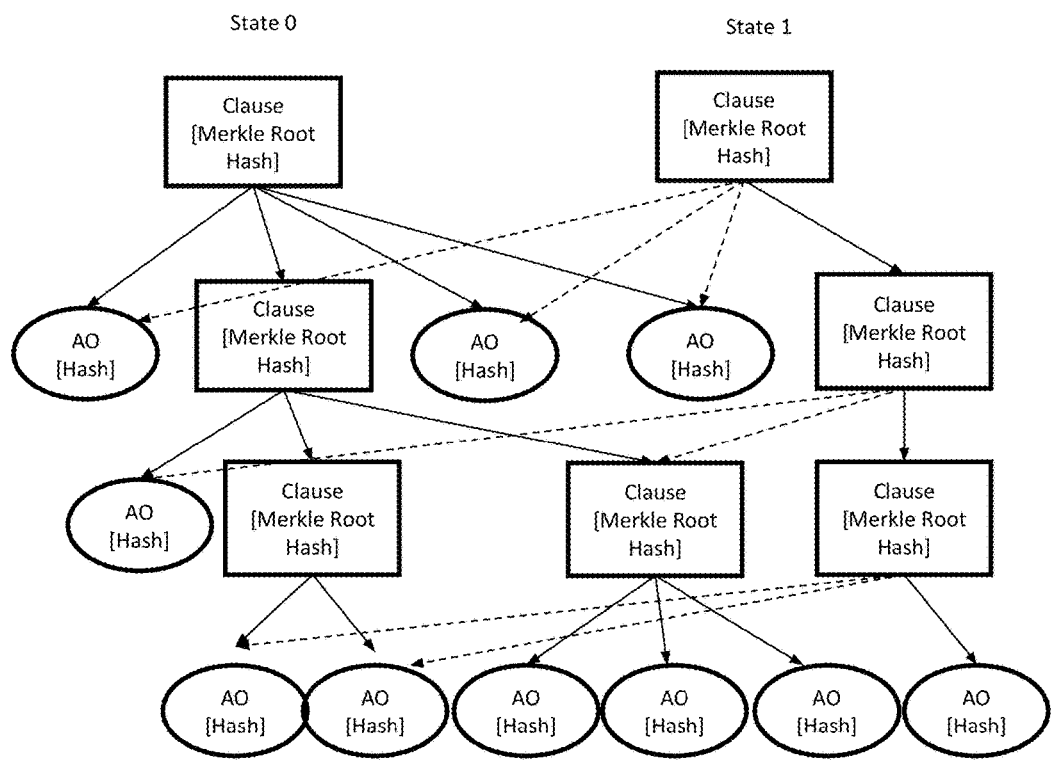
FIG. 17 is an exemplary portion of an exemplary basic graph data structure depicting a change in state of a contract.

As the state of each object is changed or performs an action (e.g. due to interaction with an external function call), an event occurs pertaining to a particular object, or similar, a new object is added to the graph. In a MDAG variation of a COG this subsequently changes the concatenated hash of any object of which it is a component (e.g. a clause, section etc.) and/or related to, and the Merkle root of the entire COG/tree or tree(s) in the event that two or more contracts or documents are linked (see FIGS. 16 and 17 for examples of state changes). As such, this MDAG structure provides an immutable and auditable record of the state of the contract at any given point in time. Contractual clauses and the links between the contractual clauses can be identified and verified by a unique hash or multihash checksum. Non-verified changes (e.g. resulting from user intervention or corruption) to the content of the contract are therefore identifiable.

When contracts change state, a new Merkle root is created by the versioning server (or virtual machine or other appropriate entity, depending upon the execution environment implementation) which links to all new objects. The Merkle root of the clause makes it possible to efficiently and verifiably move down the tree to any of the input parameters/ atomic objects, for example:

f(a, b, c, d)=Clause 1
f(e, f, g, h)=Clause 2
f(a, g, k, z)=Clause 3

One or more entities (e.g. objects or links) in the graph may subsequently be used by the logic of the contract. For example, the current state of a price object (and any associated links) may be used by the contract logic. Use of a price object by contract logic may include examples such as calculating discount/price compounding or calculating if conditions are satisfied such as if there is a given decrease between given dates or within a given time frame then a warranty term in a warranty clause is extended. Graph data may also be used by the logic in conjunction with data from and/or stored on external systems, applications, protocols and/or other external sources. A non-limiting example may be a deduction cap/limit for price credits/discounts owing to a delay because there was a delivery exception—as recorded on a logistics management system via API or otherwise—as opposed to a late delivery.

Objects—with or without metadata—may also (or alternatively) be added to a BDL, which may be appended to, or otherwise associated to, the graph data structure. Instantiation of an object on an external resource such as a BDL may be used for a plurality of reasons. In one scenario, instantiating an object on the BDL may function to provide third parties that are not privy to a given contract access to data pertaining to the contract, such as transactions (e.g. changes of custody of goods, changes of title), changes in state (e.g. price changes), data inputs to the contract (e.g. IoT data), and the like. In another scenario, instantiating an object on the BDL can be used for contract logic to be executed by the nodes on the BDL. In another scenario, instantiating an object on the BDL can be used for sharing data between BDLs using atomic cross-chain protocols. In yet another scenario, instantiating an object on the BDL can be used for exposing data to 'smart contract' scripts on BDLs. For example, objects from the graph data structure may be used as inputs to 'smart contract' scripts. This enables, for example, the state of the contract to be dynamic but executed 'on-chain' by the 'smart contract' script when certain conditions are met by the state of the contract.

Figure 18:
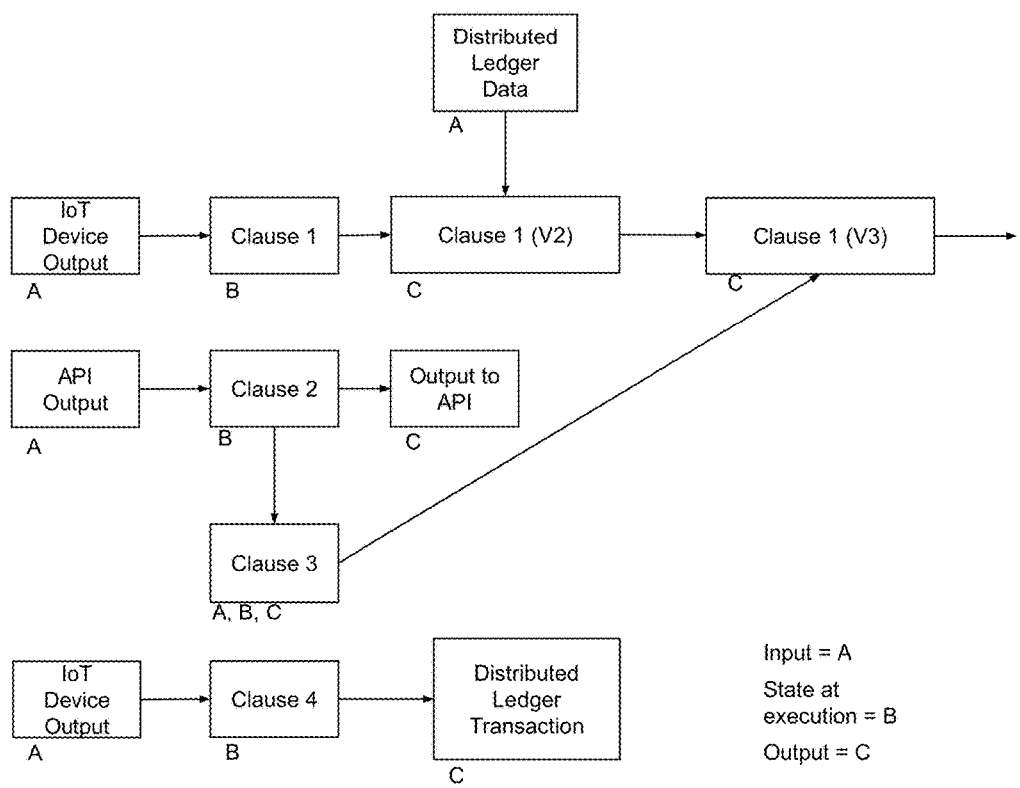
FIG. 18 is an exemplary schematic that depicts an exemplary series of possible interactions between external resources and clauses in a contract over time.

In one way, contract execution may be seen as a series of 'transactions'/operations between: (a) the contract; (b) contractual parties, third parties, and external data resources; (c) external systems, applications, rules engines, protocols, databases, BDLs etc.; and/or (d) objects within the contract as shown in FIG. 18.

Amending COGs

Amendments to the contract may be performed both formation and post-formation. Amendments to the contract may involve changing contracts or clauses (templated or otherwise), deleting portions of the contract, adding in new clauses, changing the contract structure or topology, or any other form of amendment. In one embodiment, amendments/changes/additions to the contract during the formation are represented by commit objects, and amendments/changes/additions to the contract during a post-formation stage are represented by amendment objects.

Figure 19:
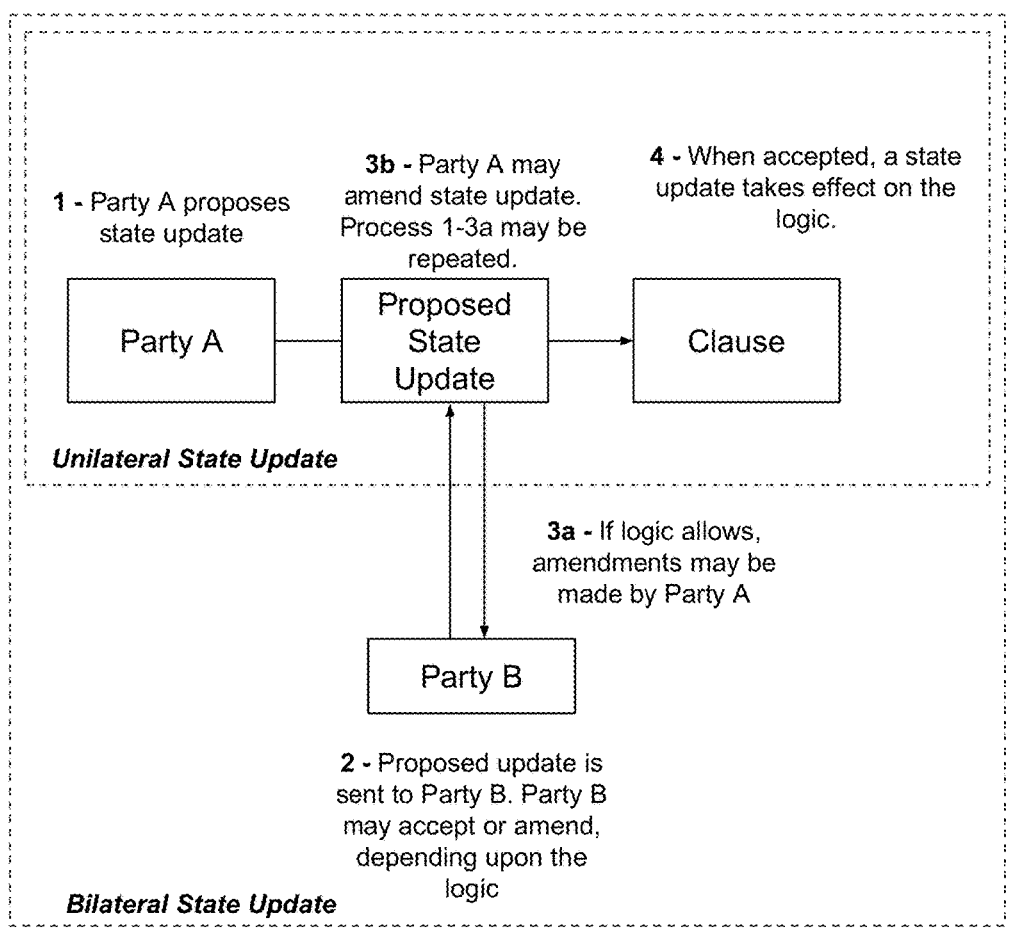
FIG. 19 is a schematic that depicts an exemplary state update to a contract using an exemplary permissioning process.
Figure 20:
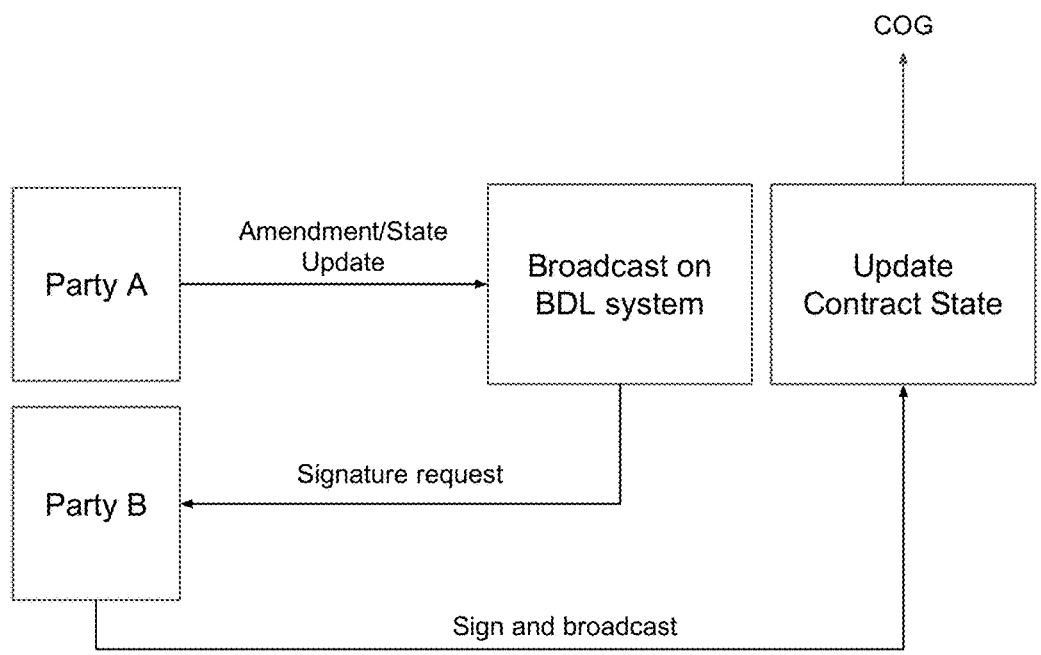
FIG. 20 is a schematic depicting one exemplary form of permissioned state change using a multi-signature process that may be deployed on a BDL.
Figure 21:
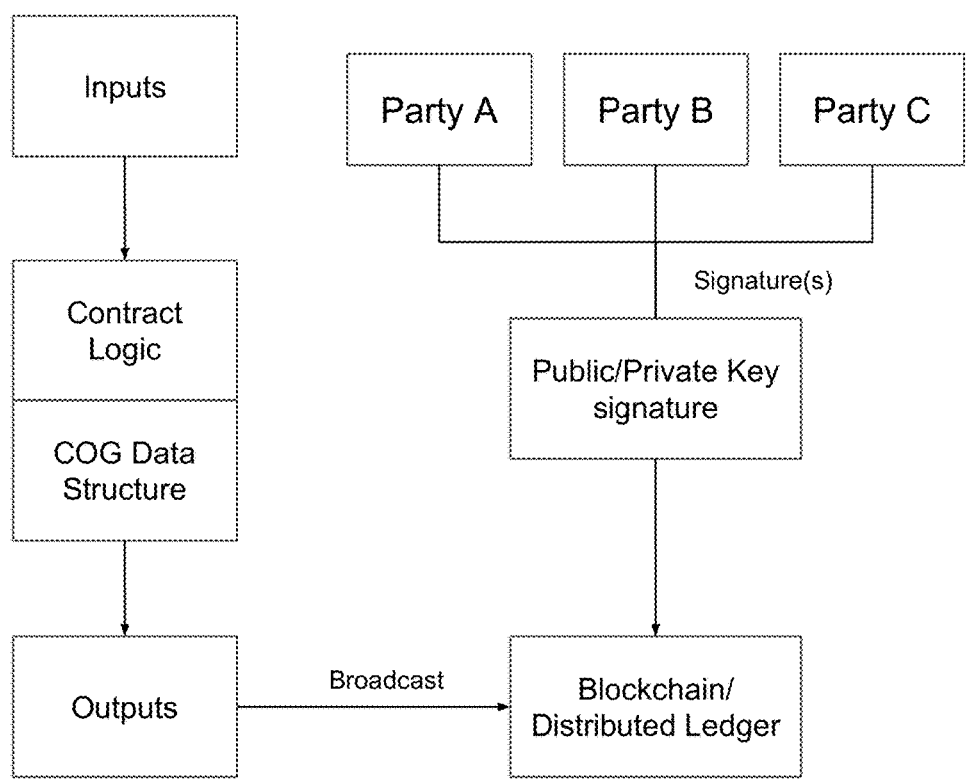
FIG. 21 is a schematic depicting one exemplary form of committing/adding data to a BDL from a contract using a multi-signature mechanism.

During a formation stage, when changes by a party are submitted to a contract, a new commit object is created. A commit may be accepted, rejected, or modified by the other parties to the contract that are in receipt of the commit changeset. In one preferred embodiment, parties may be notified of new commits through a contract management system, messaging system, or other appropriate method. At the formation stage, either party may submit a proposed change via a commit. At the post-formation stage, amendment objects may also be permissioned based upon the logic of the contract to enable changes without the need for all parties to accept the proposed changesets if this has been previously agreed in the logic of the contract, for example as shown in FIG. 19. This permissioning may be configured in many ways, including (but not limited to): (a) being inherent in the logic of a portion of the contract (e.g. a clause); thereby enabling a contracting party (or another party that has authority to act on behalf of a contracting party) to unilaterally amend the terms of the contract based upon the agreed permissions, and (b) being performed by an 'on-chain' "smart contract" script or multi-signature mechanism. Permissioning can additionally be customized for different subsets of objects (e.g., clauses, sections, atomic objects, etc.). As shown in FIG. 20, an exemplary use of a multi-signature mechanism in the post-formation stage (i.e. during execution) may be used to describe access rights that contracting parties have with the contract and to make amendments to the logic or sign-off state updates. As shown in the exemplary FIG. 21, a m-of-n multi-signature instantiated on a BDL may be used for this purpose. Alternatively, this may be performed on/using the graph structure. This may be included in the logic of the contract itself or as a separate script that manages implements changes to the logic of the contract (e.g. all or a certain number of parties have to sign). In one embodiment, the same may be used to add data to the graph (e.g. to effect a valid statue update). As shown in FIG. 21, another exemplary use of a multi-signature mechanism may be to commit transactions or add other data from the contract to a BDL. The same may be used to add data to the graph data structure. Multi-signature mechanisms may be used in the formation and post-formation stages.

Figure 22:
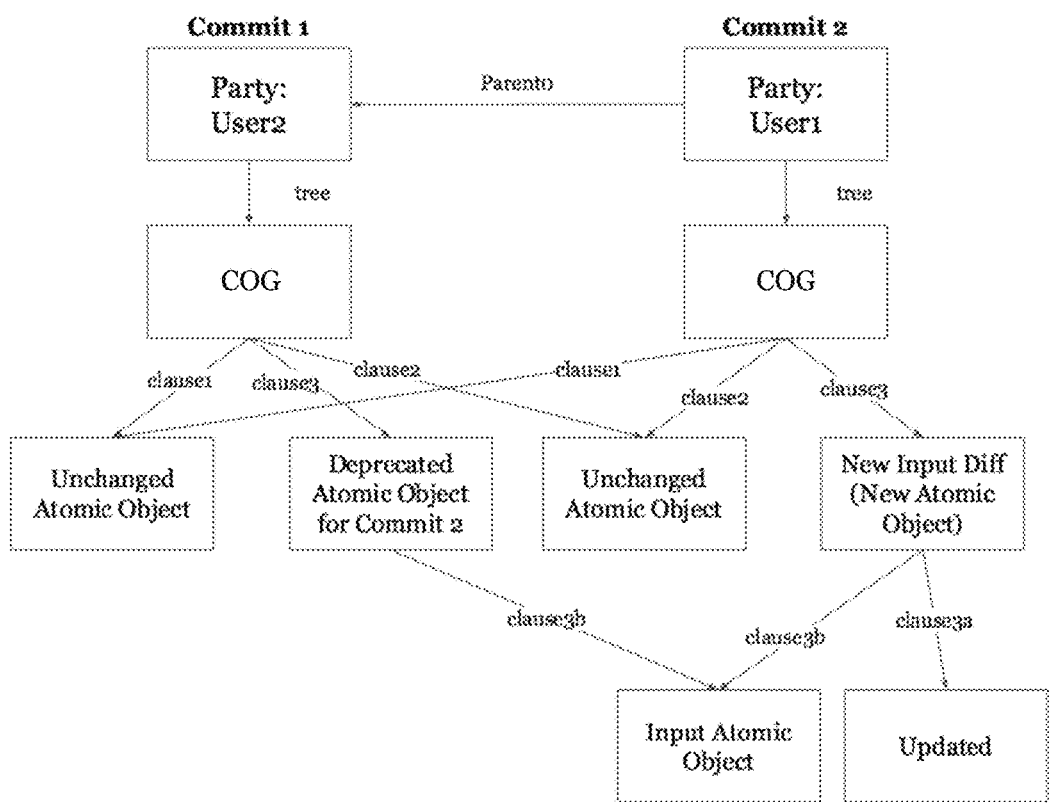
FIG. 22 is an exemplary commit to an exemplary graph data structure of a contract.
Figure 23:
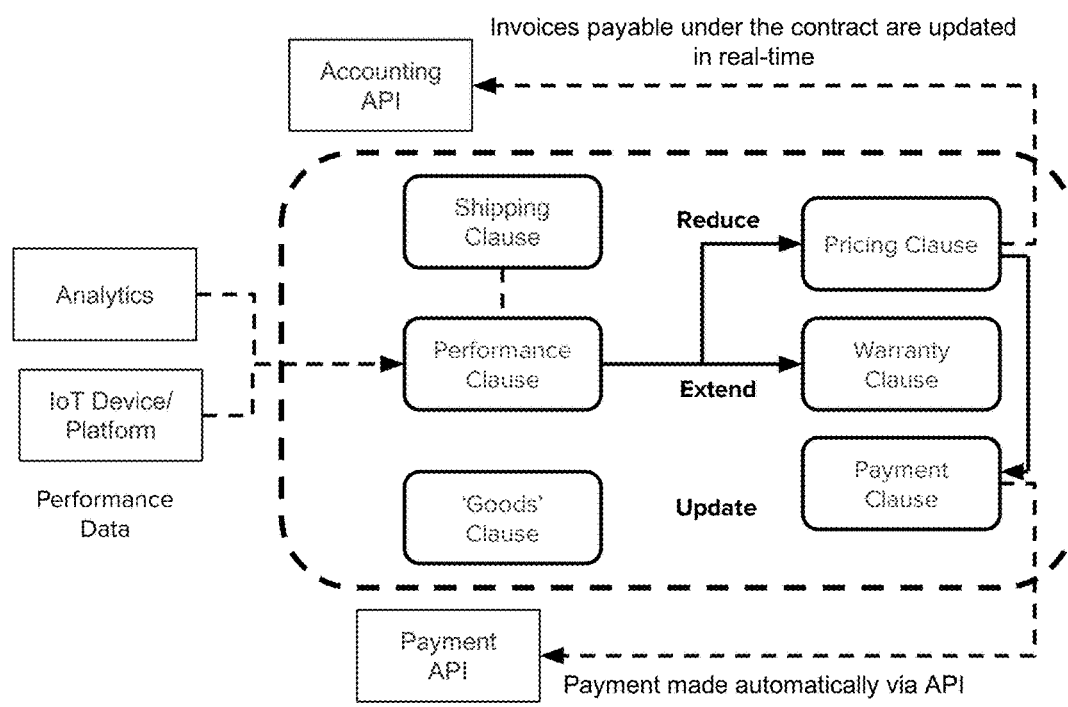
FIG. 23 is a schematic depicting an exemplary relationship between programmable clauses in a computable contract.

Accepted commits are reflected in the new state of the logic of the contract. The execution environment, upon accepting and validating a commit, a contract update in the form of one or more object components are appended to the graph of each party In one embodiment, rejected commits may also be stored so as to provide an entire and auditable record of the formation/negotiation process. In a preferred embodiment, a commit object has one or more versioning links (e.g. parent0, parent1, etc.) pointing to previous commits, and one link that points to the object structure referenced by that commit as shown in the example of FIG. 22. Other appropriate structures may be used.

State Update Objects

After formation, the contract may be executed. Where a centralized execution environment is used (e.g. a centralized server or cloud management platform), the centralized environment may contain a version of the graph for each party—as each graph may differ such as in the event that 'party-side' events are stored in the graph—and a singular executable version of the contract or, alternatively, each party may have an executable version to limit any potential issues with tampering of contract logic. The contract logic is preferably executed within a sandboxed environment. Where a decentralized execution environment is used (such as a peer-to-peer network in a preferred embodiment), each contracting party may have a copy of the graph(s) and the contract (i.e. executable logic and any prose).

The logic of the programmable clauses in a contract may result in a range of operations performed with, and by, the contract. These operations may include receiving data inputs to a clause, changing the current state of the contract, and/or transmitting an output or executing a transaction. Receiving data inputs can include receiving data input from BDLs, databases, applications, IoT devices, API services, ERP/CRM/IMS systems, and other suitable data sources. A change in the state of the contract can be a change in the variables of the contract. In an exemplary contract these state changes can include examples like when a price of a good changes if a delivery is late or when shipping conditions such as humidity, temperature, and/or vibration were not adhered to as measured by an IoT device. Transmitting an output can include communicating with an API or a device such as updating an external invoicing/accounting system. Executing a transaction preferably involves executing some transaction on a BDL.

In one implementation, state update objects are preferably used to update and/or transition the state of the contract in the post-formation stage as shown in FIGS. 6, 18, 23, 24A, and 24B. A state update object may itself be stored in the graph data structure so that a record exists as to what caused a given change in the state of an object/contract.

State updates may take any suitable form to provide data to the logic of contract clauses and, consequently, update their state (which may subsequently be reflected in a new object being added to the graph data structure, as stated herein).

In a preferred embodiment, state updates are messages ('transaction-like' function calls; that may be signed or unsigned data packets) that call exposed functions with appropriate argument values. These occur either by way of input to the contract; internal operation of the contract (e.g. one object updating another object); output from the contract, or any other suitable form. One of the aforementioned may trigger others (e.g. a data input from an IoT device, API, data on a BDL may result in the state change of an object which then itself triggers the update of another object in the graph data structure). The new state of a clause or other object (e.g. an atomic object, an event etc.) is one of the 'outputs' of such a 'transaction'. Depending on the logic of a clause this may also update the state of other objects or perform external operations (e.g. on IoT devices, BDLs, databases, APIs, external systems/applications etc.) (see FIGS. 6 and 23). State updates may take any suitable form. State updates may take the form of: a new, modified, state of object(s) that comprise a clause, an update object, an event object, and/or any other appropriate object or mechanism of updating the contract data structure.

In one embodiment, and where appropriate based on a given implementation of the system and method (e.g. where a distributed environment or a decentralized environment such as a peer-to-peer network is used), Remote Procedure Calls (RPCs) may be used to interact between the nodes on the network and/or BDL(s) and/or between a client and a node on a decentralized network.

In one implementation, state update objects create the new state of the contract in a similar manner to a commit object. The update is effectively an object that stores the data and (may also store metadata) relevant to a 'transaction' that triggered execution of the code of a given object (e.g. one or more clause). The update object may store any appropriate data—which may vary according to the source, event, clause and/or contract in question. Exemplary metadata may include (but is not limited to and does not have to include):

```
"state": {
    "eventName": "tempChange",
    "event_UUID":
"991f86f754e3d51c757d70c3f583d49b60cc7e72c0e662038df58ebcdffd2470",
    "eventInit": "tempSensor004"
```

```
    "data" : [ ],
    "timeStamp": 1455532426303
"clause_UUID":"56c11d0ea55773bc6e681fde",
    "update_UUID":
"06faad7bf3f793c2ea5d89b0fbe906603f4ee15684e24350ff88a8d9ef7761d5",
"link_UUID":
3d6ef9e2dfa84733534d5355efc1d028a5c0cfee052479752df51b8be48c2c3c",
"prev_update_UUID":"9b03d05c07fb44fe5aa472115cd918e886b71e0dbc6fe06ef9765
66c98272ee9"
    }
```

Additional, upgraded, or alternative data types may be used. Other field data, link types, and metadata may be used or added. Other implementations, structures, approaches, fields, tuples, may be used.

State updates may include metadata being added to the update, which may include (but may not be limited to and does not have to include): the UUID/identifier for the clause (and/or atomic object(s), where appropriate) to which the update is being made to; the UUID of the update; the UUID of any previous update (which may be on a contract or object level); and execution data relating to the state update. The execution data may include timestamps of signatures, timestamps of data, data relating to the execution environment of state signatures (e.g. virtual machines, IP addresses, trusted hardware and remote attestation etc.), applicable data relating to the source of any data that caused the state such as the API, transaction or other data from a BDL data etc.

The metadata of the state update has fields for both the hash of the update and the clause. The clause_UUID represents the content hash identifier of the clause to which the update relates. If the state update modifies the state of a clause then the clause_UUID changes. This enables one to view: (a) the history of updates for a contract, and (b) the updates for any given clause. Objects that change may (as per the section and clause examples stated herein) include a constant name/reference (e.g. to identify a given clause). Alternatively, another naming mechanism may be used.

The update_UUID may be referenced in the 'output' object (e.g. the new state of a clause, atomic object, an event object, or any other object). The versioning link(s) may also be referenced in the update. This creates a link between the previous state, update, versioning link, and updates object state. Other mechanisms or approaches for linking objects may be used.

As objects in the graph, state update objects may themselves be updated by a state update, if necessary. This may occur by either amending the update or, preferably, by adding an additional update to the graph so as to preserve the intended append-only state of the graph data structure. This may be applied to any object type used in the graph data structure (e.g. an update object may be amended by an update-amendment object) or any combination of object types (e.g. update-amendment; event-update etc.) to reflect changes to the graph data structure.

Figure 25:
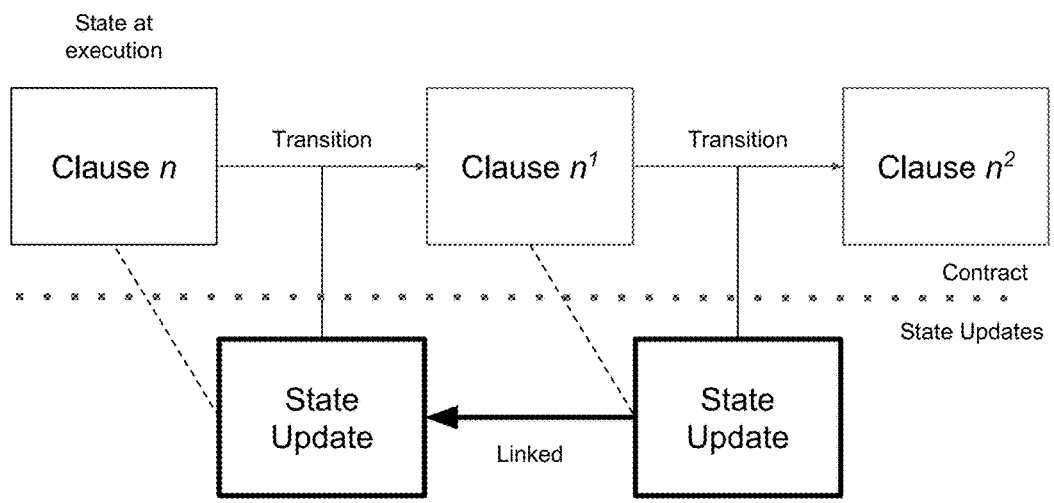
FIG. 25 is an exemplary representation of an embodiment of state updates to a clause in a contract.
Figure 26:
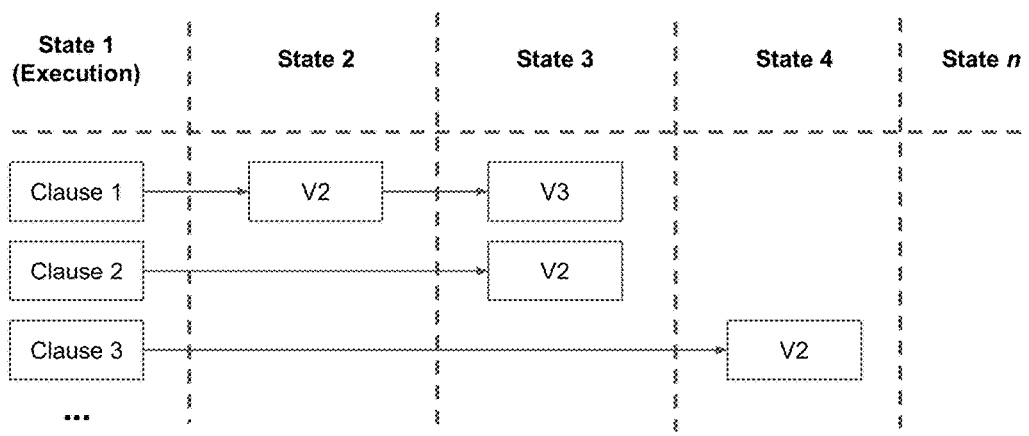
FIG. 26 is a 'cross-section' view of a contract depicting the state of a portion of an exemplary contract comprised of programmable clauses as it is executed in the 'post-formation' stage.

In one embodiment, each state may be (but does not have to be) tied to the previous state: creating an append-only log of immutable state updates (see FIG. 25 for an example)—these state updates may be used to 'rewind' or 'restore'/'replay' the state of a contract or contracts (where 'linked') in a manner similar to event sourcing systems as each state update reflects a 'snapshot' of the contract (see FIG. 26 for an example).

In one embodiment, the state transitions take place according to the contract logic. The logic of the contract itself may not remain static, but may utilize state update and other objects (including their metadata), such that the current state may update the logic (e.g. to compute further updates and objects). In an alternative embodiment, the transition may be created by separate transition function(s) that exists externally to the logic. The history can then be used by the logic to query and/or utilize the current state. This may result in a more formal separation between the logic and the contractual state.

An addition or alternative is to store the data of the event that caused (or is otherwise related to) the state update in the contract data structure as a discrete event object (in a manner similar to event sourcing systems). Consequently, this creates a separate log of all the post-formation changes to the contract. This may provide a number of benefits: As one potential benefit, this may enable 'reverting' the contract state and re-running the events in sequence from the event log. This is particularly important in circumstances where a dispute arises (e.g. if a 'data initiated' state update is queried, or an arbitrator needs to 'revert the contract and perform an event (e.g. payment or termination)). As another potential benefit, this may be used in correcting or resolving an issue where a past event is subsequently found to be incorrect (e.g. due to data integrity issues from IoT devices,) or out of sequence. The contract state can be computationally 'reversed' and then 'replaying' the contract with any added events and/or those that have been reversed. Events may also be used to store any external data that pertains to the contract even if this does not relate to a state update. One particular use of event objects is the storage of 'non-modifying' state updates and/or 'output' state updates.

Versioning Systems

In a preferred embodiment, two forms of contractual versioning systems may be built on this underlying data structure. The first is a version control system that uses the data structure to version the contract during the formation/negotiation stage between contracting parties. The second is a system that utilizes the underlying data structure to store or record an immutable record of the state of the contract when the contract is executed in the post-formation stage. The underlying data structure is preferably common to both systems. This enables a contract to be formed, executed, and its state updated using the same underlying data structure throughout (see FIG. 7).

Formation Versioning

At the contract formation stage, one embodiment of the system enables users to compose a contract by committing clauses or parts of clauses—either in natural language, code or a hybrid—from repositories (e.g. a previous contract, a clause library, or other) into a repository that holds a particular contract (as depicted in FIGS. 11 and 12). The contract repository may be added, modified, or amended on an 'object-by-object' basis (e.g. 'clause-by-clause') and/or by committing a template or series of clauses, and then editing/configuring these as required. These repositories are preferably private and accessible only parties to the contract unless further access rights are otherwise granted to third parties, or a repository is open for multiple users (e.g. a publicly available 'clause library' repository, or a repository shared internally within an organization). FIG. 12 provides an example of a contract repository for a supply agreement. In a preferred embodiment, these repositories form part of a contract management platform or system (but do not have to).

Figure 27:
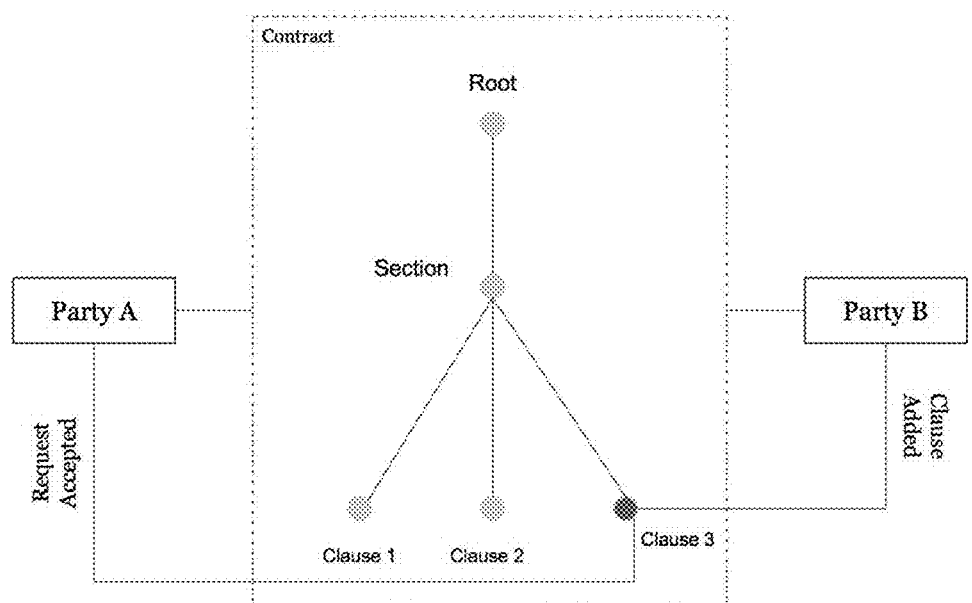
FIG. 27 is a schematic representation of an exemplary commit of a clause object to a contract.

The system and method may synchronize repositories between the parties by exchanging cryptographically signed commits between contracting parties, or other alternative method. Commits may be exchanged using any appropriate method (which may include, but is not limited to, a versioning server, virtual machine, BDL). Commits (like any object in the graph data structure) may also be simultaneously stored in other storage mediums (e.g. a database, BDL) in addition to the graph data structure. These commits represent the new state of the contract. When a changeset is submitted by one party, the other parties are preferably notified and may accept or reject the proposed changes to the contract (FIG. 27). Multi-signature or any other appropriate method may be used to sign commits between parties. Synchronizing of repositories may be done purely through a versioning repository system. Synchronizing of repositories may additionally be performed through a provided user interface of a contract management system. For example, parties may be able to collaboratively edit, propose edits, and/or otherwise compose a computable contract in an online editor interface. Notifications (see FIG. 28) may be configured and provided through a contract management system or other method (e.g. via a messaging service/Internet Relay Chat, email, etc.). If the proposed changes are accepted by the parties then the changeset is incorporated into the master version of the contract repository shared by all contracting parties. A pending commit represents a proposed change to the contract state by one or more of the parties. An accepted commit changes the state of the contract logic for execution. Commits may be configured to be exchanged between all or a portion of the parties to a contract. Sharing commits between only a portion of the parties to a contract enables (where applicable) two or more parties to form agreement to the state of a contract or a given changeset without involving other parties.

This process enables users to form computable contracts by working collaboratively/negotiating on the composition of the content of the contract: (a) by creating a cryptographically secured data structure; and (b) in a transparent environment, that may be implemented in a decentralized/peer-to-peer manner (as there need not—but may, in one embodiment—exist a centralized repository for the contract). These changes may include (but are not limited to): adding/deleting/editing objects, such as clauses or parts thereof (in code, natural language or a hybrid); adding/deleting/editing both input and output resources; updating configurations; reverting changes etc. The commit may include (but is not limited to): a reference to the party who made the submitted change and metadata relating to that party (see herein for examples), when the submitted change was made; differences the commit will make, if accepted, to the state of the contract as compared to the current state; details of any clauses, contracts, and configurations affected, and any comments by the party who submitted the change.

When the contract formation is complete, it is preferably executed by the contracting parties by cryptographically signing (e.g. using a PGP key linked to their identity/account on a contract management system, or other appropriate method) the beginning state as well as commit of all objects to the repository which is tracked by the versioning server/VM etc. Multiple signature types may be used in any given implementation (e.g. cryptographic and electronic handwritten signature). The signature may be performed on an external resource (e.g. an external service or via API such as an e-signature system or BDL-based identity platform) or natively on a contract management system to which the system and method may be a component part.

The benefits of using this data structure for formation contract formation is that each working 'copy' effectively functions as a remote backup of the contract and its change/negotiation history. The integrity of all 'copies' is made possible through the Merkle DAG data structure as well as the parties' cryptographic signatures of all changes. It also provides a mechanisms for the amendment and configuration of computable contracts that may not be easily achieved by other approaches for contractual negotiation (such as sending natural language text between parties e.g. by email exchange) caused, at least in part, by the potential need to accommodate input/output resources and configuration thereof. Furthermore, it provides a medium through which parties can negotiate, form, and execute contracts on a peer-to-peer basis without trusting a centralized party, and in a collaborative, versioned controlled, manner. It also enables parties to form a data structure that can be subsequently executed and tracked in its post-formation state.

Post-formation Versioning

Figure 29:
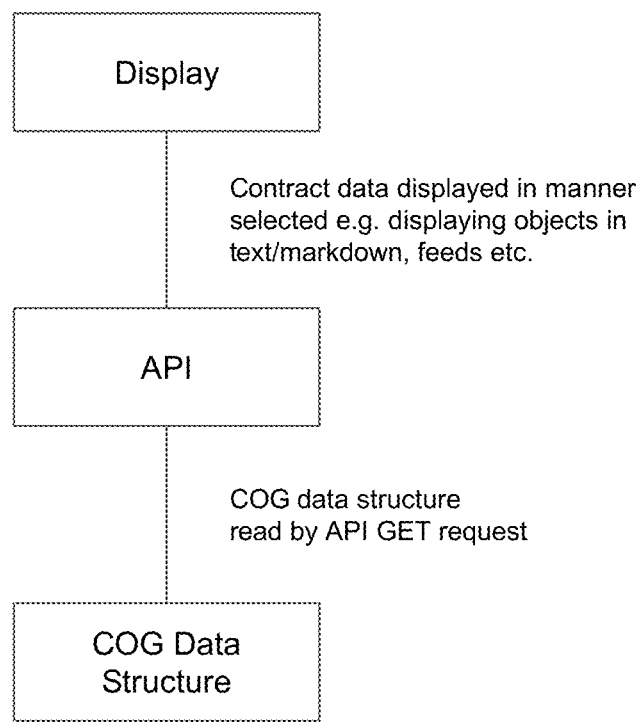
FIG. 29 is a schematic demonstrating a contract object graph data structure being queried via API to display data to a user.

After a contract has been formed and executed, it is hosted on a computer network (e.g., the World Wide Web such as via a multi-tenant cloud-based computing platform, a centralized, decentralized, or federated server network, a peer-to-peer network, or other appropriate system). Where applicable, the contract is executed using the underlying data structure formed during the formation stage (see FIG. 7 for an example). After execution, objects/nodes are added to either the same graph or another version of the graph. In one implementation, the post-formation versioning may operate on a copy of the graph from the formation stage. The graph may be queried by an API so that data can be displayed via a graphical user interface, command line Interface, or any appropriate manner as shown in FIG. 29. The data from the graph may be used to display data to the end user in a number of different forms that may include, but are not limited to: displaying feeds of events (chronological, filterable by event type, event attributes etc.) that occur under a contract, changes in the state of contracts, 'pop-over' data of the history of objects (e.g. price) in clauses (see FIG. 10). In one particular implementation, components, tags, or parameters (or any other appropriate entity) that display and/or correspond to the underlying data/objects in the graph may be displayed in a natural language or other representation of the contract or its component clauses. For example, a 'price' object may be displayed in a natural language clause. The natural language may be: (a) from the logic of the contract (e.g. as blobs); (b) distinct/separate from the logic of the contract, where the code is referenced such as through use of a markup or markdown language; or (c) any other suitable embodiment. This may be viewed through a contract management system, client, or other appropriate endpoint.

At the post-formation stage, the system and method tracks versioned changes to the state of the logic of the contract as it interacts with, and responds to, data from external resources, the contracting parties, and any third parties. Objects/nodes are added to the graph based on the operation of the contractual logic. As shown in the exemplary FIG. 16, an addition of a state change of a 'price' object in a pricing clause can result from execution of the logic of that clause based upon a data input. Other examples may include (but are not limited to): storing a record of the execution of a clause, a state change in a clause/object caused by the execution of another clause (i.e. execution of one clause/object updates another clause/object); storing execution of transaction(s), operation(s), action(s) or other event(s) resulting from a clause on another system, application, protocol such as a BDL, database, Enterprise Resource Planning (ERP) system, Customer Relationship Management (CRM) system, Inventory Management System (IMS), accounting/invoicing system, payments system; storing input(s) from the same.

Preferably input data uses cryptographic proofs or, where hardware is used in data collection and/or processing, remote hardware attestation, a Trusted Execution Environment (TEE e.g. Intel SGX) or other appropriate method to ensure/assist in providing or otherwise improving input data integrity. Where data is used from resources that do not utilize cryptographic proofs (e.g. where a web APIs is used), the system may (where appropriate) 'Merkelize' the data output and stores its state by committing the 'Merkelized' data packet to the graph data structure. This may be done in order to be able to track and version the entire input-output 'chain' of contract data changes on the Merkle DAG data structure. Metadata relating to cryptographic proofs may be stored or otherwise used in graph objects (e.g. events, updates etc.).

The graph data structure enables state updates that occur as a result of the interaction between the contract and external data (e.g. changes to terms and conditions) and those initiated by contracting or third parties to be stored in a manner that records the chronological history of the 'real-time' contract. Atomic objects whose versioning depends on contract logic may be automatically changed and versioned by adding the new state of the object to the graph. Objects that depend on external logic are versioned depending on the external data. External data can drive internal contract changes as shown in the exemplary FIG. 6. The system and method may also make different independent contracts and other documentation (e.g. insurance policies, certificates, packing lists, invoices, quotations etc.) to be interdependent. For example, the price atomic object of a sales or supply contract could be used/referenced by other parties in their other contracts—thereby enabling standardized and common interrelation. In turn, the individual contracts can become the input data to the initial sales or supply contract itself. Each change may be linked to previous changes as well as to atomic objects on which it depends for input, thereby providing a complete immutable chronological record of the state of a computable contract as it changes over time. Contracting parties are therefore able to verify and 'replay' the state of the contract, as well as query causation and other relationships between events (which may be beneficial for contractual analytics, counterparty assessment, internal workflows, contractual enforcement and other reasons).

Each state update may contain data relating, but not limited to metadata relating to the change, the Merkle root of the contract, and/or a link to the previous state update or commit (depending on the implementation).

The metadata may include data such as data inputs to the contract logic and/or graph such as data from an API, HTTP(S) client, ERP/CRM/IMS or other system, databases, BDL, 'smart contract' scripts that interacts with clauses. For example, such data input metadata may include timestamp, initiator(s) (e.g. external resource such as an API, BDL, database, event; contracting party, third party etc.), the value(s) relating to the change (e.g. humidity of 55%), and/or device data. As an example, device data metadata can include identifiers of edge computing devices such as Physically Unclonable Function (PUF) data, device identifiers, registration data such as data from a BDL to which the device is registered, and/or IP addresses of devices used by contracting or third parties to sign updates.

Data output metadata can be data that is sent to a third party application, an external system, a BDL, an API, another contract, another clause, and/or other external destination. Examples of data output metadata can include timestamps, a hash of the initiating object/clause, and the like.

The following sections detail the various approaches that may be taken to state updates.

3. Post-Formation State Update Mechanism

Figure 30:
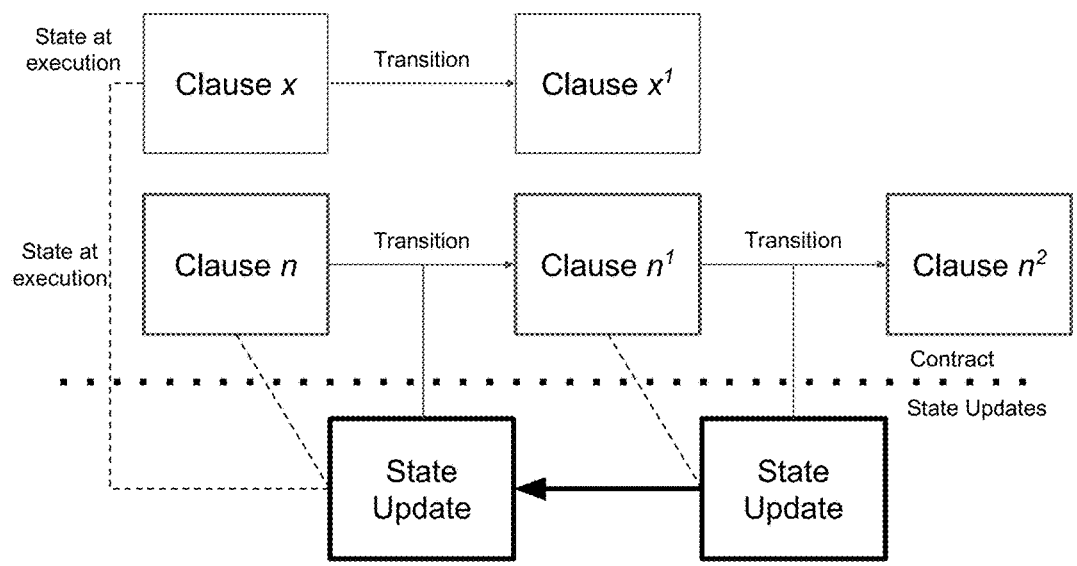
FIG. 30 is an exemplary representation of an embodiment of state updates that take effect to more than one clause in a contract.
Figure 31:
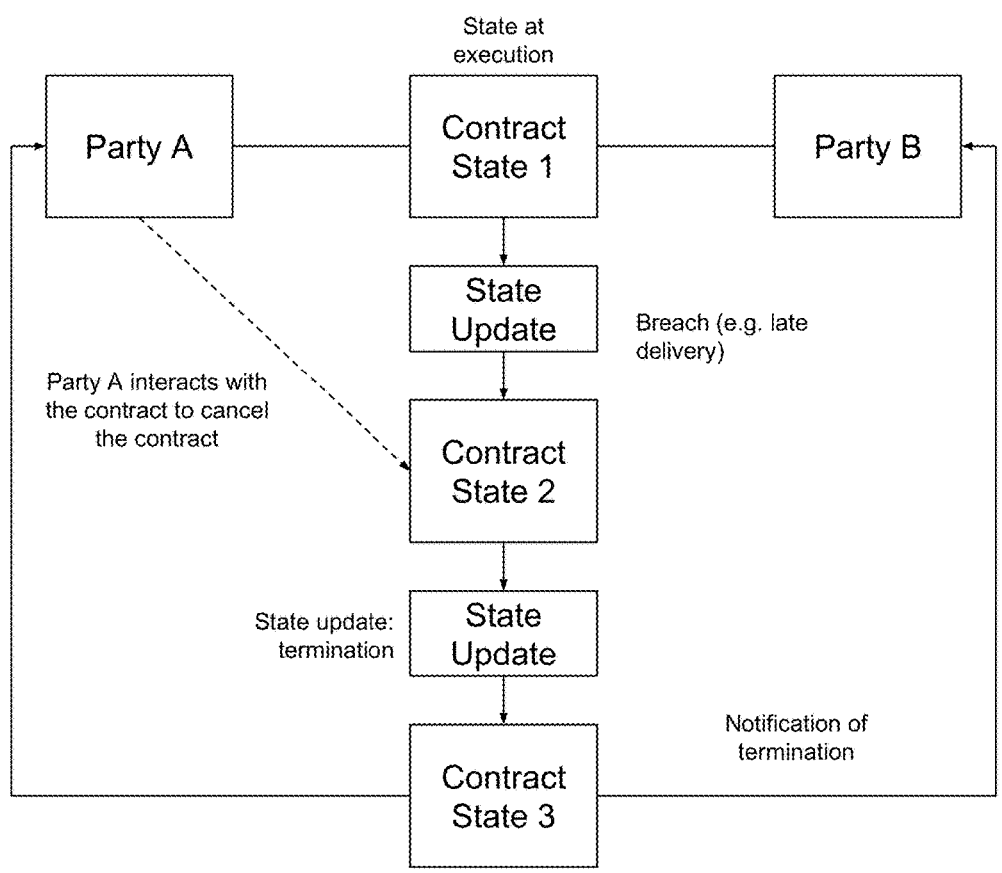
FIG. 31 depicts a simple exemplary state update flow between two parties to an exemplary contract.

As aforementioned, 'state updates' are changes and confirmations of changes that are made to the state of the contract based upon data input to the contract logic as shown in FIGS. 24, 30, and 31. State updates are preferably cryptographically signed data packets with input parameters, but may take any appropriate form for a given implementation. State updates are preferably performed by 'signing' states using a cryptographic signature. Signing may be performed by a 'notary service' (such as a node on a peer-to-peer network or a centralized server that is used to sign a state update either before it is added to the graph and/or an object ledger.

Where a decentralized environment is used, the transitioning that occurs to the state of contract in formation or post-formation is preferably achieved, as aforementioned, by way of messaging (e.g. point-to-point messaging) to move data between the nodes on the network. For example, formation commits are sent from one contracting party to the other contracting party or parties. As another example, post-formation state updates may be exchanged between the parties through directly communicated messages that are preferably validated by the contract logic and then committed to the COG stored by the parties.

State updates may be programmatically permissioned (see FIG. 19)—either by the contract logic or a function external to the logic—so that a given state update only takes effect when certain conditions are fulfilled. Permissioning may be such that this requires a given event to occur and/or signature from: one or more contracting party; all contracting parties; one or more third party, a combination including at least one contracting party and at least one third party, and/or any suitable combination of parties. This sets the parties that are needed to sign a particular state update. This may be performed through an 'on-chain'/'on-ledger' "smart contract" script, multi-signature (see FIGS. 20 and 21), or other mechanism. The permissions will differ depending upon the logic and the purpose for which the state update is made. The permissions can be conditional on contract state and/or state of an external system. For example, a state update may be signed by only one party to confirm an event (e.g. a shipment of goods under a supply contract being received) has occurred (m-of-n multi-signature process) or all contracting parties may need to sign a state update to agree upon a particular event having occurred using a n-of-n multi-signature process. State updates may take place manually, be fully automated, or a hybrid (e.g. update proposed and then requires party signature).

State Update Forms

State updates may take a variety of forms, which may include data-initiated state updates, party initiated state updates, third party initiated state updates, and/or a hybrid state update. Additional or alternative forms may be used.

Data Initiated State Updates

Data initiated state updates are performed based upon data being exposed to, or actions executed by, the logic of the contract. Data initiated state updates may be 'input' or 'output' based.

Data input state updates include data external to the contract being exposed to the logic of the contract to execute updates to the logic and/or state of the contract. Examples of data input that can result in state updates can include receiving API data (e.g. payment made/confirmed, shipping arranged etc.); receiving, retrieving, or detecting a transaction or operation performed on a BDL or data otherwise stored on or a BDL; receiving data from databases, event stores, and other data storage systems; receiving data or communication input from edge computing devices (sensors, actuators, RFID etc.); receiving data from "smart contract" scripts, "oracles", and the like; receiving inputs from Enterprise Resource Planning (ERP), Customer Relationship Management (CRM), Inventory Management (IMS) systems, and other systems/applications; receiving or detecting or receiving input from 'Event Stream Processing' (ESP) and 'Complex Event Processing' (CEP) events; and/or receiving data or events from analytics platforms/systems and cognitive computing system outputs.

Data output state updates can involve the contract logic executing or otherwise performing or initiating an operation on one or more resources (e.g. a third party system, API, BDL, database, system, application etc.). One variation can include executing some operation through an API such as executing payment with a payment service, updating/reconciling invoices, and/or performing any action through an API. Another variation can include performing some operation on an edge computing device or machine. This may include communicating a machine interpretable instruction. Another variation can include performing a transaction on a BDL or similar system. For example, a transfer of an asset can be performed as a transaction on a BDL. Execution of a transaction. In this variation, a cryptographic hash/UUID from the data structure and/or metadata may be put on, or otherwise added to, the BDL by being referenced in "smart contract" script(s) when compiled to the ledger or executed by invoking 'on-chain'/'ion-ledger' code (depending on the given implementation). Alternatively or in addition, objects from the graph data structure or parameters may be passed to 'on-chain'/'ion-ledger' code. This creates a record between the contract data structure and the transaction(s) on a BDL. In a related BDL variation, data output can include executing pre-existing "smart contract" scripts deployed and invoked to a BDL. For example, this could be used in an implementation where "smart contract" scripts are not compiled from the contract logic.

Such 'output' state updates may take a different form to 'input' state updates. Whereas 'input' state updates may, in some cases, change/update the state of the logic of the contract, an 'output' state update may, in some cases, not change the state of the logic or contract state. This may, however, be equally applicable to both 'input' and 'output' state updates—depending on the exact nature and implementation of the state update. An example of 'output' state update that does not change the logic would be a reconciliation of a change in the price of a good/service under a supply agreement to an invoicing system via an API. This form of 'non-modifying' state update may be stored in the graph data structure in the same manner as a 'modifying' state update, but instead of changing the state of the logic, would leave this unchanged and store the operation as metadata either to an existing object (e.g. to update the state) or, alternatively, it may, depending upon the implementation, take the form of a separate type of object (e.g. an event object or other appropriate object).

In general, any appropriate embodiment or implementation may also record, store, and use data that does not impact the logic or state of the logic of the contract, such as changes to the status of clauses (e.g. if a clause has been breached or close to being breached); if an action has been taken by a contracting party (e.g. a notice has been sent in accordance with the contract); a log of data sent by input/output integrations (the granularity/frequency of which may be controlled by the user to avoid storage bloating); data outputs by clauses to third party systems, applications and web services; events related to legal logic (e.g. if a change breaches or is due to breach or needs user attention) etc. The aforementioned data may be stored in an associated data structure (e.g. a database, BDL or other data structure) or in a common data structure with, or associated to, the contract logic (e.g. connected to appropriate atomic objects, as metadata, as a separate object type, or any other appropriate implementation).

Contracting Party Initiated State Updates

'User' or 'party initiated' state updates are signed by one or more of the contracting parties. This is particularly useful to confirm state changes where no external data is applicable, appropriate (e.g. to account for subjective matters), or needed to initiate the state update. A 'user initiated' state update may be 'input' or 'output' based. State updates may be permissioned in the configuration of the logic of a clause, contract, or set by other mechanisms such as multi-signature script/entity on a BDL. The permissioning logic may be set at the formation of the contract, modified after execution, or defined at a point after execution. The permissioning process may preferably be configured to take into account the state of the contract as it updates, based upon the state of the graph data structure, so as to enable 'dynamic' permissioning (e.g. updates may be accepted in one state, but not in others).

A particular use case is where the logic is unquantifiable, indeterministic, or represents subjective conditions (e.g. 'goods arrived in satisfactory condition'). A further example is to 'add' or otherwise provide data to a contract in the event that a contract logic does not specify a particular event, but leaves it 'to be determined' by the parties after the point of execution of the contract. This may address the paradigm of 'incomplete contracts'.

State updates that require such user input may be performed through a contract management interface or any other appropriate interface. Parties may also perform state updates, where appropriate, on third party applications, systems or platforms (e.g. via. API, chat-based messaging platforms/IRC, mobile application).

Third Party State Updates

State updates may be initiated by third parties (e.g. arbitrators, regulators or other third parties that verify a state). This mechanism may be useful where, for example, information is available only to a third party or a third party is trusted to effect a change of state. Third-party state updates may be substantially similar to the contracting party state updates except in variations for the involved parties. In one exemplary application of a third party state update, an arbitrator may effect a state update or revert the contract to a given state, or otherwise change the state of the contract, to resolve a dispute between the contracting parties. This can involve the contracting parties assigning their private keys to the arbitrator. Arbitration may be automated based upon the logic of the contract (e.g. arbitration may be required when particular breaches occur). In another exemplary application, a regulator may be a party on the network that may have permissioned sign-off on, and/or review of, certain state transitions. In another exemplary application, a third party involved in the execution of the contract may confirm that an event or action has occurred (e.g. that a good has been delivered, a good has malfunctioned, a service has been completed etc.). This process may be permissioned in the same way as other state updates (e.g. conditional upon a given event/update occurring, such as delivery, and only by the recipient party).

Hybrid State Updates

Hybrid state updates can include state updates that are some combination of other forms of state updates. Hybrid state updates may be state updates resulting from different forms of data input or output and/or various forms of party initiation. Examples of hybrid state updates can include state updates resulting from data and contracting party sign-off (e.g., data initiates a state update and this is signed by a party or multiple parties before updating the state of the contract), data and third party sign-off (i.e. data initiated state update and this is signed by a third party);, third party and regulator sign-off, data and one contracting party sign-off and one third party sign-off, and the like. These may be permissioned, un-permissioned, or any combination thereof, depending upon a chosen implementation.

State Update Proofs

The system and method may incorporate a mechanism through which state updates can be cryptographically proven and linked to the graph data structure. State update 'proofs' may be primarily used to verify 'data-initiated' state updates and the 'data initiated' element of any hybrid state update, particularly in instances where the parties do not wish to share raw data. 'Party initiated' and 'third party initiated' state updates do not necessarily require this mechanism as the state update is itself the proof.

This 'proof' mechanism may be implemented in any suitable manner for administering and organizing state updates. Exemplary methods may include but are not limited to secure multiparty computation, use of trusted hardware, use of a trusted third party, consensus logic, use of external resources, and/or other suitable approaches.

In a secure multiparty computation variation, secure multiparty computation (MPC/sMPC) is used to enable a given number of contracting parties, which each have private data, to compute the value of a public function on that private data while keeping their own inputs secret. The function is set by the logic. As a basic example, where x is a data input (e.g. temperature), and the logic of a clause stipulates that the temperature of goods during delivery should be 80°, then: $F(x)=80$.

The data may be fed from the graph/data store/BDL of one or multiple parties into a computing engine and the state can be detected by the logic querying the data (e.g. using 'store' and 'load' MPC protocols that enable processing). In the event that a positive query response is returned, its plaintext and metadata may then also be returned to the other parties to the contract. The privacy of the data on the blockchain is maintained as the queries are limited by the logic of the contract and are data is only returned in the event of a positive query response. All other data is obfuscated. This is an application of the 'privacy-preserving database query' concept in secure computation.

A trusted hardware variation may use a mechanism whereby data is sent to a third party computation engine which may be instantiated on trusted computing hardware (e.g. Intel SGX and attestation services) to compute the logic using the inputs. The state update mechanism is then preferably used as stated herein.

In a trusted third party variation, a trusted third party service may perform the state update process for contracting parties. Parties can check the data exposed to the third party without exposing the data to the other contracting party/parties. Disputes may be arbitrated through the third party or through an external process using the data records of the third party and/or the contracting parties and/or other third parties (where applicable).

In consensus logic variations, any arbitrarily consensus logic may be created and executed to automate state transitioning, which may leverage the situation where the signing logic of state updates is a construct in itself. Consensus-based state transition logic may include, but is not limited to: Practical Byzantine Fault Tolerance (PBFT), PAXOS, ScalableBFT, RAFT, Nakamoto Consensus, Ripple Consensus, and Proof of Stake economic game theory model.

The system and method may delegate the state transitioning functionality for state updates in this manner to a peer-to-peer or other network of nodes to perform the state transitioning (e.g. peer-to-peer network of nodes, a federated BDL network, federated group of notaries, or any other appropriate mechanism, method or application). Notaries are preferably of the server node type and may perform state transitioning functions and/or other services such as time-stamping and/or validating state updates, commits, amendments, etc. Node in a decentralized or distributed network can be party nodes (i.e., involved or contracting parties of the contract) or server nodes (i.e., non-party operated devices run for the maintenance of the network). Different variations may use different implementations.

This, as with any appropriate implementation, may also be used in conjunction with a form of BDL architecture, or other any other database structure, which is Content Centric Networked and used one-way hashing for UUIDs and stores the UUIDs in the Merkle DAG contract data structure.

In external resource variations, an algorithm or system may be used to verify data between the data source and the contract. For example, a cryptographic protocol (e.g. 'TLSnotary') may be used to provide evidence that certain web traffic occurred between the HTTP client or API data source and the contract at a given time. In one implementation, the versioning server is always also the "Auditor". This makes the versioning of the received TLS packets from the client simpler. This may enable the system to interact provably with data providers that do not provide native cryptographic proofs (e.g. web APIs, HTTP clients etc.). The so acquired data can be used as cryptographically verifiable input objects to the contract and underlying data structure.

A lightweight cryptography (LWC) protocol or similar may be used for edge computing/IoT devices. In addition, or alternatively, a Physical Unclonable Function (PUF) or similar may be used for edge computing devices.

The cryptographic proof may be stored in the state update to provide an immutable record of the data that interfaced with/input into the contract from certain applicable external sources (e.g. APIs, HTTP clients) and that this data resulted in a given change to the state of the contract. This enables the data that interfaces with the contract to itself be verified, thereby improving the integrity of the post-formation versioning process.

A preferred embodiment is that all input data happens, where supported, through a standardized CCN (or similar) where all data packets are 'Merkelized', tracked on commit servers, and signed by the original servers. An example would be a web-service or data-service API that output such signed CCN packets, as well as timestamps the packets on its own server. This way the system is independent of traditional certificate infrastructure and solely relies on public-private keys. Interoperability and cross-server versioning are the default this way, making tracking of input-output chains possible across any number of data producers and servers. Alternatively, an intermediary service may be used to perform this feature.

In addition, or alternatively, streamed/real-time (e.g. IoT) or other data may also be stored on a blockchain, distributed, or cryptographic database and used by the contract to provide a form of cryptographic proof.

4. Execution Environment

The execution environment is preferably used during the post-formation processing, enforcement, and/or execution of the COG data structure. The execution environment may additionally be used during the formation stage. The system and method can be implemented using any suitable execution environment. Preferably, the execution environment is a decentralized execution environment, which functions to distribute trust and provide operational redundancy. The execution environment may alternatively be a centralized execution environment or include a centralized sub-system. For example, the contract management system may provide a compute infrastructure for executing the graph data structure.

Figure 32:
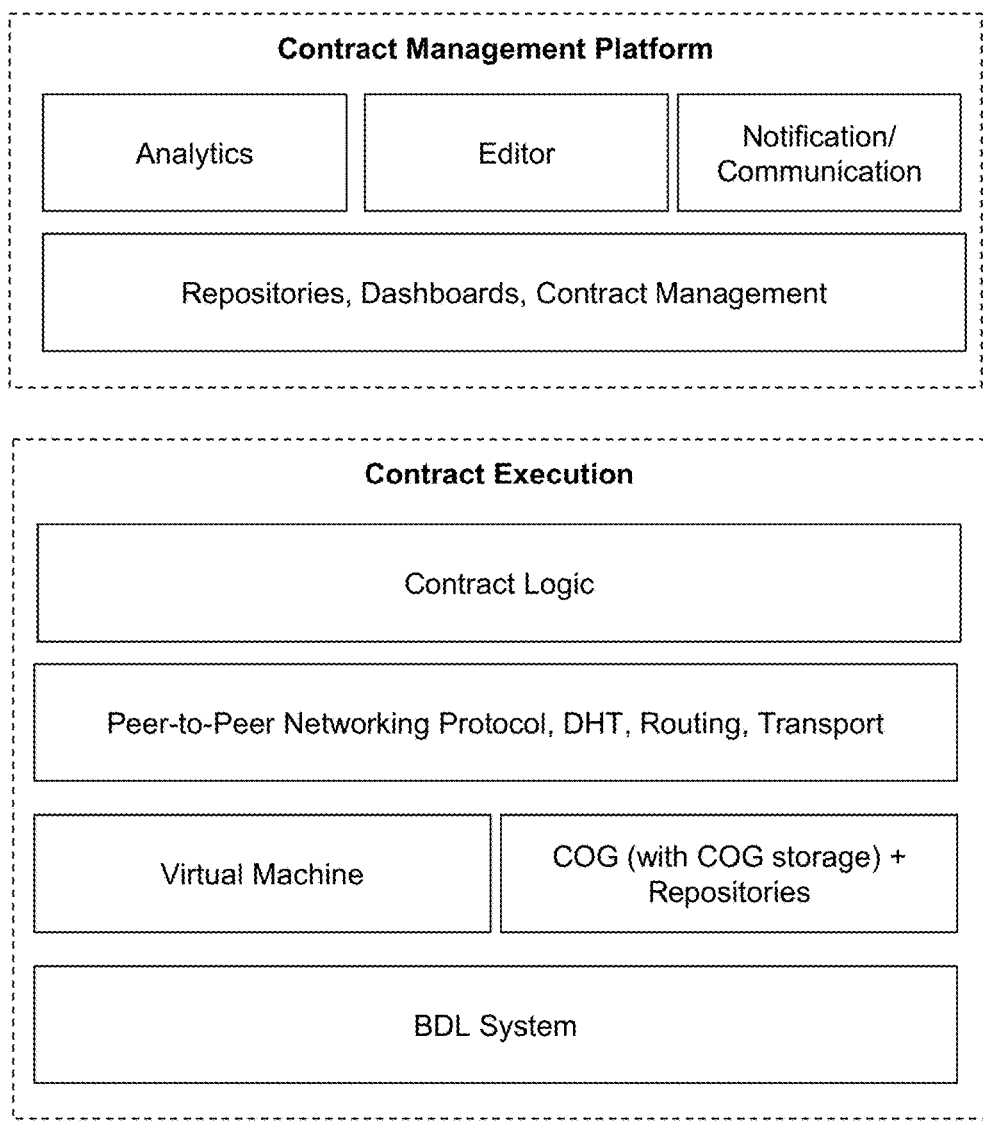
FIG. 32 is an exemplary depiction of the components that may be used in the system and method.

A preferred variation of a decentralized execution environment is to use a replicated distributed system such as a peer-to-peer networking or wire level protocol-based architecture for discovery of peers, message routing and transport, that supports replication so as to enable contracting parties to form, execute, and interact (e.g. via state updates) with computable legal contracts in a manner that replicates the state of the contract data structure, state updates, and other changes across the participants. Any suitable means of peer-to-peer networking may be used. For example, in one embodiment, a distributed hash table (DHT), Remote Procedure Calls (RPC) over a DHT or a version of HTTP may be used. Protocol Buffers are preferably used to serialize data structures for data transfer between the peers. Data is preferably encrypted (e.g. using public-key cryptography, key derivation functions, a cipher suite, encrypted handshake, etc.) so that messaging is secure, and only peers that are contracting parties are able to read data in each graph (e.g. if peers include non-contracting parties), particularly where messaging is not point-to-point/directly communicated between network nodes such as where the nodes are only contracting parties. The peer-to-peer networking protocol is used in conjunction with the graph data structure and data persistence components as shown in exemplary FIG. 32. Preferably, the system and method utilizes Conflict-free Replicated Data Types (CRDTs) for replication across multiple participants in a network, where the replicas can be updated independently and concurrently without coordination between the replicas, and where it is always mathematically possible to resolve inconsistencies that might result. This ensures that the contract state is eventually consistent between peers. Any form(s) of CRDT may be used (e.g. OR-Set, state-based, operation-based, etc.), but CmRDTs (commutative replicated data types) are preferred. State updates and other objects may be appended to an external shared event log/message queue, and then can then be replayed downstream by any replica to reach an eventually consistent value and thus state of the graph.

In one variation, a hybrid combination of a peer-to-peer and client-server model may be used. A variety of hybrid models may be used. In one such example, a centralized server or server cluster may be used to assist in routing or assisting in peers (e.g. contracting parties) finding one another.

Additionally or alternatively, the execution environments can include or use virtual machines, containers, servers, and/or alternative runtime engines.

Figure 33:
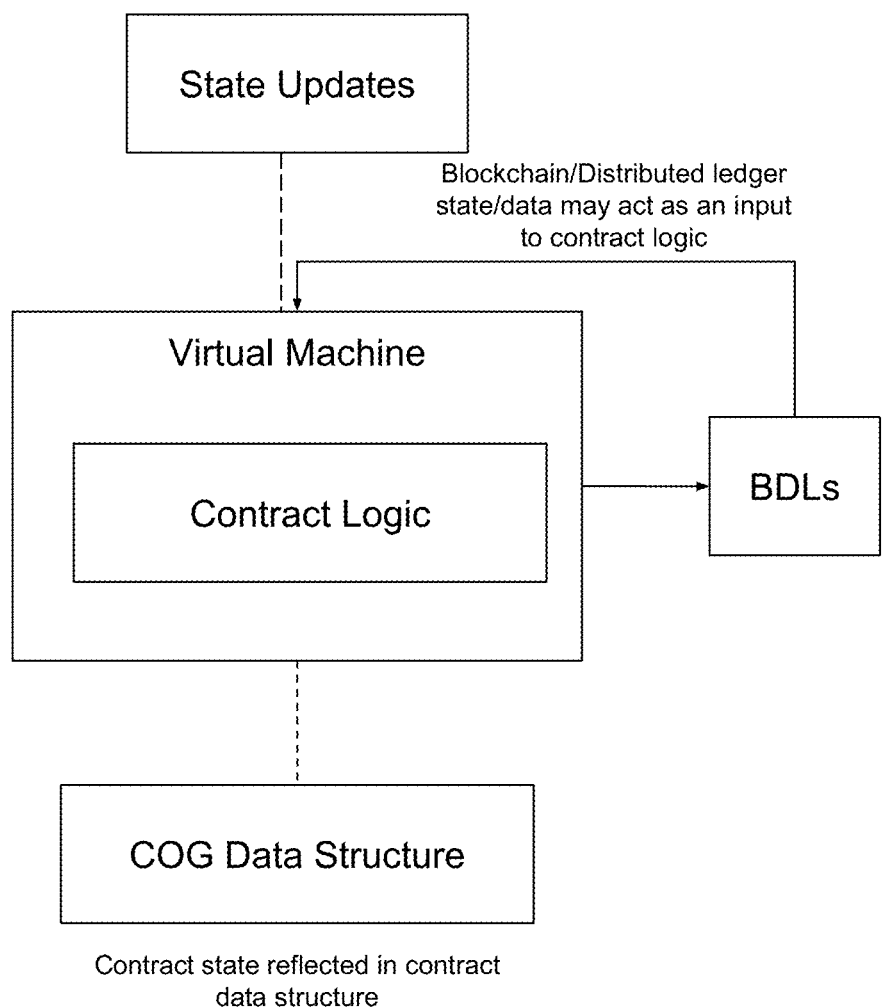
FIG. 33 is an exemplary schematic depicting an embodiment of the system and method where the contract is executed using a virtual machine runtime.
Figure 34:
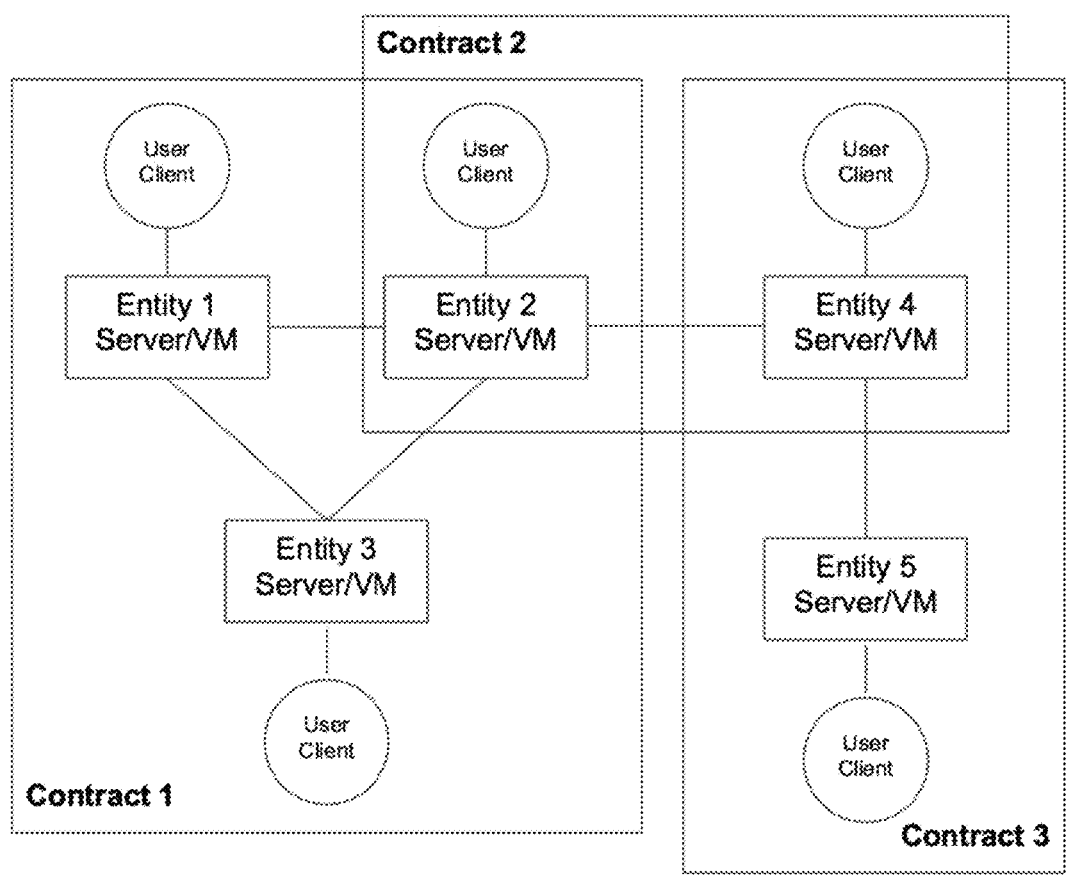
FIG. 34 is an exemplary schematic representing an exemplary method of communicatively linking virtual machines/servers between users the system and method as part of a contracting platform.

A virtual machine variation is preferred and may utilize a virtual machine (VM) runtime environment run by all of the parties and participants to a contract (e.g. as nodes on the peer-to-peer network—as depicted in FIG. 40), series of virtual machines, and/or sandbox(es) for forming contracts, and executing the logic of, and updates to, contracts and/or graph data structures. A VM is preferably configured to enable interactions with outside applications and services through application layer protocols or other suitable communication channels. The VM may be distributed, centralized, or take any other appropriate form. In some variations, contracting parties act as a node in the execution environment and may each run a VM runtime environment (see FIG. 40). However, other variations may alternatively use server nodes in the execution environment and/or combination of contract party nodes and server nodes. Server nodes (or other non-party nodes) may be used to support the network, and may be particularly beneficial in the event that a contract party node is offline or unreachable. FIGS. 33 and 34 depict exemplary methods of implementing one or more virtual machines.

A first embodiment is to use a VM as the runtime environment to execute contracts between participants (contracting parties and any third parties). The VM may execute multiple contracts simultaneously/in parallel, but each contract is preferably executed separately. The VM runtime environment operates by managing the execution of the contract, transitioning of the graph data structure, and other services (see FIG. 40).

Each party that runs the VM may be a node on a, preferably peer-to-peer, network and may be seen to represent: (a) a contracting party, entity, individual enterprise, company, group, or similar, or (b) where applicable, another entity. Data from that contract is replicated or otherwise distributed across all users of the VM whose users are participating in a given contract. The VM computes state updates and then broadcasts to the parties and third parties, as determined by the logic. These are then confirmed in accordance with any permissioning requirements.

Any appropriate virtual machine specification may be used. The VM may be language-based or bytecode-based; which may depend upon the implementation of the contract logic (e.g. language type/specification etc.) and whether a BDL that uses a virtual machine instruction set is used in a given implementation (e.g. the VM may be used to also execute operations on the BDL). Where language-based, the original code is executed and therefore enables ease of verification. Where the VM is bytecode based, the VM may act as both a compiler and interpreter. Compilation is preferably executed in a just-in-time manner. The VM may use a Turing-complete or Turing-incomplete instruction set (depending upon the language type/specification etc.). Where suitable for a given implementation, the virtual machine(s) should follow a stack-based architecture (virtual stack machine): each instruction performs operations on a data stack, working on the items on top of the stack. In a preferred embodiment, the VM executes the predicates encoded as a sequence of opcodes.

The VM model may perform various operations, including (but not limited to): (a) executing machine readable contract logic and state updates; (b) compiling data-driven contract machine readable logic to arbitrary bytecode for execution (e.g. on BDLs); (c) executing bytecode; and (d) computing the graph data structure. Alternatively or additionally, the VM may not compile, where appropriate, to a BDL but may support native execution of contracts the Application Binary Interface (ABI) or similar of any BDL, where appropriate. A computational limit may be used to limit potentially unrestricted use of computational resources. Code may also be interpreted rather than compiled.

Users may, in a preferred embodiment, interact with the VM through a contract management system that enables parties to view the state of a contract, send state updates, receive notifications of state updates etc.

Alternatively, a VM may be used only to execute transactions/operations on the BDL, and the remainder of 'off-chain'/'off-ledger' operations that relate to contracts are executed using the P2P networking protocol (DHT routing, transport, etc.), as aforementioned.

A container variation may execute a contract in part or whole in a container or series of containers (e.g. for each clause). The container may be deployed from contract repositories (where used) and interacted with via bi-directional RPC channels. Changes to the state of the contract in formation or post-formation may be applied to the graph data structure and/or executed on a BDL. Alternatively, containers may be used only to execute transactions/operations on the BDL, and the remainder of 'off-chain'/'off-ledger' operations that relate to contracts are executed using the P2P networking protocol (DHT routing, transport, etc.), as aforementioned.

In a server variation, a federated network of servers may be used to execute contracts as shown in exemplary FIG. 34.

Alternative runtime/computation engine and architecture run my multiple or individual parties may be used in executing the contract in part or whole. The execution environment variations or alternative implementations can additionally be used in combination.

Formation

In the formation stage of the contract lifecycle, the execution environment can be used for exchanging commit messages to form the state of the contract prior to execution. Different execution environments may additionally be used for formation and post-formation. In this variation, transitioning from formation to execution of the COG can include deploying the COG in the post-formation execution environment.

Post-formation

In the post-formation stage of the contract lifecycle, the execution environment is used to manage the process of executing, updating, and versioning the executed state of the contract and graph data structure. The contracting parties' servers/virtual machines use the COG data structure to compute and maintain a preferably consensus-based, cryptographically secure state of the legal contract.

The graph data structure may be stored: (a) in a centralized location; (b) replicated between and stored by the cluster/parties to the contract and/or other parties; or (c) a hybrid in which both may be used.

As part of the aforementioned permissioning configuration, or where a signing contract/construct is used, an order in which the parties are to sign state updates (where appropriate) may be implemented. Where this is the case, the ordering of state update signatures will reflect this. Where no such pre-agreed order is implemented, the state update sign-offs may be performed in the indicative manner below.

In one variation of the aforementioned embodiments, the state update exchange and signing process may be a 'contract' in itself (including "smart contract" code on a BDL) defining the logic and order by which the synchronization and signing process happens (e.g. a PBFT or other consensus algorithm/mechanism).

Exemplary state update process between three 'users' would follow a similar pattern of receiving a contract state update, which includes initiating state update, validating state update if configured for validation. This process can be repeated for other state updates.

When initiating the state update, where a state update is data-initiated or a hybrid, it is preferably sent to each user directly and simultaneously. Where the state update has no data component (e.g. a 'party-' or 'third party' initiated state update), the first user sends a signed state update to the contract data structure on their server or the VM in accordance with an embodiment of the system and method.

Validating the state update, can include notifying the other users needing to sign the state update (based on the permissioning configuration). If no other parties need to sign the state update, it takes effect and can be appended in the contract data structure. Where other parties need to sign the state update, the VM may perform a series of checks on the first party's state update message which may include (but are not limited to): validating the state update message signature; validating any metadata relating to the state update; validating the HTTP request's auth signature (or similar, depending upon the protocol implementation); and/or validating whether the contracting users' permissions under the contract allows the signature to be sent (e.g. if the party has permission). When the state update is checked and signed by the other users, the state update is finalized and reflected in the contract data structure.

The process may then be repeated with any further state updates.

Alternatively, state updates may be organized in a model supporting eventual consistency (e.g. through use of CDRTs, as aforementioned). In one exemplary implementation, state updates are coordinated between the users and may not be added to the contract data structure until being finalized between those parties.

In an example of user coordinated management of state updates, first a first user may send a state update to a contract on their server/VM. The message may be cryptographically signed (e.g., using a public/private key pair).

Second, the user's server/VM adds the message to its own local contract data structure, linking it to the most recent unlinked object(s) in the graph. The server/VM then signs the message including the signatures of the parent objects to calculate a tamper-resistant signature for the history.

Third, the server sends the signed message over HTTP(S), a peer-to-peer wire protocol, a BDL structure, or other appropriate protocol to the servers/VMs of other parties to the contract;

Fourth, the other users needing to sign the state update (based on the permissioning configuration) are notified. If no other parties need to sign the state update, it takes effect in the contract data structure. Where other parties need to sign the state update, the VM may perform a series of checks on the first party's state update message which may include validating the state update message signature; validating any metadata relating to the state update; validating the HTTP request's auth signature (or similar, depending upon the protocol implementation); and validating whether the contracting users' permissions under the contract allows the signature to be sent (e.g. if the user has permission).

Sixth, a second user sends a response to the first user's state update, and the second user's server/VM links this state update message to the most recent unlinked message in their version of the executed contract data structure.

Seventh, a third user also responds to the first user's state update message. The state of the contract on each user's server/VM therefore differs i.e. first user signed on first user's server/VM; second user signed first user's state update message on second user's server/VM; third user has signed first user's message on third user's server/VM.

Eighth, the second user's server/VM relays his message to the other contracting parties (first user and third user). The third user's message history will be out of sync with the first and second's history as both the second and third's message will follow the first user's message.

Ninth, the third user's server/VM relays the message to the other parties. A consensus algorithm (or other appropriate algorithm or mechanism) may be used to reach consensus as to the order of the messages.

Finally, the process is repeated (where appropriate) with further state updates.

The foregoing is exemplary, non-exhaustive, and indicative. Steps may be removed, added, or amended. Other approaches may be taken to execute state updates to the graph data structure.

In a further variation, state updates may be added as a record or transaction submitted to a blockchain or distributed ledger structure. These states are signed between the contracting parties and/or other parties on the BDL, executed by the contract, and reflected in the graph data structure consistent with the aforementioned embodiments.

5. Object Ledger Structures

The graph data structure may also support various modifications, additions, or extensions. One such implementation of note would enable the logic of the contract and the graph data structure to execute transactions on, or otherwise add/append/broadcast data and/or objects to, one or more BDL structure(s) appended, linked, or otherwise connected to or used by the COG data structure as shown in exemplary FIGS. 24A, 24B, 35, 36, and 37. The 'object ledger' preferably stores state objects that represent the current state of a contract and other data pertaining to it. Data pertaining to the contract can include data such as contract hashes, state changes, commits, and the like, and depends upon a given implementation of the system and method.

Depending upon the usage of the ledger (e.g. if it is accessible/usable by nodes other than those party to a given contract), the aforementioned peer-to-peer network may be seen as a form of overlay network above the BDL layer (which may include object ledgers and other BDLs such as public and private BDLs upon which transactions may be performed). Preferably, the 'object ledger' acts as a ledger for each contract and may extend to store data that which is related to a given contract, but is not exclusively data from that contract (e.g. data that would not or may not be stored in the graph data structure of a contract in a given implementation), such as events relating to a transaction—custody of goods in shipping evidenced by IoT data, related documentation (e.g. letters of credit, packing lists, invoices, etc.—whether computable, natural language or a hybrid). Data may be added as a hash of a document (e.g. when hosted on Interplanetary Filesystem protocol), added directly as a document stored in the ledger structure, or by other appropriate means.

The 'object ledger' layer may be distinct from other BDLs used (e.g. private or public BDL systems that are not confined to the involved parties to a contract and associated transactions). Preferably, an 'object ledger' is only accessible by the contracting parties and parties involved in a given transaction but that may not be party to the contract itself (e.g. trade financiers, logistics services etc.). The object ledger preferably acts as a point of aggregation that stores events and state of the contract and other data that does not emanate from the contract or COG(s), preferably chronologically. In a preferred embodiment it is not used to execute transactions, as distinct from BDLs. Notably, the object ledger may sit above and interact with a plurality of BDLs—permissioned, public, and private. For example, an object ledger may store data from 'use case specific' BDLs (e.g. trade finance, asset issuance and management, supply provenance etc.) and 'generalized' computational BDLs, as well as objects and data from the COG(s) for the contract. As such, the object ledger may be seen as a layer between 'transactional' and other BDLs and the COG(s).

Any suitable BDL protocol or implementation may be used for the object ledger (with any suitable consensus mechanism/algorithm or without a consensus mechanism/algorithm); which may depend upon, or be informed by, the type and application for which the contract is to be used. Certain protocols or implementations may be better suited to a given type of contract. BDLs may be permissioned, private, public, use an Unspent Transaction Output ('UTXO') model and/or an 'account' model, a separate Merkle DAG structure as shown in FIG. 11, and/or any other appropriate form.

Figure 24A:
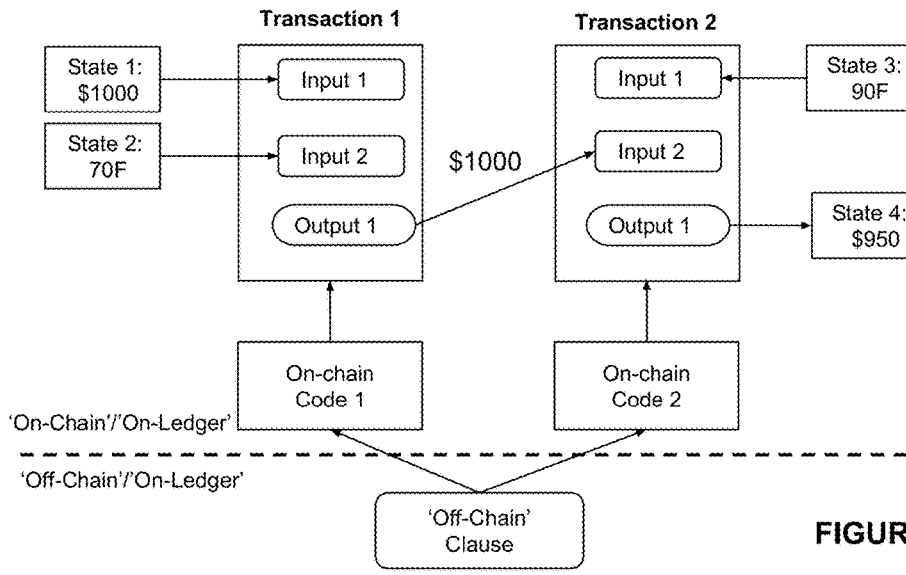
FIGS. 24A and 24B are exemplary schematics representing the interaction between a clause in a contract and 'on-chain'/'on-ledger' code on a distributed ledger utilizing an Unspent Transaction Output (UTXO) model.
Figure 24B:
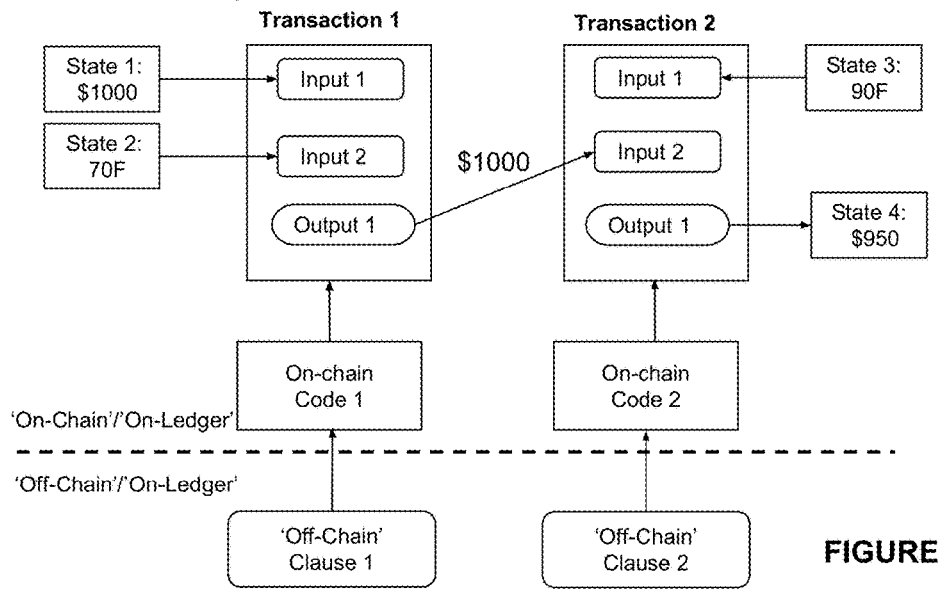

As shown in FIGS. 24A and 24B, an exemplary interaction between a clause in a contract and a BDL can include executing/performing UTXO transactions via 'on-chain'/'on-ledger' "smart contract" or other code. A transaction consumes zero or more states as inputs and creates zero or more new states as outputs. State updates are applied using transactions, which consume existing state objects and produce new state objects. States recorded on the ledger are final and immutable; errors must be processed through a subsequent transaction. The ledger is defined as a set of immutable state objects. Unspent Transaction Outputs (UTXOs) are used to determine whether or not transactions are valid. All inputs to a transaction must be in the UTXO database for it to be valid. States are recorded on ledger if at least two parties are in consensus as to its existence and details. Otherwise, states are held by only one party 'off-chain'/'off-ledger'.

One or more 'off-chain'/'off-ledger' clauses may reference, or be compiled to, deploy/insert, invoke, modify values, and/or pass data/objects to, one or more 'on-chain codes', as stated herein. Once an 'off-chain' clause is triggered, the 'on-chain' code(s) are invoked, objects are passed to 'on-chain'/'on-ledger' code, or compiled (depending on the implementation) and execute the business logic as a transaction on the ledger/chain. In the example provided by FIGS. 24A and 24B, a transaction consumes an asset value state and a temperature state, and produces another asset value state as output. If the temperature is below 80 F, the asset keeps the same value. Otherwise, there is a 5% deduction for each 10 F increase on the asset value. The states are preferably read from and written to ledger via the 'on-chain'/'on-ledger' code. In order to manage a significant number of clauses, a preferred embodiment of the system and method supports parallelization of clause/contract execution by enabling 'off-chain' clauses to be processed in parallel on different nodes of the cluster. Contracting parties can agree on 'off-chain' clause validity by independently running the same clause. This order invariance and parallelizability property may provide scalability benefits. Parties can reach certainty that a proposed update transaction defining output states is valid by checking that the associated 'on-chain' contract code runs successfully, and any transactions to which this transaction refers are also valid. This transaction is the unique consumer of all its input states. No other transaction consumes any of the same states. The input states of a transaction are exclusively consumed by the transaction.

Figure 37:
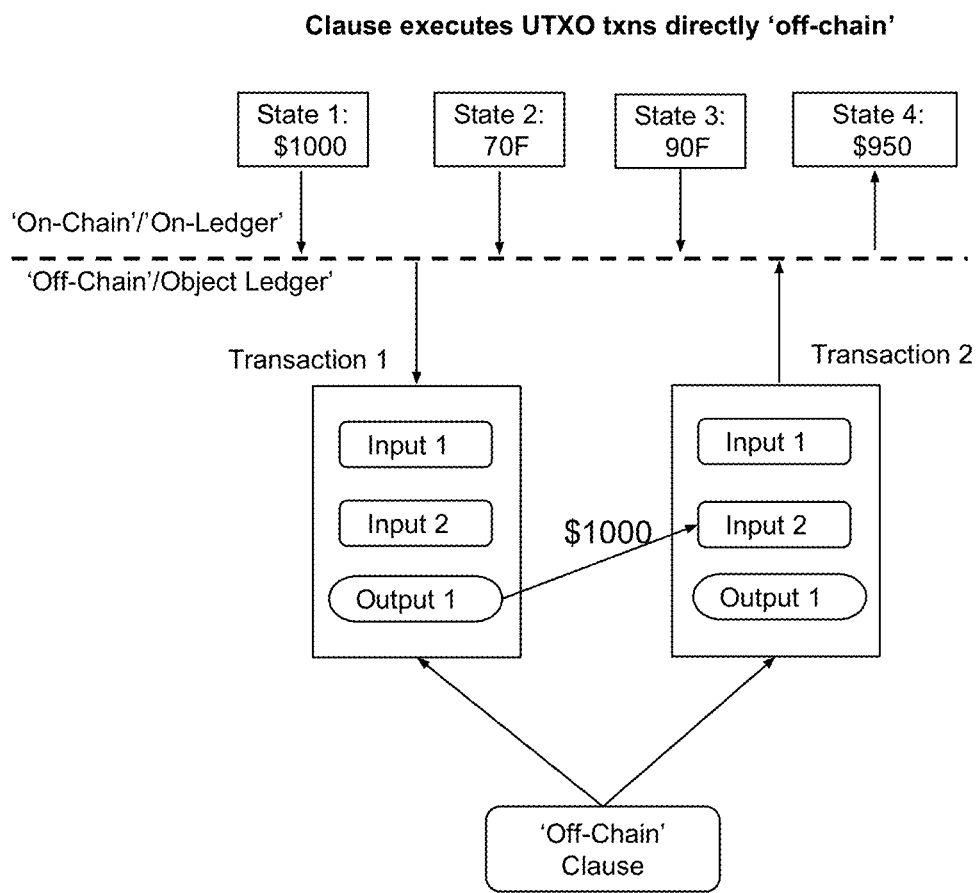
FIG. 37 is an exemplary schematic representing the interaction between a clause in a contract and both input and output data on blockchain/distributed ledger utilizing an 'off-chain'/'off-ledger' UTXO model.

As shown in FIG. 37, an alternative exemplary interaction between a clause in a contract and a BDL can include executing/performing UTXO transactions directly 'off-chain'/'off-ledger' on the object ledger (distinct from a BDL such as a public blockchain system). In this embodiment, the transaction logic is implemented in the 'off-chain' clause, rather than using 'on-chain'/'on-ledger' code. FIG. 37 depicts the same business logic of transaction as FIGS. 24A and 24B, however the 'off-chain' clause is used to retrieve and persist states on ledger rather than the 'on-chain'/'on-ledger' code. Either or both embodiments may be used in a given implementation of the system and method.

Blockchain/distributed ledger data structures may also be used as a structure for storing data to be used as inputs to the contract (e.g. from edge computing devices, IoT data, transactions from external systems, applications, BDLs, webhooks, HTTP clients, APIs, databases, ERP/CLM/IMS, etc.) aide from other applications where data is otherwise generated 'on-chain'/'on-ledger' and then used by the contract.

These structures may themselves connect to, or otherwise interact with, other BDLs and protocols through a suitable programmatic mechanism such as by using an atomic cross-chain protocol, 'smart contract' scripts, APIs, 'sidechains', parallel chains, relay chains, or similar interoperability protocol or mechanism of connecting homogenous or heterogeneous BDL protocols/implementations (e.g. Interledger, Polkadot etc.). A preferred embodiment uses a singular chain for both inputs and outputs to the contract that may be queried via API or other method to provide filterable lists of transactions, events, and other data to users. Multiple chains/ledgers may interact with the contract ledger/chain. An alternative embodiment may use one or more 'input' BDL(s) and one or more 'output' BDL(s). The same or different protocols may be used.

Objects from the COG data structure may be appended/added to the BDL (which may be transposed directly and unedited from the graph or may have metadata removed, obfuscated, or added). For example, an update object may be added to a BDL for the contract to make parties that are not privy to the contract, aware of a state change. Similarly, an event object may aid 'workflow' between participant nodes on the BDL. Further still, a transaction object may be used to replicate or record the performance of an operation or execution of a transaction performed on an external system, entity, application, protocol etc.

Removal or obfuscation of data may be beneficial where a BDL is used to share data with third parties/participant nodes on the BDL or other such data structures that the data may be used on. This process may occur in a number of ways including (but not limited to) encryption and obfuscation of transaction data. Firstly, this may occur by encrypting the data on the ledger. For example, transaction content may be encrypted with key derivation functions to ensure only intended participants may see the content of the transaction data. Symmetric key encryption, for example, may be supported in the process of offering transaction confidentiality. The transaction creator generates an encryption keypair for the 'on-chain' code deployed. A key pair is generated for each transaction. The transaction content is encrypted by the private key. The participants request public key to decrypt the data. Processed transactions are stored on the ledger in their original form with content encrypted such that only validating nodes can decrypt them. When the state object is changed by a transaction, the state is retrieved (decrypted) and updated (encrypted) after the transaction execution is completed. The decrypted 'on-chain'/'on-ledger' code is passed to a container to execute. Then, encrypted updates of that 'on-chain'/'on-ledger' code state is committed to the ledger with the transaction. Secondly, this may occur through use of 'Merkle branches' where transactions are split into leaves; each of which contains either input, output, command or attachment. Merkle branches enable data to be hidden whilst providing proof that the data formed a part of a transaction. A Merkle branch is a set of hashes, that given the leaves' data, is used to calculate the root's hash. The hash is compared with the hash of a whole transaction to determine whether given data belongs to that particular transaction without exposing the entirety of the transaction data.

Alternatively or additionally, data may be added to the BDL structures (e.g. in the same mechanisms as stated herein) that are not included in the graph data structure. For example, data from other systems, applications, BDLs, databases, APIs, "smart contract" code, 'on-chain/on-ledger' multi-signatures, and others as shown in exemplary FIG. 35. This enables the ledger state to the contract to store the state relevant to the contract that does not itself, emanate from, or is not related to, the contract logic or the graph data structure. For example, in a supply contract these may include (but are not limited to): trade finance transactions on other systems/BDLs, documentation such as purchase orders, packing lists (or identifiers/references or data pertaining to the same). These may utilize the disclosed system and method, or may take any other suitable form (e.g. UUID/identifier of BDL transaction(s); records/references on external systems, other identifiers such as IPFS hashes, multi-signature data, etc.). Other contract types (and therefore other examples of data not included in the graph may be added). These objects/data (and/or the external data they reference) may then be used, where appropriate, by the logic of the contract in the manner stated herein or any other appropriate manner (e.g. a state of a contract may be updated when a purchase order or letter of credit is issued and/or approved by the contracting parties). 'On-chain'/'on-ledger' code may be implemented to automate workflows (e.g. approvals, signatures, etc.) using the 'on-chain'/'on-ledger' data.

In a preferred embodiment, metadata relating to the graph state may be stored along with the objects (and may include their associated metadata) in the distributed ledger. For example, the Merkle root of the graph data structure may be added to give reference to the state of the graph at the point of the data being added to the BDL. Other metadata and/or objects (or part thereof, e.g. UUIDs) from the graph may be used to reference the relationship. These references create a link between the state of the graph and the state of the data in the BDL. A further exemplary application may involve storing the entire COG (or part thereof) in the BDL structure (e.g. at the time of the state update and/or transaction) (see FIG. 36 for an example), such as by storing the Merkle root of the contract and/or the concatenated hash of any other objects (e.g. clauses, sections). To facilitate data deduplication, in a preferred embodiment, only those objects that have changed from the previous state need to be stored.

A further implementation would enable contracts to be versioned in the formation stage using the BDL by sharing commit objects using a BDL data structure.

The aforementioned blockchain/distributed data structures may support/utilize 'smart contract' scripts that exist 'on-chain' to automate actions on the BDLs. In one implementation, an object or multiple objects from the graph may be used as inputs to, passed to, or otherwise used by, one or more such scripts. This may effectively enable the COG to act as an 'oracle' to the BDL. Alternatively, the data on the BDL may be used in such scripts (e.g. through compilation to bytecode of a ledger virtual machine, calling an 'on-chain'/'on-ledger' rules engine(s), or other appropriate method).

Interaction with BDLs may occur in a number of different ways such as an API interaction, interaction involving compilation to virtual machine bytecode, interpretation of off-chain/off-ledger clauses, interaction with BDLs, and the like.

In an API interaction variation, clauses may interact with BDLs using ledger agnostic APIs. Each 'off-chain' clause has a reference to one or more pieces of 'on-chain'/'ion-ledger' code. The corresponding 'on-chain'/'ion-ledger' code is deployed and invoked on ledger. This mechanism controls the transaction validation on ledger only for parties involved in the transaction rather than the entire network, which makes the system more scalable and provides strict privacy guarantee. Operations that are executed 'on-chain'/ 'on-ledger' may pertain to: (a) transactions to be performed 'on-chain'/'ion-ledger' using 'on-chain'/'ion-ledger' code; (b) inserting/adding data that does not necessarily relate to transactions but needs to be known by the parties (e.g. an output from a clause); (c) objects from the graph being used in 'on-chain code', or any other appropriate operation.

An example of deploying 'on-chain'/'on-ledger' code may include
POST <host:port>/{dl}/deploy

```
{
"codepath": "/opt/code",
"params": ["a", "100"]
}
```

Where '{dl}' is the specific BDL protocol to use; 'deploy' is one of the actions supported by a specific ledger; 'codepath' could be either the local path of 'on-chain code', a repository URL, or any other suitable path; 'params' refers to a list of values to initialize the 'on-chain' code.

An example of inserting a state 'on-chain'/'on-ledger' may include
POST <host:port>/{dl}/insert

```
{
"key": "uuid",
"value": "hashcode"
}
```

Most of the distributed ledgers store states as key-value pairs. The 'key' is preferably a unique identity of a state, while the state 'value' could be any string or other object. APIs may also be used to retrieve state values by keys or otherwise.

In a variation for compilation to virtual machine bytecode, the 'off-chain' programmable clauses, where written in a high-level language, may be compiled to the native instruction set of a given target virtual machine. This can be achieved by compiling the high-level language into an Intermediate Language (IL), which can then target any number of virtual machine instruction sets through a pluggable backend bytecode generator. The compiled virtual machine code can then be deployed natively to any BDL and may interact with other 'on-chain' bytecode and consume 'on-chain' data.

Alternatively, the 'off-chain'/'off-ledger' clauses are compiled to source code of another high-level programming language, which are used as 'on-chain' code languages supported by the specifications of specific BDL protocols. Such source-to-source compilation is implemented by using a transcompiler, and the target source code is compiled to bytecode, which is executable on the target BDL(s).

In an interpretation variation, 'off-chain'/'off-ledger' clauses can be interpreted from source code into machine code during execution, rather than compiled.

In a variation interacting with 'on-chain'/'on-ledger' repositories, sets of predefined 'on-chain' code are stored in an on-chain code repository or series of repositories. Each 'off-chain' clause may reference any number of 'on-chain' scripts. Once the 'off-chain' clause is triggered by a contractual operation, object(s) added to a graph data structure (or other storage mechanism where used), or other operation, the referred 'on-chain' code, if applicable, is deployed and invoked to execute on the BDL. This could be a pure function and passed to 'on-chain' code as a parameter, built-in functions which are invokable by input events, or any other suitable implementation. It will be triggered by some other events, and executed on BDL(s). But not every ledger supports "function" as an input.

This provides a number of potential benefits including, but not limited to, the following.

Firstly, it provides the potential benefit of having a native BDL structure for each individual contract and enabling this structure to interface directly on an input-output basis with other BDL structures. This may be particularly useful where data from another BDL needs to be input, or exposed, to, and/or a transaction performed by the logic of the contract on one or more chains/ledgers. Furthermore, it may provide an approach for contract state to be maintained between the parties and data from that contract to be added/deployed to a BDL when required, rather than sharing all data. Secondly, data that is stored on any such external BDL may be reduced, with benefits to the external blockchain and use of computational resources of users of the blockchain. The hybrid 'on/off-chain' structure enables the aforementioned benefits of the graph data structure for contracts to be used with (e.g. flexibility of computation, ease of adding and modifying logic and others) as well as potentially simplifying or 'commoditizing' 'on-chain'/'ion-ledger' logic by separating contractual logic from business process logic that occurs on-chain'/'on-ledger'. For example, set pieces of logic may be used, deployed, and re-used, 'on-chain' to perform business processes such as issuing and transferring assets, making payments etc., without the added complexity of storing all contractual data 'on-chain'. Thirdly, third parties may access only to the BDL portion of the data structure (or part(s) thereof), and not the contractual logic or contract data structure itself. When storing or adding data in this manner, objects and/or data may also or additionally be obfuscated or encrypted. Fourthly, the BDL data structure(s) may be used to connect to/share or use data from, or to, other BDL data structures.

Another implementation is that the BDL structure(s) appended, or otherwise connected, to the contract data structure may, as aforementioned, be used as the basis for a 'workflow' or 'event-based' structure in the lifecycle of a contractual agreement that extends beyond simply the execution of the contract between the contracting parties, but exposes data to other parties that may be beneficial for the execution of the contract lifecycle and/or enables other parties to add data/transactions to the BDL. For example, a contract for the supply of goods utilize a BDL data structure that stores some or all of the subsequent data, transactions, events, and other interactions relevant to the process of performing and executing a given contract (e.g. between the contracting parties inter se, the contracting parties and third parties, and actions taken by third parties in respect of the supply contract such as freight/logistics, trade financiers, insurers, customs etc.) as well as documentation (e.g. invoices, packing lists, customs documents, bill of lading, shipping orders, waybills, insurance certificates, import/export licenses etc.). These transactions or additions may be performed natively on the BDL connected/appended to or otherwise used by the contract, or my replicate or otherwise use data or transactions initially performed on other BDLs. This provides the potential benefits of: (a) enabling data to easily interact with the contract logic and data structure and vice-versa; (b) enabling data, transactions, events or similar that are external to, or not required by, the logic of the contract to be appended to the contract for tracking its wider execution—both as a record store and to enable related, but extra-contractual, events to be tracked; (c) enabling an end-to-end record/data structure for a contract—inputs to the contract; processing of the logic of the contract; storing actions, operations, events etc. that occur under the logic of the contract; storing/sharing outputs from contracts—thereby enabling end-to-end contract lifecycle management (CLM); (e) exposing some or all contractual events to third parties (other participants/nodes on the BDL data structure) without sharing unnecessary or sensitive data from the contract. The latter is particularly beneficial as 'real-time' or near 'real-time' state changes to a computable contract may be used to assist other participants in coordinating, executing, or organizing dependent or subsequent events in the 'workflow'/wider execution of the contract (e.g. delivery of required documentation under an international sales agreement obligates the buyer's bank to send payment under its letter of credit with the buyer; the receipt of equipment under a purchase agreement may be a precondition to the equipment maintenance obligations of a service provider; a sale of goods or the receipt of payment pursuant to a supply agreement may trigger credit availability under the buyer or seller's financing agreement with a separate entity; an indemnification claim under a services contract may trigger an insurance company's duty to investigate and defense the claim).

Figure 35:
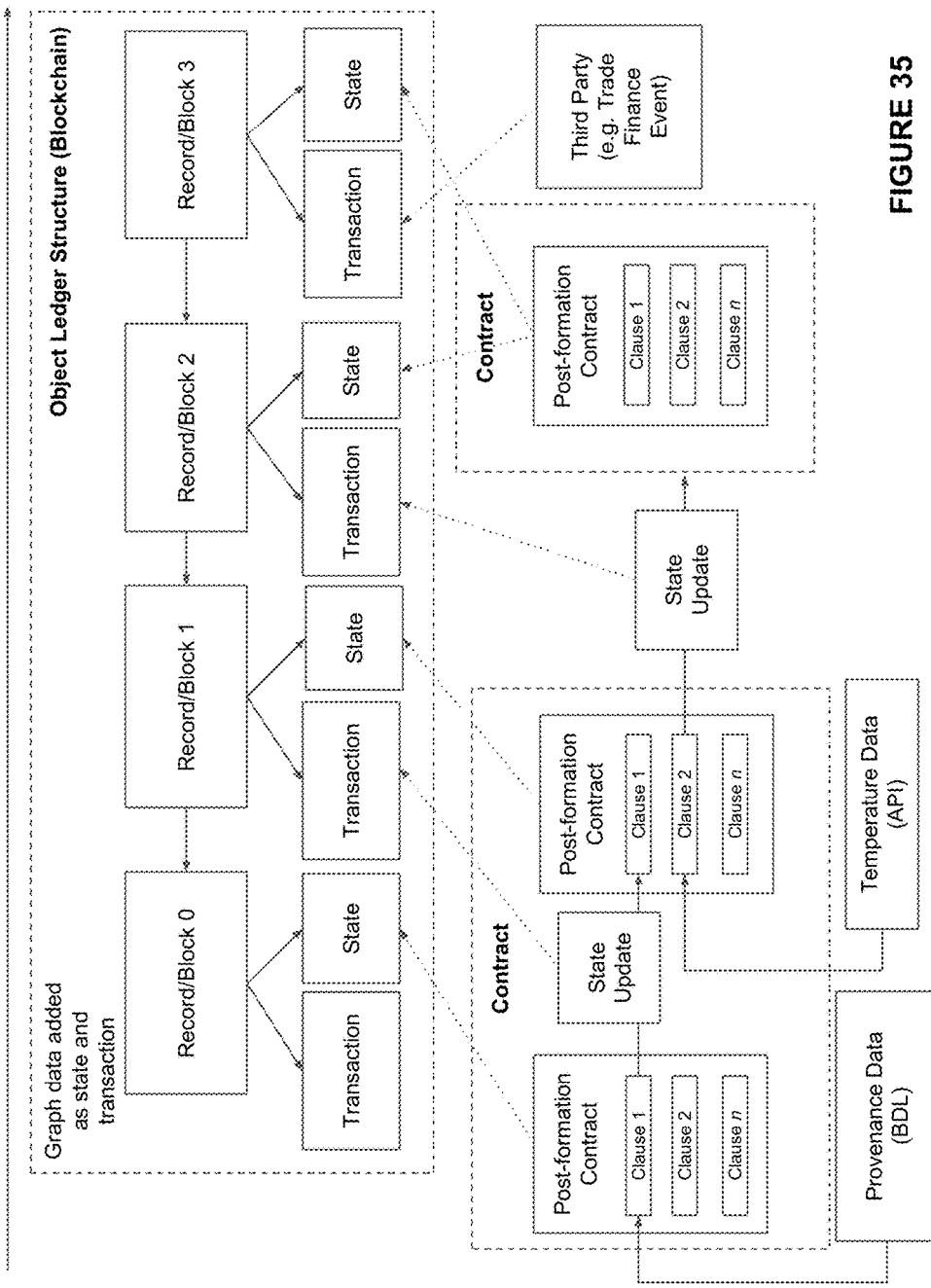
FIG. 35 depicts an exemplary representation of an interaction between a blockchain data structure and an exemplary state of an exemplary contract as it executes.
Figure 36:
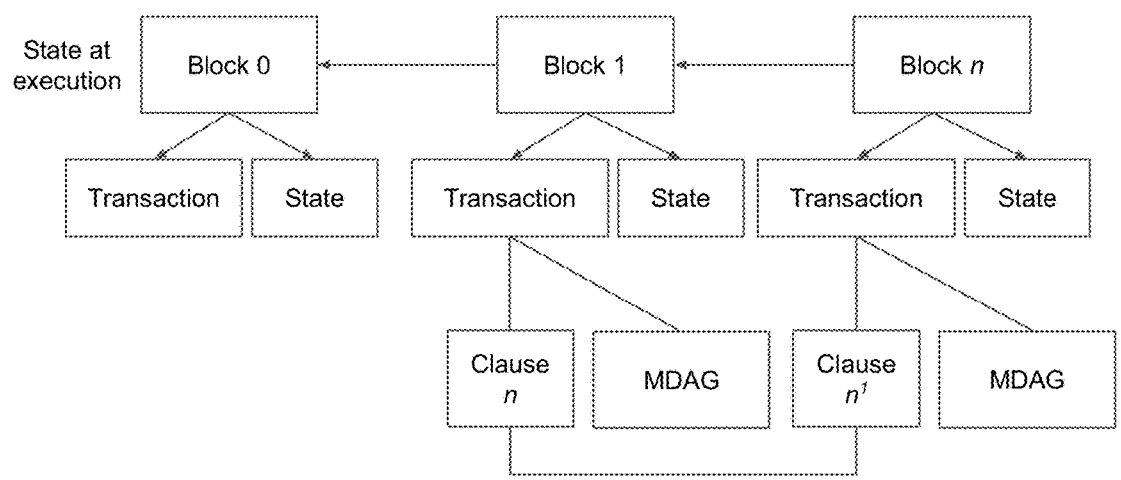
FIG. 36 is an exemplary schematic demonstrating the referencing/storage of the graph data structure (or part thereof, e.g. a Merkle branch) in a BDL.

FIG. 35 provides a simplified example demonstrating the interaction between the contract and object ledger data structure with external 'transactions' or events that occur in the management/lifecycle of the contract. For this purpose, not every interaction from the contract need be stored on the BDL data structure: only those that need be exposed to other participants of the blockchain as part of the 'workflow'.

As indicated, an embodiment may involve the contract data structure and/or the blockchain data structure outputting data to external resources (e.g. to APIs, BDLs). Inputs and outputs to the contract may be stored as 'transactions'. Data from external resources may be drawn in from other BDLs (e.g. using an atomic cross-chain transfer protocol or similar) or from an appropriate external system, API, application, protocol or data structure.

Figure 38:
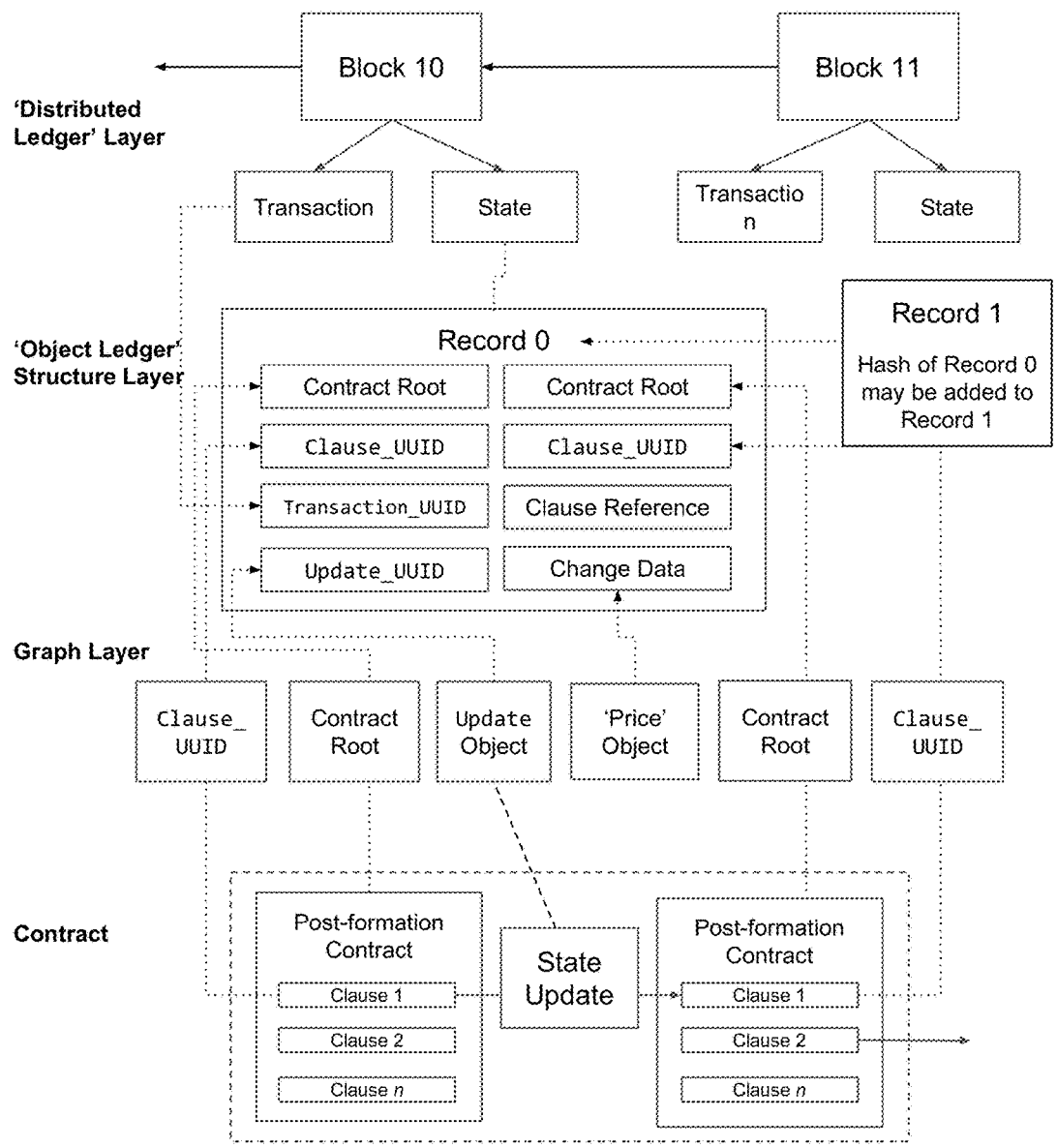
FIG. 38 is a schematic depicting one exemplary embodiment of a COG data structure interacting with a ledger structure.

FIG. 38 depicts one potential embodiment of the system and method whereby an object ledger structure is used to store data from the graph (and other sources). This enables data to be shared from the graph data structure to third parties that are not party to the contract via the ledger. Any appropriate BDL model may be used. Data may be added to the ledger structure when events occur under the contract; either manually by the parties or added by 'on-chain'/'ion-ledger' "smart contract" code, by a contract management system, the logic of the contract, or by any other appropriate mechanism. Data may include (but is not limited to): state updates to the contract (e.g. changes in price, performance of obligations, contractual events, administrative updates such as data being pushed to external systems, etc.), other data that does not originate from the contract or is not contained in the graph data structure but is related to the contract (e.g. events such as IoT data related to shipment of goods, other documentation such as invoices and trade finance documentation). In one embodiment, data may be encrypted or obfuscated in the manners stated herein. Additionally or alternatively, permissioning to read/write data to the ledger structure may also be used. In one embodiment, only select data (i.e. not all data from the graph) may be added to the ledger. Both formation and post-formation data may be stored on the ledger structure.

The object ledger structure may also include data from other distributed ledgers (e.g. transaction and other data pertaining to transactions/operations performed on other BDLs, IoT data for input to the contract, and other data stored on BDLs, databases, systems/applications, etc.).

Any appropriate combination of data may be stored in each record (or block, where a 'blockchain' ledger structure is used). Where a 'blockchain' (or other applicable) ledger is used, the data may be stored in the state database or in any other appropriate form.

FIG. 38 provides an exemplary implementation depicting exemplary data that may include a contract root, a contract_UUID, a clause_UUID, an update_UUID, a clause reference, change data, and/or a transaction ID. A contract root is preferably a hash of the contract root (i.e. its current cryptographic state) such as before and after the update from the graph data structure. A Contract_UUID is preferably a UUID/identifier of the contract. A clause_UUID is preferably the UUID of the clause(s) to which the update relates (and any associated metadata relating to the clause). Any references that may change (e.g. Clause_UUID) may be stored prior to and after the update. An update_UUID is preferably the state update identifier (and associated metadata) from the graph data structure. A clause reference is preferably the reference of the clause. Change data can include object(s) from the graph data structure or other data that represents the new state of the object and (where, in an appropriate embodiment) any associated metadata. A transaction_ID is preferably a transaction identifier and other metadata for a transaction or (series of transactions) performed on a BDL in the methods stated herein (e.g. compilation to on-chain/on-ledger VM bytecode, deploying/invoking 'on-chain'/'on-ledger' code, passing objects to on-chain code, etc.) relating to the state update.

Additional and/or alternative data/types may be used. In an alternative embodiment, the graph data structure may be replaced with another storage medium/mechanism and the data exposed on the object ledger. Records may be linked with the hash of the previous record 'header' (e.g. 'Record 1', 'Record 2', 'Record n', etc., depending on the identifier used) on the ledger.

Figure 39:
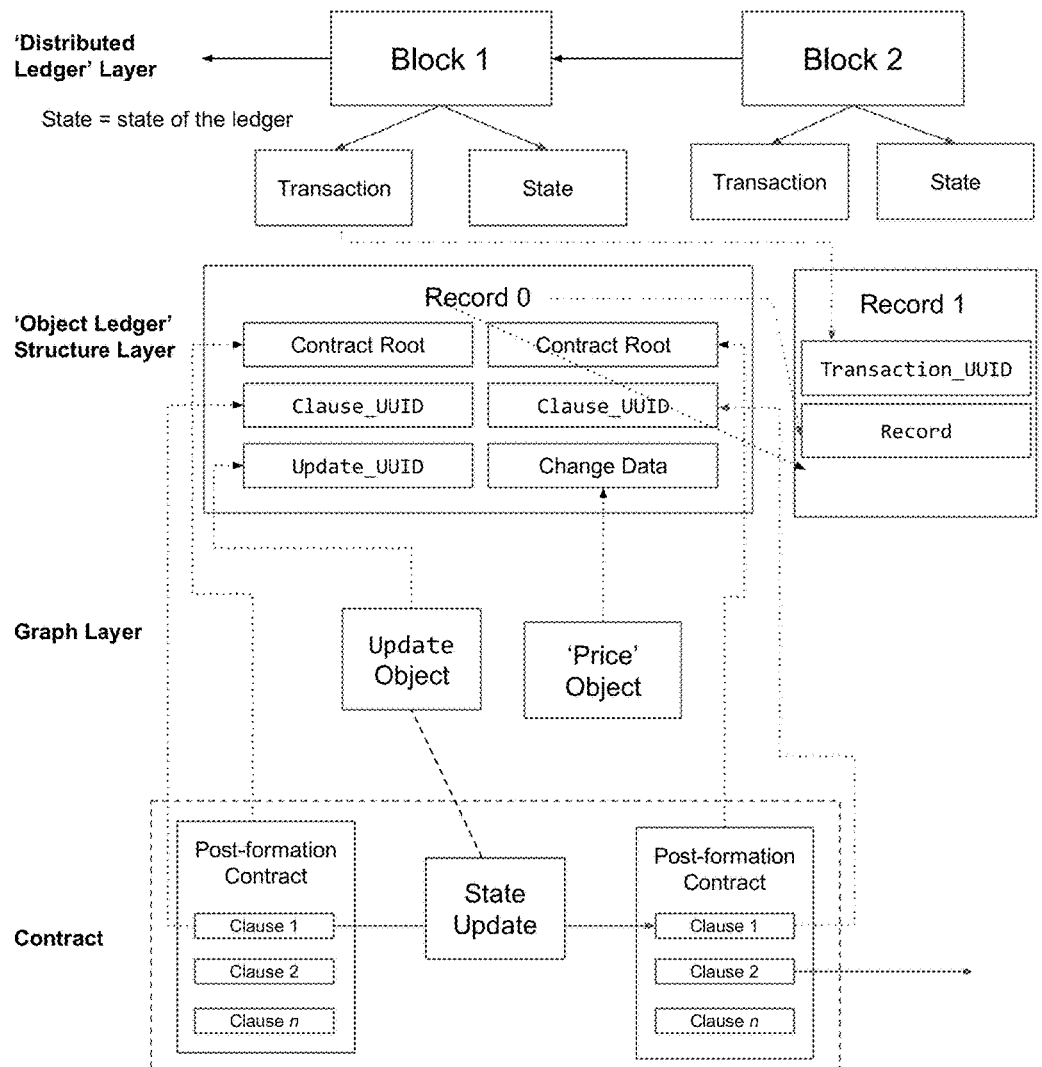
FIG. 39 is a schematic depicting one exemplary embodiment of a contract object graph data structure interacting with a ledger structure.

Transactions are typically performed on other distributed ledgers where the nodes/participants include those other the contracting parties and those related to the contract. Those BDLs may be permissioned/private or permissionless/public, and may use any appropriate underlying protocol (e.g. Hyperledger Fabric, Ethereum, Chain, etc.). The data pertaining to the transaction on this BDL may be reflected in the same record on the object ledger structure, as depicted in FIG. 38 (e.g. if the record pertains to such a in a transaction then the record may be left open and then added when the transaction is initiated, executed, or other such data is available to include in the record/block). FIG. 39 depicts an alternative embodiment where the transaction is recorded as a separate record in the ledger from the contract. Any appropriate data may be added to the record, including the link to the record to which the transaction relates. Alternatively, the data may be repeated in the block/record that includes the transaction data. The transaction block/record may be linked by a hash (as above) to the previous record/block in the object ledger structure, or may be linked by the record/block reference to which the transaction relates (e.g. instead of 'Record 4' being linked to 'Record 3', the former may—alternatively or additionally—be linked to 'Record 2' which stores the related data from the graph data structure).

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the spirit and scope of this invention as defined in the following claims.

I claim:

1. A method for facilitating a secure and auditable computable contract comprising:
   in a contract management system operable within a computing system comprised of at least one processor and accessible by involved parties through a computer interface, managing a formation stage of a contract document comprising:
   obtaining object components of the contract document by translating the contract document into object components that are data representations,
   assembling a contract object graph from the object components, wherein the contract object graph is stored in a computer-readable storage medium and wherein the contract object graph is a directed acyclic graph with the object components having embedded hash links connecting the object components,
   committing the contract object graph to post formation execution; and
   in an execution environment comprised of at least one processor and during a post formation stage, executing the contract object graph where instances of execution comprise:
   receiving a contract state update through the execution environment, and
   appending at least one appended object component to the contract object graph in accordance with the contract state update and with a cryptographic hash identifier, wherein the appended object component is stored in the computer-readable storage medium.

2. The method of claim 1, wherein obtaining object components comprises obtaining at least a subset of clause objects, and wherein assembling the contract object graph comprises assembling the contract object graph as a tree organization containing the clause objects.

3. The method of claim 2, wherein the clause objects include natural language clause objects, executable clause objects, and hybrid clause objects.

4. The method of claim 2, wherein at least a subset of clause objects are programmable clauses that include configured logic and at least one variable.

5. The method of claim 1, further comprising referencing an element of the contract object graph in a transaction of a distributed ledger.

6. The method of claim 1, further comprising driving execution of code executable on a distributed ledger system from the contract object graph.

7. The method of claim 1, wherein obtaining object components comprises obtaining object components from a contract repository.

8. The method of claim 1, wherein, in a first instance of execution, receiving the contract state update comprises detecting outbound communication of data to a first distributed ledger system; and wherein, in a second instance of execution, receiving the contract state update comprises detecting outbound communication of data to a second distributed ledger system that is distinct from the first distributed ledger.

9. The method of claim 1, wherein obtaining the object components comprises receiving object components from a contract repository; and wherein managing the formation stage comprises exchanging cryptographically signed commits between the involved parties and thereby synchronizing the contract repository with repositories of the involved parties.

10. The method of claim 1, wherein committing the graph to post-formation execution comprises executing signatures of the contract object graph by contracting parties.

11. The method of claim 1, wherein executing the contract object graph comprises: a first instance of executing the contract object graph that comprises receiving a data-initiated state update through a computer system integration, a second instance of executing the contract object graph that comprises receiving a party-initiated state update initiated through the computer interface of the contract management system, a third instance of executing the contract object graph that comprises receiving a hybrid state update resulting from received data input and sign-off of at least one party through the computer interface of the contract management system.

12. The method of claim 1, wherein the contract state update is a data-initiated state update.

13. The method of claim 12, wherein the data-initiated state update results from receiving data from an outside data source; and wherein the at least one appended object component defines altered logic in execution of the contract object graph.

14. The method of claim 13, wherein the at least one appended object component is part of a pricing clause object where the altered logic alters an active pricing variable.

15. The method of claim 13, wherein receiving data from the outside data source comprises receiving data from a distributed ledger.

16. The method of claim 12, wherein the data-initiated state update results from outbound communication of data to a data destination; and wherein the update object records the outbound communication of data in the contract object graph.

17. The method of claim 16, wherein receiving the contract state update comprises detecting a transaction on an outside distributed ledger; and wherein the update object records the transaction in an appended object component of the contract object graph.

18. The method of claim 16, wherein the appended object component records outbound communication of data through an API of an outside service.

19. The method of claim 1, wherein instances of execution further comprise cryptographically validating the contract state update prior to appending the update object.

20. The method of claim 1, wherein at least executing the contract object graph comprises executing the contract object graph through a decentralized computing infrastructure.

21. The method of claim 20, wherein the decentralized computing infrastructure, is a peer-to-peer network.

22. The method of claim 20, wherein peers of the peer-to-peer network hold a copy of the contract object graph; and further comprising transitioning state through state update messaging.

23. The method of claim 1, further comprising sharing data on a distributed ledger system representing at least a portion of at least one object component of the contract object graph.

24. The method of claim 1, querying the contract object graph and providing a versioned history of contract state.

25. The method of claim 1,
wherein at least one object component in the contract object graph includes contract logic; and
wherein executing the contract object graph further comprises executing contract logic of an object component in the contract object graph and maintaining of the contract object graph as an auditable record of contract state and history.

26. A system for facilitating a secure and auditable computable contract comprising:
a contract object graph that is a directed acyclic graph of object components having embedded hash links connecting the object components;
a contract management system, comprising at least one processor and a computer interface accessible by involved parties, the contract management system further comprising machine interpretable instructions with configuration to:
obtain object components of a contract document by translating the contract document into object components,
assemble the contract object graph from the object components, wherein the contract object graph is stored in an computer-readable storage medium, and
commit the contract object graph to post formation execution; and
an execution environment comprised of at least one processor and data storage medium configured to store the contract object graph during post formation execution, the execution environment including computer readable instructions with configuration to:
receive a contract state update, and
append at least one appended object component to the contract object graph in accordance with the contract state update and with a cryptographic hash identifier, wherein the appended object component is stored in the computer-readable storage medium.

* * * * *